Sept. 26, 1944.    C. W. WARD    2,359,014
ELECTRIC DISPLAY SYSTEM
Filed Aug. 4, 1939    15 Sheets-Sheet 1
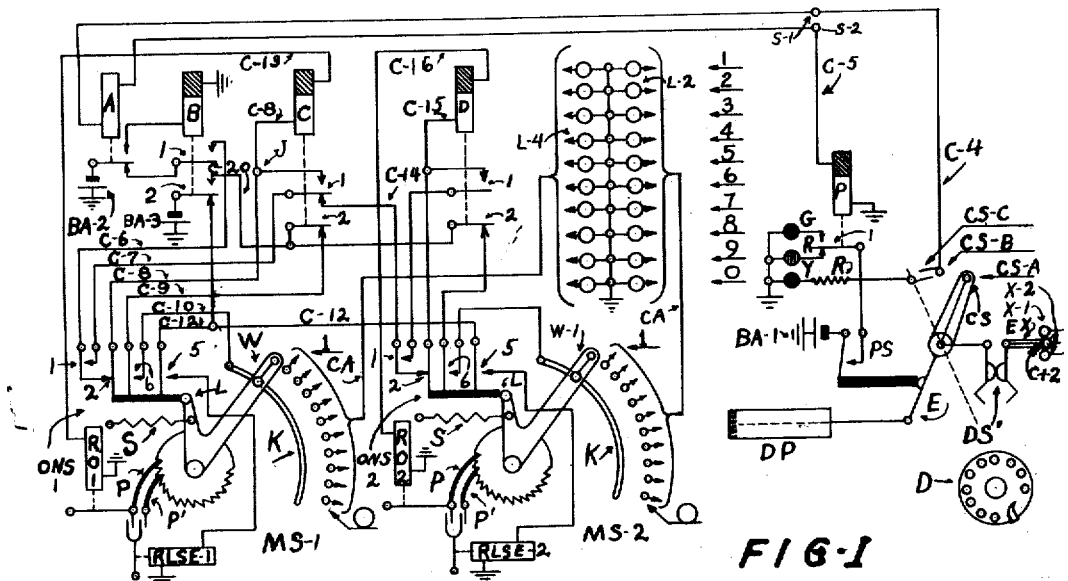
FIG-1
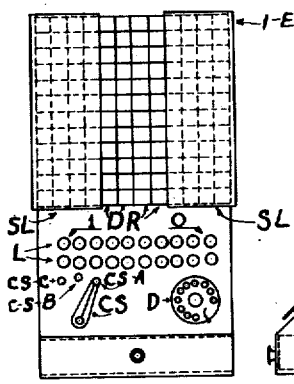
FIG-1-A
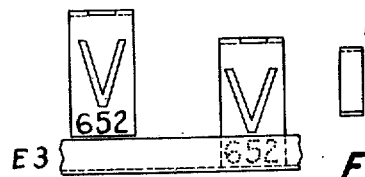
FIG-1-B
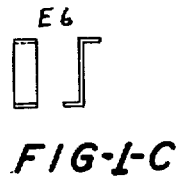
FIG-1-C
FIG-1-D
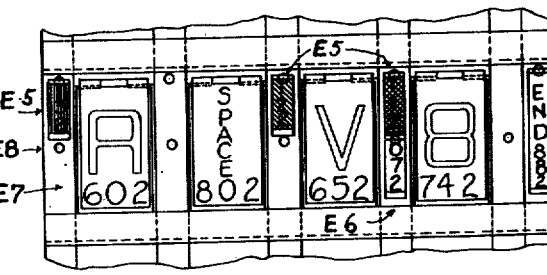
FIG-1-E
INVENTOR.

Sept. 26, 1944.  C. W. WARD  2,359,014
ELECTRIC DISPLAY SYSTEM
Filed Aug. 4, 1939  15 Sheets-Sheet 5

Sept. 26, 1944.  C. W. WARD  2,359,014
ELECTRIC DISPLAY SYSTEM
Filed Aug. 4, 1939  15 Sheets-Sheet 10

INVENTOR.
Charles Ward

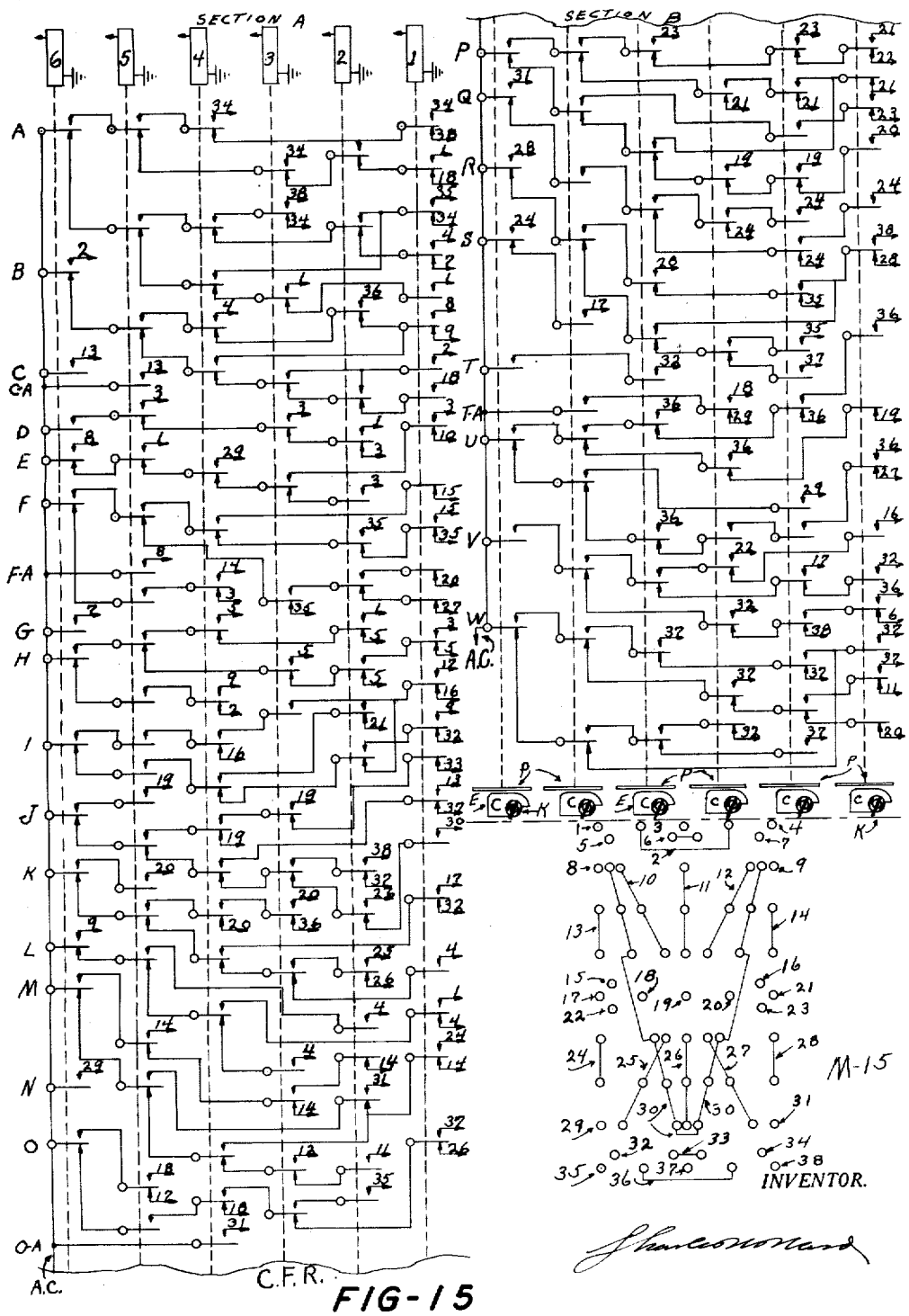

Patented Sept. 26, 1944

2,359,014

UNITED STATES PATENT OFFICE 2,359,014

ELECTRIC DISPLAY SYSTEM

Charles W. Ward, Bradenton, Fla.

Application August 4, 1939, Serial No. 288,349

11 Claims. (Cl. 177—346)

This invention relates to electric display systems and more especially to those types of systems employing one or more changeable character display devices commonly known as "monograms," mounted in a horizontal or vertical alignment on which predetermined characters in the form of letters, figures or common or spectacular designs are automatically, progressively or periodically illuminated in one or more colors and displayed or continuously changed. The result is the producing on the illuminable devices of monogrammic panels, the desired information or message in printed form and/or causing same to be progressively stepped across the display field from right to left as a running display while being viewed on a horizontal arrangement, or from bottom to top, (or vice versa) on vertically mounted monogram panels.

One of the oldest types of electric display apparatus known is the monogram employing a sign or display board composed of one or more panels, each having a plurality of electric lamps or other illuminable devices so arranged that they produce illuminated display figures or characters successively to form numbers, words or sentences by the energization of different combinations or groups of said illuminable devices.

Various methods have been conceived for the operation of display apparatus of this nature, and to obtain a clearer understanding of the usefulness of my system, it will be instructive to consider some of the objectionable features heretofore proposed, together with some of the requisites of a more practicable and efficient system.

In most display systems of this character, a great number of line wires are required to connect the transmitting mechanism with the display apparatus. Remote control of a system in this class is a costly process, and as it is frequently desirable to control displays or signs located on the roof of a high building from the ground or office floor, it is imperative that the connecting wires be reduced to a minimum. One of the chief objects of my improved system is to effect economy in the use of conductors between the first station, (the point from which the initial signals are transmitted), and the second station, (the control and display monogram panels). I accomplish this by the incorporation in the remote control feature of this system, means whereby the letters and/or numbers desired are translated into a novel two digit code, capable of being transmitted by a series of combinations of impulses over one line wire, and common ground return, by the use of the well known automatic telephone dial. In conjunction with the dial mechanism, and connected by its single line wire, I provide a novel and improved storage controller so designed and constructed that it is capable of receiving and storing the various coded signals or characters originally transmitted by the dial. Provision is also made whereby the characters are then routed by selective means to character forming relays which translate said coded instructions into their original characters and flash them on the display apparatus either as a printing and/or a running display, and in predetermined colors. One of the chief objects of this invention is to utilize the same control and display apparatus for either a printing or a running display, as will be explained in the specifications.

While my complete system contemplates the use of the dial for remote control, the storage controller may also be set manually if remote control is not desired.

Some systems of this class require a relay for each lamp of the display device, while according to my invention, only six relays are required to store the letters and figures on the controller, and a six coil relay is used for character forming purposes at each monogram panel. Some systems employ a typewriter especially constructed to print or punch letters in code on a tape, which in turn runs through a control device. Use of tape introduces certain complications and defects and increases the operating costs as the tape is scrapped as soon as the message printed thereon is no longer required. The storage controller of my invention eliminates the tape, tape punching equipment and the large multiplicity of slideably operated contacts incidental thereto.

Some systems require the services of a trained operator to prepare the required message, transmit it and flash standard time etc. The services of a trained operator are eliminated according to my improved system and if desired, standard time is automatically flashed on the display device at predetermined intervals regardless of the message set up on the storage controller. It is presumed that someone must operate the dial in setting up a new display, after which his services are not required as the apparatus then works automatically. The word "operator" will be used to designate anyone capable of manipulating a telephone dial, even though unskilled in the art pertaining to this invention.

Most running or travelling displays at the present time consist of a bank of lamps of only one color, on which the message appears to travel across the display board from right to left. The cost entailed in a display of this character, generally limits its size so that it cannot be read from a distance greater than a few blocks. There has accordingly existed a long felt want for a simple efficacious and inexpensive arrangement which would enable a display of this character to be read from a greater distance and displayed in any desired color. One of the main features of my invention is to provide means whereby one or more monogram panels will be utilized on a large scale to produce printing, spelling, and/or running or travelling displays which can be read at a great distance and in different colors. It is intended to equip the illuminable devices of the monogram panels with reflectors, such as automobile headlights use, thus utilizing the concentrated intensity of light caused by the reflectors to increase the range of visibility. Automobile headlights, four feet apart at a distance of one mile, appear to be only a few inches apart. This phenomenon as is well known, is caused by the operation of the natural law of perspective foreshortening. Provision is made according to my improved system, whereby the spacing of lamps on the monogram panels designed for long distance observation, is governed by the visibility desired and according to the principles above stated.

The speed of present day running or travelling displays using banks of lamps, will not be reduced according to my present system for the following reason: In the tape operated type of display comprised of lamp banks, the punched tape must pass by at least six rows of contacts in order to move the letters of the message to the left a distance equal to the width of one of the monogram panels of my system. Therefore, my improved control apparatus can have slower motion, but the message will still approximate the speed of present tape operated machines and accomplish the desired result with fewer contacts.

Another embodiment provides for a single large sized monogram panel to be installed on a chimney, smokestack or water tank, whereon a trade name, name of manufactured product or other information may be spelled out letter by letter. The single panel may be buried in the landing field of an air port, with reflectors buried flush with the ground or ramp, so that a coded message may be flashed to an airplane. Its use in time of war is also apparent and contemplated. The system is also applicable to small display devices for store windows etc., using telephone switchboard or other miniature lamps as a display medium. Such devices to be either electrically and/or mechanically controlled. Other uses to which this system may be applied, will be apparent to those skilled in the art.

While this system of my invention contemplates using various kinds of electric incandescent lamps of one or more colors, it is adaptable to the use of "neon," or any other gaseous tubes or illuminable devices of various colors, bent in the form of desired characters. I do not however wish to be limited as to the nature of the responsive devices which constitute the display elements, because my system has more to do with the control mechanism and the means of operation, rather than with the particular form of display apparatus used for portraying the desired message or characters. I wish it understood therefore, that my system may incorporate any kind of display device to which its mechanism is applicable.

A complete and flexible electric display system should provide for the production of printing and/or running displays on the same apparatus, and operated from the same controller. Provision is made according to my invention, whereby the dialing of the proper code number establishes a sequence of printing and/or running displays flashed in any color desired, and also provides for the change of color of any letter or word while the display is in operation, regardless of the color set up on the storage controller.

In a system of this nature, it is desirable to provide means whereby the message may be arbitrarily obliterated. My system incorporates this provision, which automatically wipes the characters off of the storage controller, and immediately sets up a new starting contact, preparing it for a new set of characters.

Among the desirable features of display devices of this description and class, are low cost of construction, simplicity of mechanical and electrical elements, economy in the use of conductors in the production of a plurality of effects, dependability of operation, certainty of action, and a minimum of operating and overhead cost.

It is intended by my invention to overcome the objectionable features of the present applied art, and incorporate all of the above mentioned and other desirable features. I have therefore provided a display system with the incidental operating mechanism of great flexibility, which fully meets these requirements and conditions.

With the above mentioned and other requisites necessary for a practicable electric display system in view, one of the objects of the invention, is to incorporate with the dial mechanism, a visual sign rack upon which tokens portraying the characters to be transmitted are set up with the code numbers of each letter or figure plainly marked thereon. Another feature of the token display rack is to furnish the office, or first station, with a complete picture of the transmitted characters. Provision is also made so that the tokens will display the proper spacing and color designation. The token also furnishes the operator with a direct check on the code number dialed. Means are also provided to enable a mistake in dialing to be rectified before the coded characters reach the storage controller.

According to another feature of my invention, means are provided whereby the display apparatus is susceptible to control by manual and/or electrical means from a location in close proximity to the display apparatus. It also provides for a plurality of display devices to be placed at a number of different locations and controlled from one dial. Display space rented in different locations may be controlled and changed in this manner by the use of only one line wire to each location. It also contemplates the use of auxiliary controllers, whereby the same or a different set of characters may be transmitted by the same dial, and set up and stored on other controllers while the first controller is in operation. Means are also provided whereby these extra or auxiliary controllers come into action automatically or intermittently at predetermined intervals, thus providing means whereby the display apparatus is not idle while new characters are being set up and stored.

Another feature of my invention provides for the alignment of lamps of each color in each monogram panel, where more than one color is desired. In the present system, I prefer to use red, green, orange, (yellow), and white lamps in a four point cluster. It is obvious therefore, that four distinct but differently colored monogram panels are contained in one.

Another object of my invention is to provide for daylight operation of the display apparatus by the use of an auxiliary time clock connected to the color circuit having the greatest degree of visibility. This color is made to predominate during the time the daylight time clock is in control. As the scheme of using different colored lamps is old in the art, it is not to be claimed as part of this invention other than the novel circuits or control mechanism necessary to their incorporation in the system.

According to another feature, the system is so provided with circuit breakers, that the current to the lamps is cut on after, and cut off before any lamp control relays are respectively energized or de-energized, thus avoiding trouble from excess arcing. Provision is also made in the wiring scheme to avoid the use of flexible terminal connections. This feature eliminates a very fertile source of trouble.

An important provision according to my improved system, lies in the novelty of utilizing, by selective means, the complete periphery of the stator of the controller regardless of the space occupied on the rotor by stored instructions. The novel construction and operating arrangement of this improvement will be explained as the description progresses.

Another feature of my invention provides for a "hyphen," selectively placed between each monogram panel, consisting of one or more clusters of lamps susceptible to color change, and this takes the place of a colon, dash, or period. It is used to separate words or sentences, instead of spacing by sacrificing an entire monogram panel. Another feature provides a spectacular effect by incorporating a dimmer in the display circuit, whereby the brilliance of monogram lamps may be gradually increased or decreased. Provision is also made whereby the spectacular features, such as color, the dimmer, and flashing of standard time may be eliminated without impairing the efficiency of the system.

Other objects have to do with the various circuits that incorporate the desired control. These and other advantages will appear as the description and accompanying drawings are studied. It is my intention that the above discussion should not be understood to be comprehensive or invariable, but merely illustrative for the purpose of obtaining a better understanding of the invention.

Throughout the specification, the novel features, code designations, and various circuits will be described separately as far as is practicable. Each description will be headed with a caption which will include an appropriate heading and identifying number prefaced by the word "Detail." Whenever mention is made of a particular feature or circuit, its detail number will be given for reference purposes, and to avoid a descriptive repetition.

*List of captions. Detail 1*

The following chart lists the various captions and the respective Detail number under which they are described.

| Detail No. | Caption | Detail No. | Caption |
|---|---|---|---|
| 1 | List of captions | 2 | General description |
| 3 | List of figures | 4 | Transmission of code |
| 5 | Storage relays | 6 | Code methods |
| 7 | Code chart | 8 | Dialing of code |
| 9 | Minor switches | 10 | A & B relay |
| 11 | False impulse | 12 | Off normal springs |
| 13 | Indicator lamps | 14 | Erase dial error |
| 15 | Appended number 2 | 16 | Display rack |
| 17 | Relay G | 18 | Relay K |
| 19 | Release circuit | 20 | The distributor |
| 21 | Relay set | 22 | Control apparatus |
| 23 | Rotor of SC | 24 | Stator of SC |
| 25 | Brush switches of SC | 26 | Relay 6 |
| 27 | Relay 60 | 28 | Main clutch |
| 29 | Ratchets | 30 | Dimmer clutch |
| 31 | Erase clutch | 32 | Unlocking rods |
| 33 | Relay AD | 34 | Stepping of rotor |
| 35 | Relay 80 | 36 | Interlocking |
| 37 | Relay 88 | 38 | Storage relay E |
| 39 | Cycle of operation | 40 | Operation clocks |
| 41 | Clearing SC | 42 | Relay ST |
| 43 | Erase running display | 44 | Erase printing display |
| 45 | Relay 90 | 46 | Relay ERA |
| 47 | Clearing dialing error | 48 | De-coding, method A |
| 49 | De-coding, method B | 50 | Color control in storing |
| 51 | Storage relays R and G | 52 | Superimposed color |
| 53 | Two color sequence | 54 | Color change |
| 55 | Three color sequence | 56 | Relay 18 |
| 57 | Color change impulse | 58 | Printing display |
| 59 | Relay 87 | 60 | Current for SC |
| 61 | Relay P | 62 | Stick circuit of relay P & RU |
| 63 | Relay OP | 64 | Drum selector |
| 65 | Relays of Fig. 8 | 66 | Relay M |
| 67 | Power bus | 68 | Limit circuit, printing dis. |
| 69 | Impulse circuit | 70 | Stepping relays of Fig. 9 |
| 71 | Relay R in printing dis. | 72 | The dimmer |
| 73 | Relay H | 74 | Standard time |
| 75 | Relay EP | 76 | Modified circuit A |
| 77 | Modified circuit B | 78 | Modified circuit C |
| 79 | X relays | 80 | Modified circuit D |
| 81 | Modified circuit E | 82 | Circuit breakers |
| 83 | Circuit breakers for dim. | 84 | Circuit breakers for DS |
| 85 | Running display | 86 | Reserved section of SC |
| 87 | Relay 97 | 88 | Relay RU |
| 89 | Relay OR | 90 | Relay ER |
| 91 | Relay L | 92 | Selector circuits |
| 93 | Stick circuit of Fig. 9 | 94 | Modified time circuit |
| 95 | Alternate display | 96 | Hyphen circuit |
| 97 | Hyphen relay | 98 | Lamp return circuit |
| 99 | Test circuit | 100 | Auxiliary apparatus |

*General description. Detail 2*

In further describing my invention, reference is had to the accompanying drawings, wherein is illustrated, mostly in a diagrammatic manner, the apparatus and circuits employed. In general, characters of reference, except some confined to one sheet, designate corresponding parts throughout. When tracing the circuits, sheets 1—2—3—4—5—6—7—8 and 9, are placed side by side from left to right. Sheet 10 is placed over 8, and sheet 12 is placed below 8. Sheet 11 is auxiliary to 10, and sheets 13 and 14 are placed side by side. Sheet 15 is auxiliary to sheets 13 and 14.

Whenever possible, correspondingly numbered conductors running to adjacent sheets are carried to the margin and are in alignment. Their numerical designation is prefixed by the letter C, and includes the sheet numbers to which they are extended. As an example, a conductor connecting sheets 1 and 2 will be marked C-1-2 on both sheets. Where a single conductor is continued to a sheet not adjacent to its original, it will be prefixed with the letter C, and both sheet numbers will be given. They will be shown in alignment wherever practicable. In order to avoid complications in the drawings, several conductors running to adjacent or other sheets are shown as run in a cable designated as CA. The sheet numbers will also be mentioned. Thus a multi-conductor cable connecting sheets 1 and 5 will be marked CA-1-5, and a multi-conductor cable running to sheets 3, 5, and 9, will be marked CA-3-5-9. Whenever modified circuits require parts not in general use, they will be prefixed with the letter X.

An arrow on the end of a conductor is used to designate the following: Front and back contacts of relay armatures; conductors entering or leaving cables, and conductors or cables to sheets not adjacent. Where cables or conductors run to adjacent sheets, the arrows are omitted and the lines are extended to the margin of the sheet whenever space permits.

On relay drawings, I have used symbols according to telephone engineering practice in which a separate battery is shown connected in each circuit with its positive side grounded. In my drawings however, my relays are shown as connected direct to ground, and the circuits will be traced from battery, through the relays to ground regardless of the direction in which the current theoretically flows. It is to be understood however, that in actual practice only one source of D. C. or battery current is contemplated for the operation of all relays. The lamps in the display device, and the motive power for the intermittent movement of the controller will depend upon local commercial current, designated as A. C.

The term battery, designated as BA, will hereinafter be interpreted as the source of direct current, and the term ground, will be used to designate the common end of all circuits. Grounds will be shown by the conventional symbol. The term "relay" will be used for all electromagnets regardless of their shape or the purpose for which they are used. All relays, except possibly the one controlling the motor circuit, are preferably of the type used in automatic telephone work. Current theoretically passes through the relays of my drawings from the top of one side to the bottom of the other side, or vice-versa. Stick or auxiliary circuits of the relays are represented by an extra winding consisting of one or more turns around the coil of the relay. Slow to release relays are shown as shaded at the top, and slow to pick up relays are shown as shaded at the bottom of their coils. The character forming relay will consist of six coils having multi-armatures fanned or wired in pyramidal formation if some other method is not preferred. All armatures of multi-armature relays will be numbered consecutively. The number 1 will be assigned to the armature nearest the relay coil. The symbols and methods just explained have been adopted for the sake of clearness and to expedite in tracing the circuits.

That my invention is capable of considerable modification, without departing from the spirit thereof, will be apparent from the following, in which a description of the drawings together with their sheet numbers is given. While the number of monogram panels in the display field may be unlimited, I choose to use four throughout the drawings and as an example the message A, Blank space, V, 8, is shown on Fig. 1.

*List of figures. Detail 3*

Fig. 1 shows the wiring diagram of the dial, pilot lamps and other indicating circuits, as used in remote control of my electric display system.

Fig. 1A illustrates a front and partial side view of the office switchboard cabinet comprising an obliquely positioned "character token" display rack upon which is mounted an indicator and pilot lamp panel, dial control switch, and storage drawer for the code tokens.

Fig. 1B shows a token with the letter V and its code number 652 printed thereon as it appears in the display rack before and after the code number is transmitted by the dial.

Fig. 1C is a front and a side view of a color token.

Fig. 1D is a front view of a compartment of a strip of the display rack.

Fig. 1E shows one row of tokens as they will appear when set up in the display rack of Fig. 1A, as a pattern to guide the operator in transmitting the sample illustration or message, A, Blank space, V, 8, in various colors.

Fig. 1F shows a side view of a letter or figure token set in the display rack before its code number is transmitted.

The apparatus mentioned above, will be referred to as the first station, and comprises all of the office equipment used when coded instructions are transmitted to the storage controller by remote control. The following pertains to the display end of the system, and will be referred to as the second station.

Figure 2:
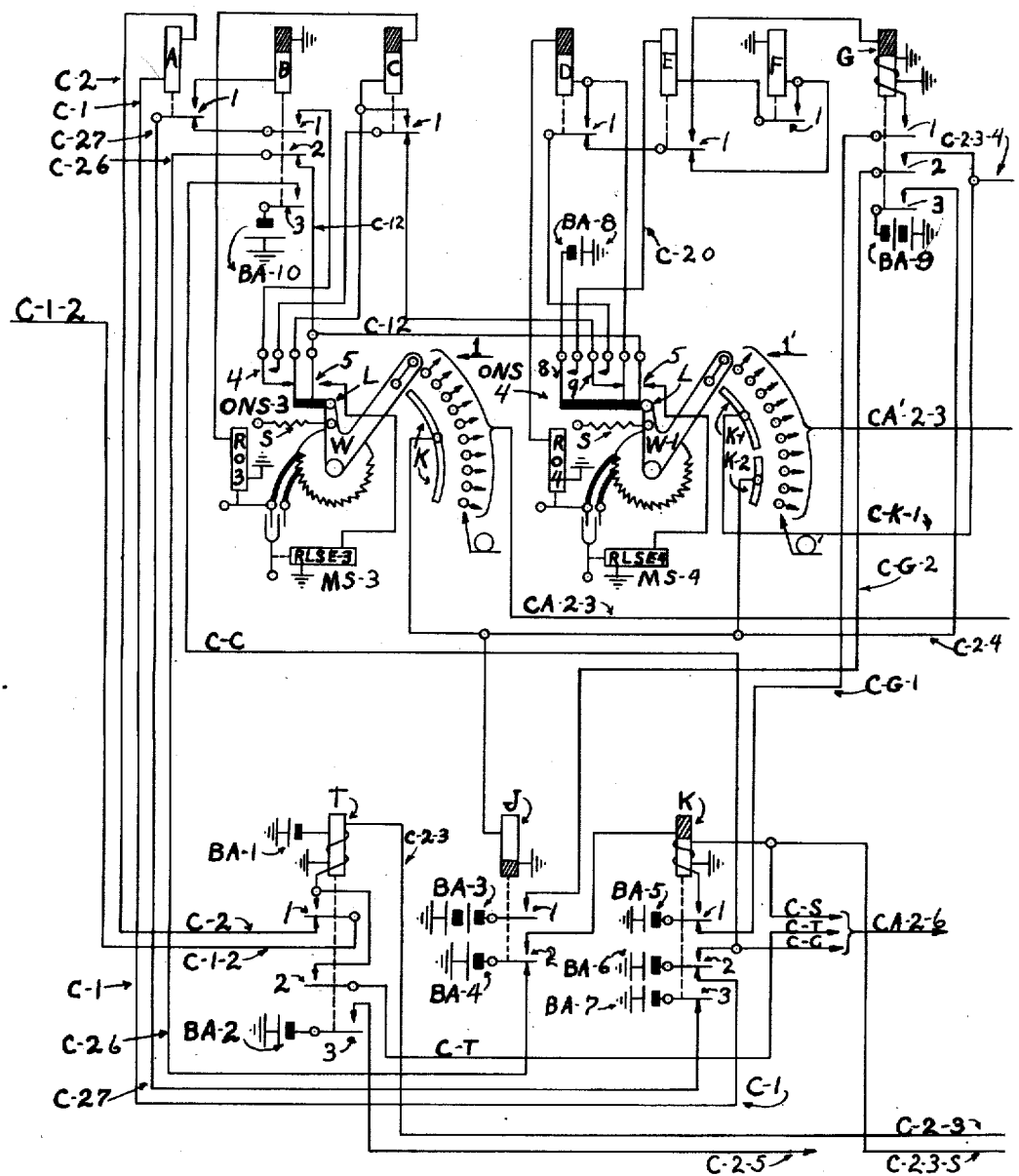
Figure 3:
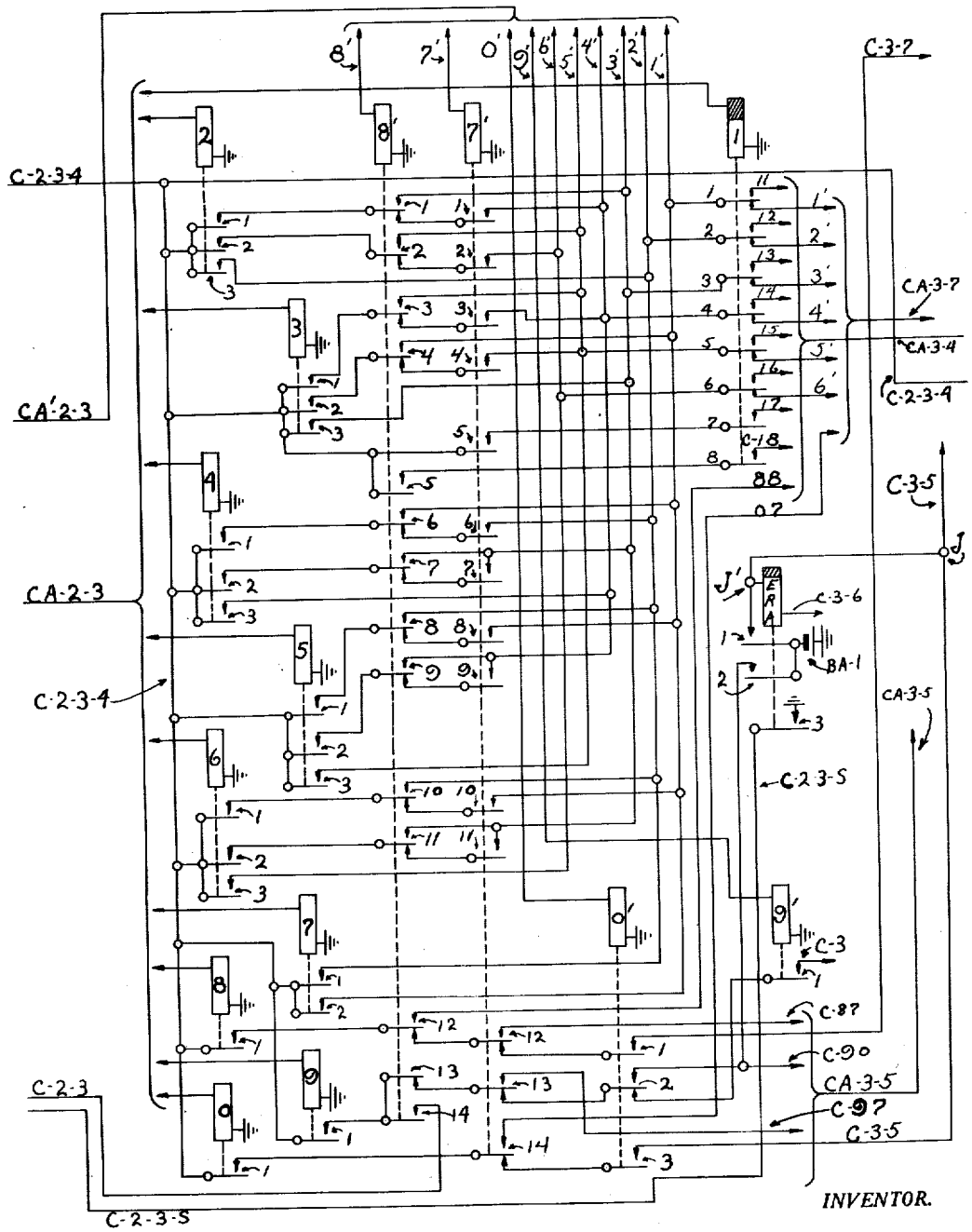

Fig. 2 illustrates the synchronous selectors and apparatus used in connection with Fig. 1, together with incidental circuits for completing the operation of connecting the transmitted signals of the code to the distributor relays of Fig. 3.

Figure 7:
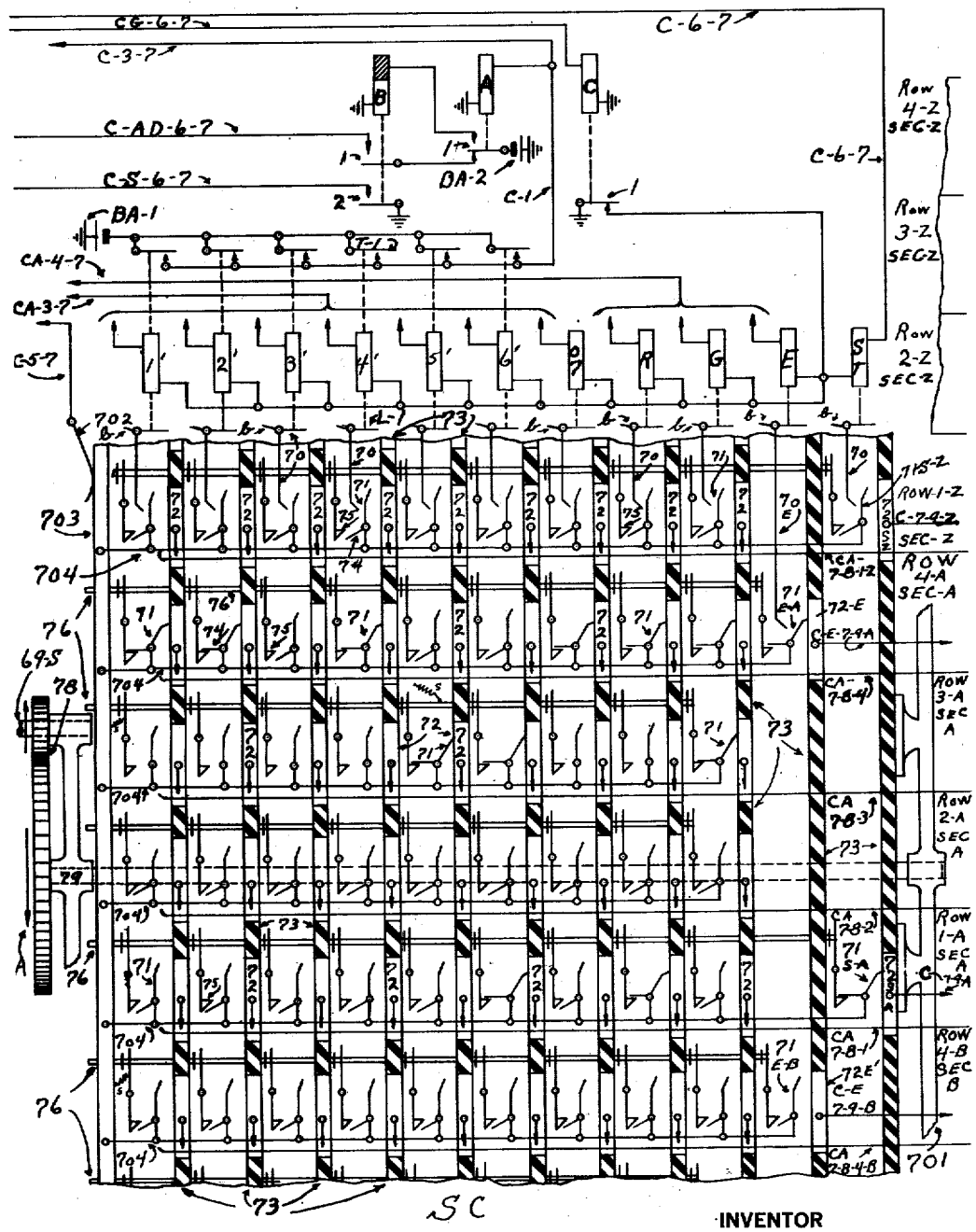

Fig. 3 is a wiring diagram of the relays and circuits used in the distributor, wherein some of the coded numbers are automatically translated or re-coded, and re-transmitted, or distributed to the storage relays on the storage controller of Fig. 7.

Figure 4:
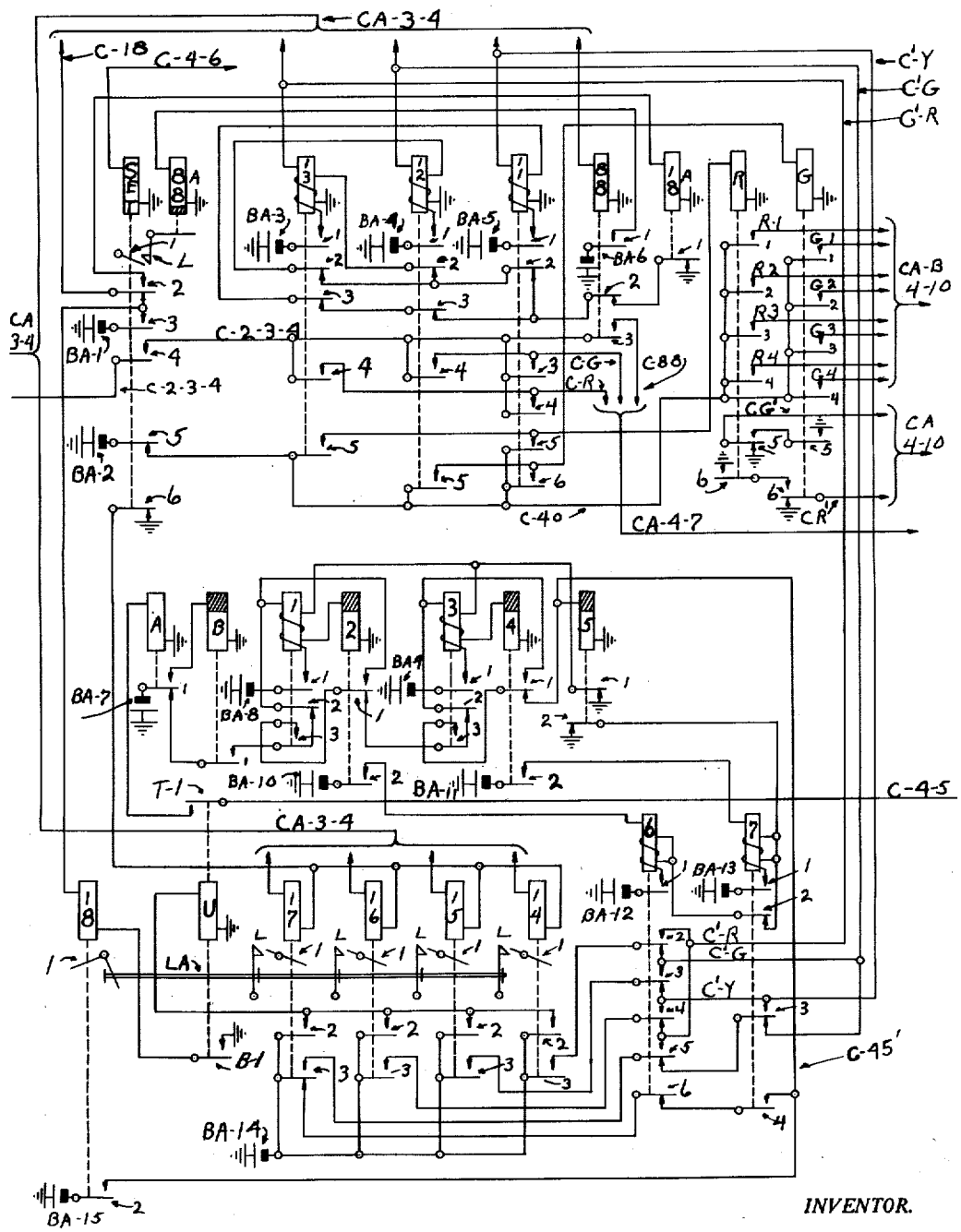

Fig. 4 is a wiring diagram of the color control circuits for the lamps of the monogram panels of the display device.

Figure 5:
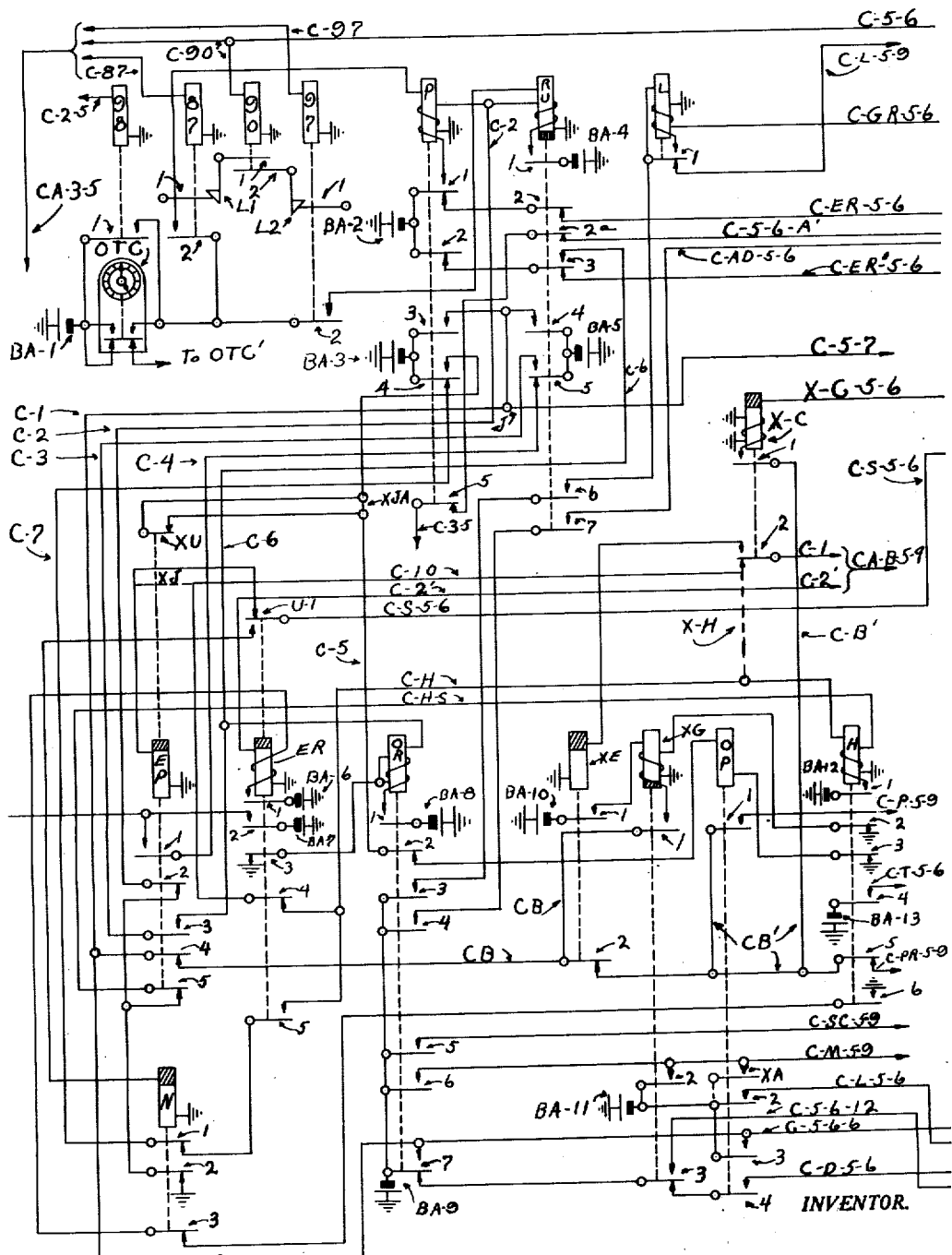

Fig. 5 is a wiring diagram of the circuits through the operating time clock, and through the control relays incidental to the setting and automatic operation of the control and display apparatus.

Figure 6:
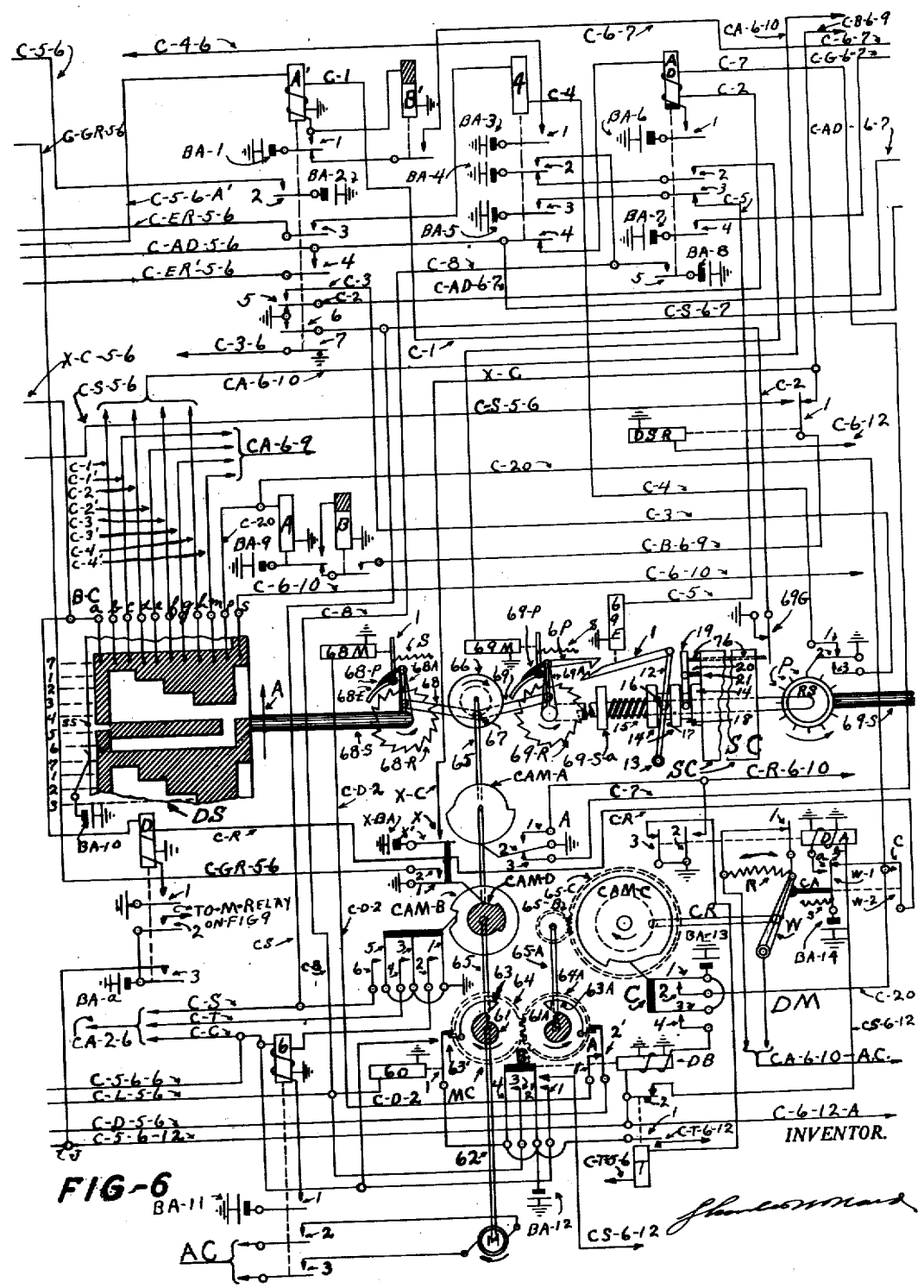

Fig. 6 shows schematic views of the storage controller, an auxiliary drum selector, cam operated switches, dimmer control relays and incidental circuits.

Fig. 7 is a schematic view of a section of the periphery of the storage controller, with storage relays, brush switches and their companion contact segments.

Figure 8:
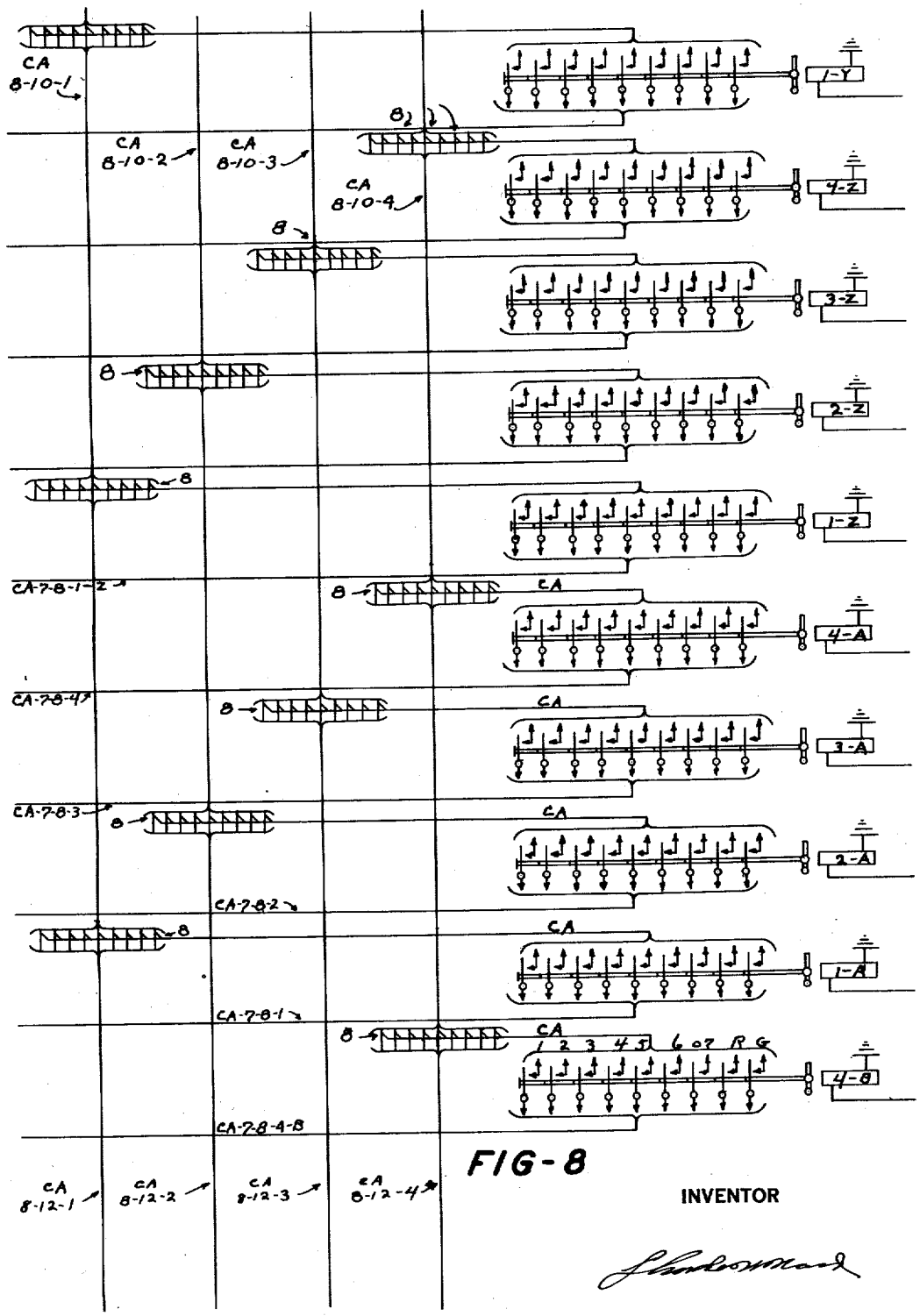
Figure 9:
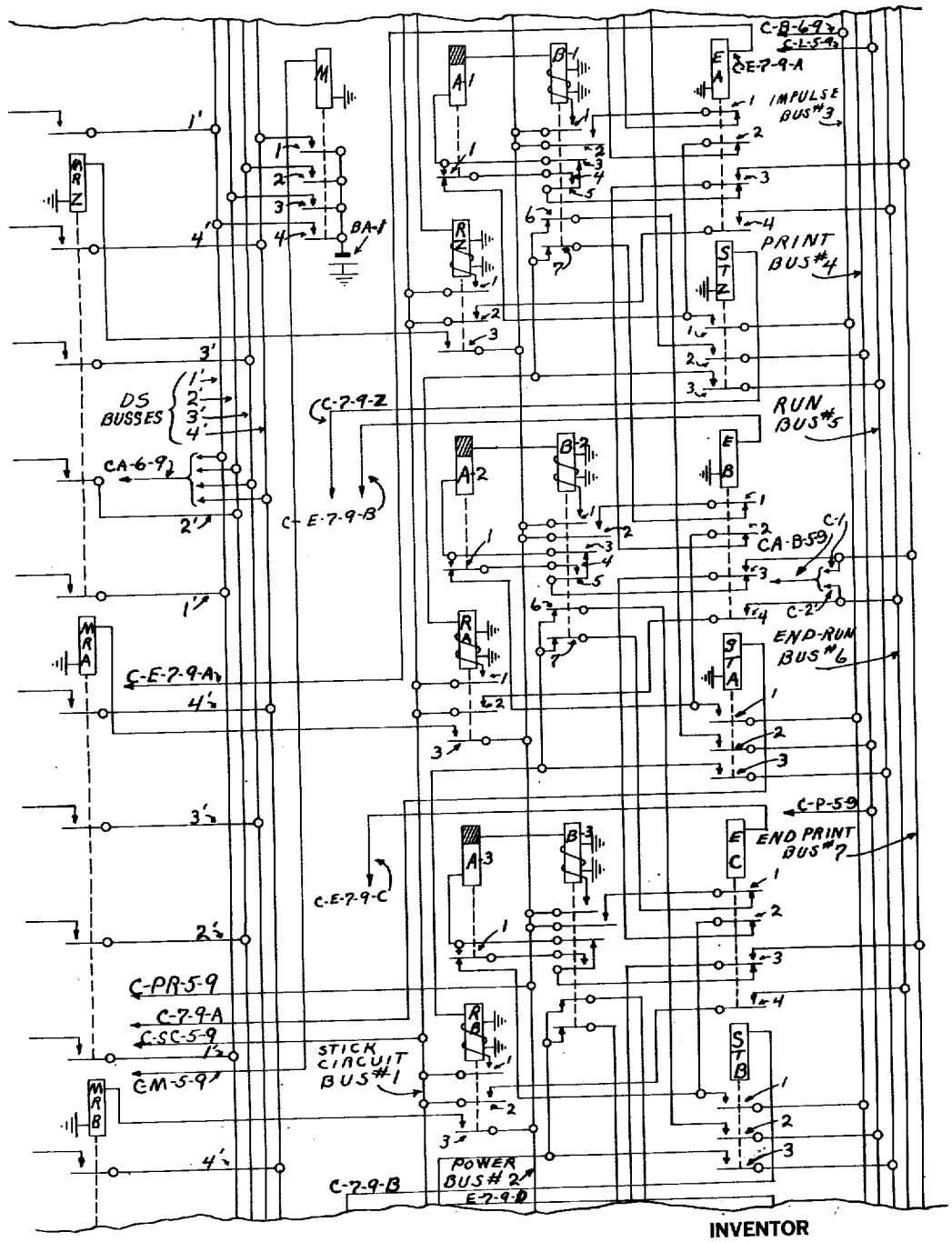

Fig. 8 diagrammatically illustrates a portion of the control circuit which connects the stored circuits of the controller to the display apparatus by the functioning of Fig. 9.

Figure 10:
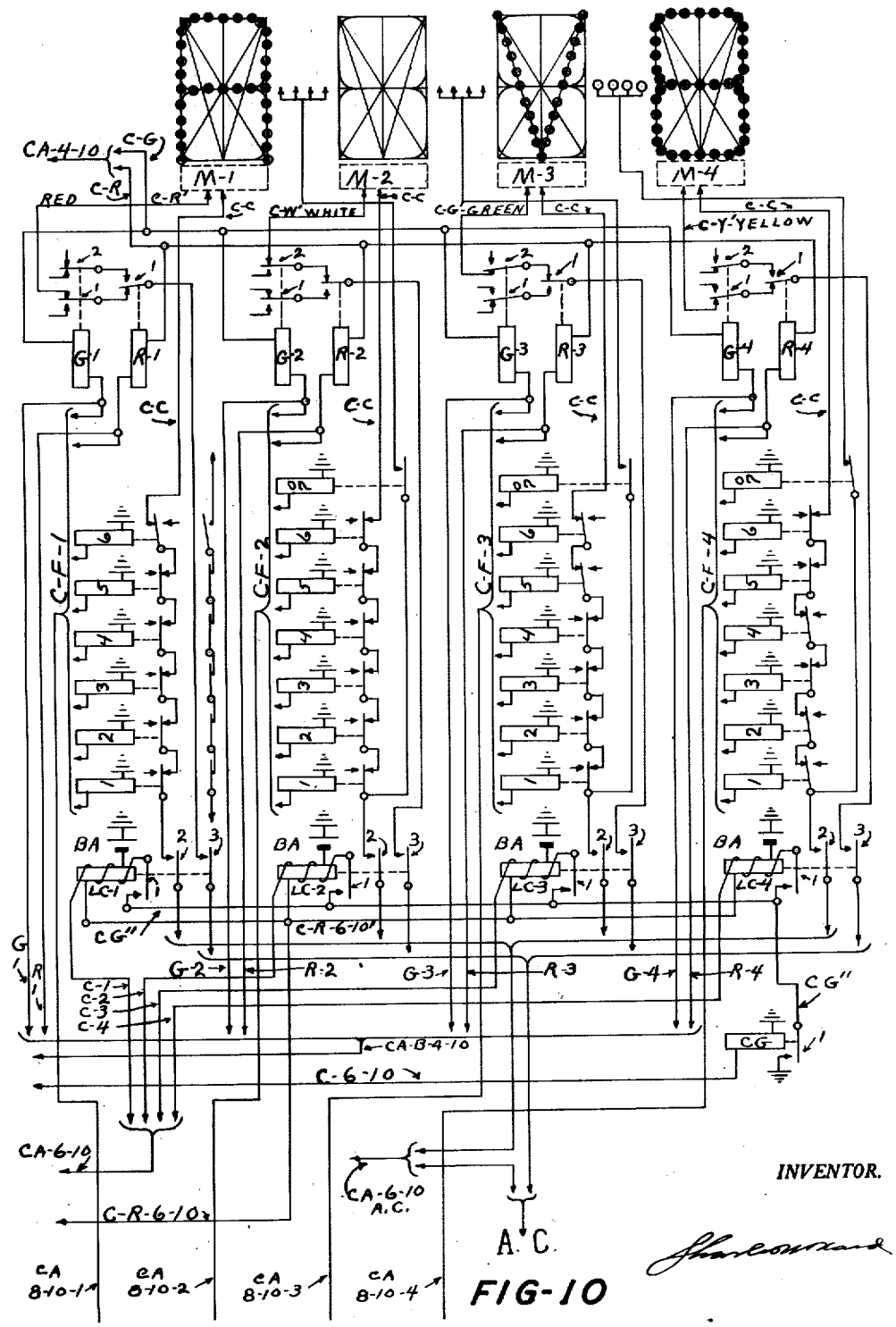

Fig. 9 shows the wiring diagram of a portion of the selective means used in connecting sections of the controller of Fig. 7, to the display apparatus of Fig. 10.

Fig. 10 shows diagrammatically a four monogram panel display device with the four character message, A, Blank space, V, 8, illustrated thereon, together with character forming and panel color relays. There are six coils to one character forming relay and two coils to a panel color relay. A hyphen control relay is also shown on Fig. 10. This relay at certain times causes a dash line or hyphen to show between monogram panels.

Figure 11:
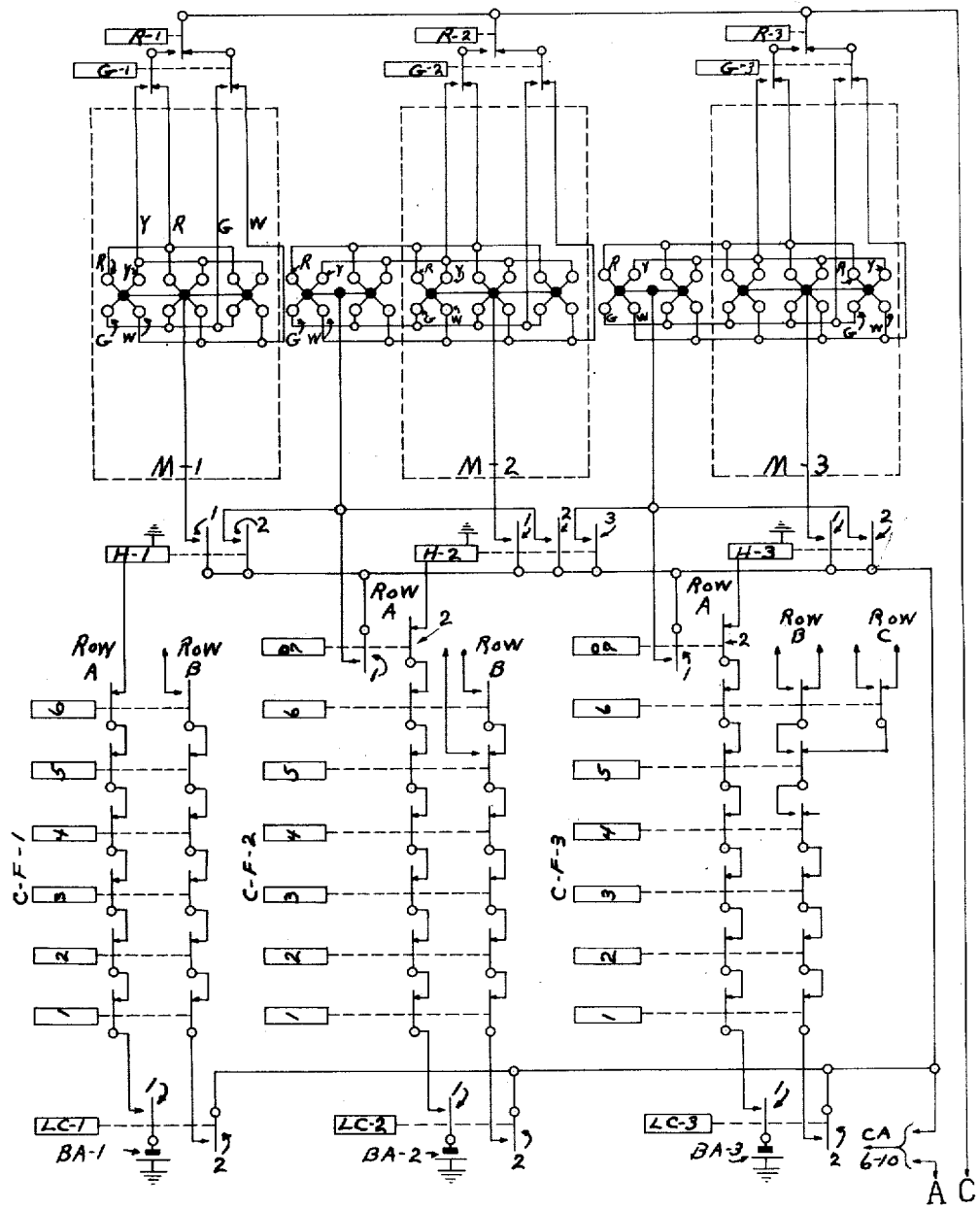

Fig. 11 is the circuit used as auxiliary to Fig. 10, and illustrates the four point colored lamp cluster and panel color relay control. Also an illustration of the hyphen relay control.

Figure 12:
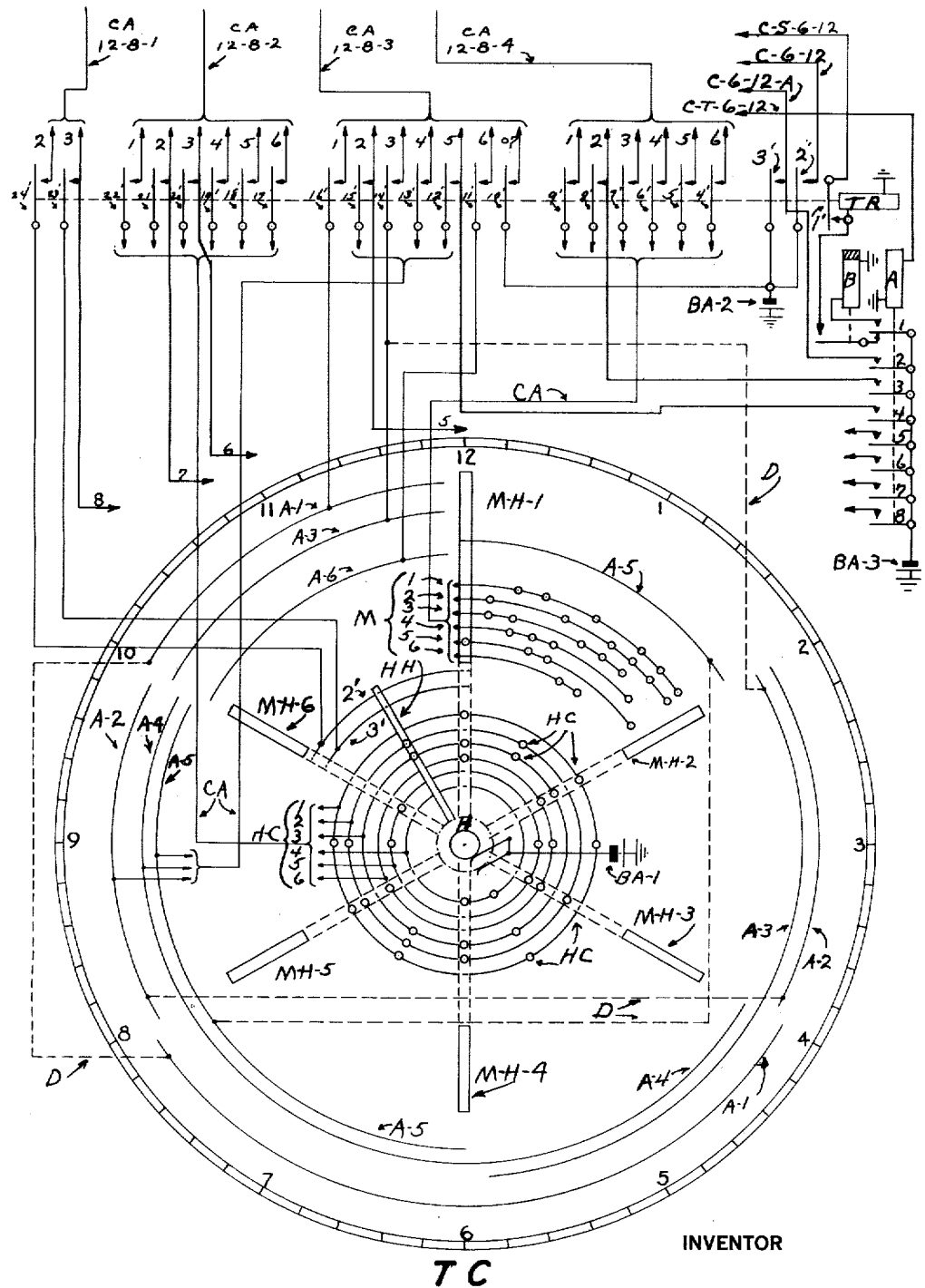

Fig. 12 shows schematically the "standard time" control apparatus and circuits for automatically superimposing the word "time," followed by the flashing of standard time on the monogram panels.

Figure 13:
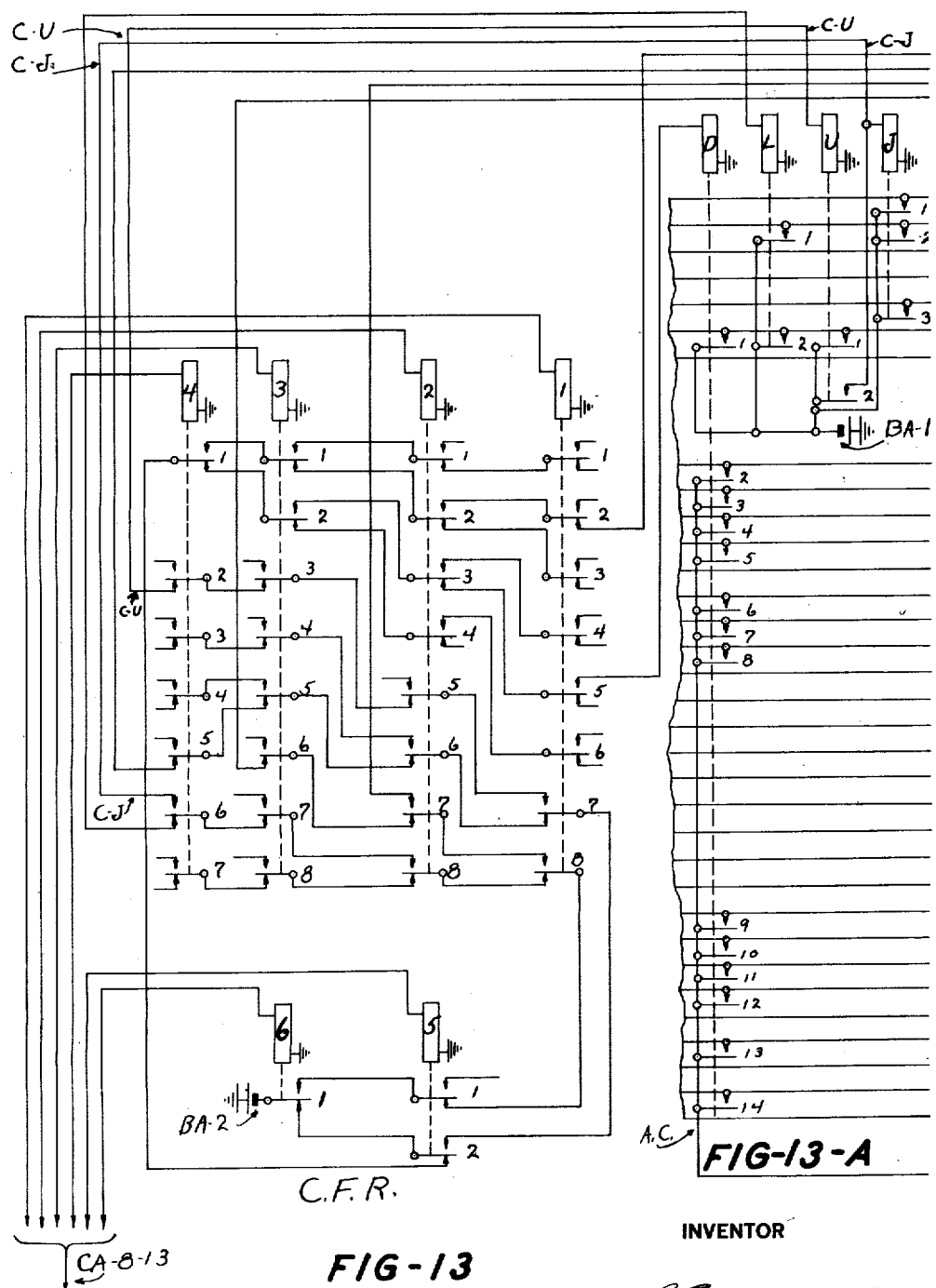
Figure 14:
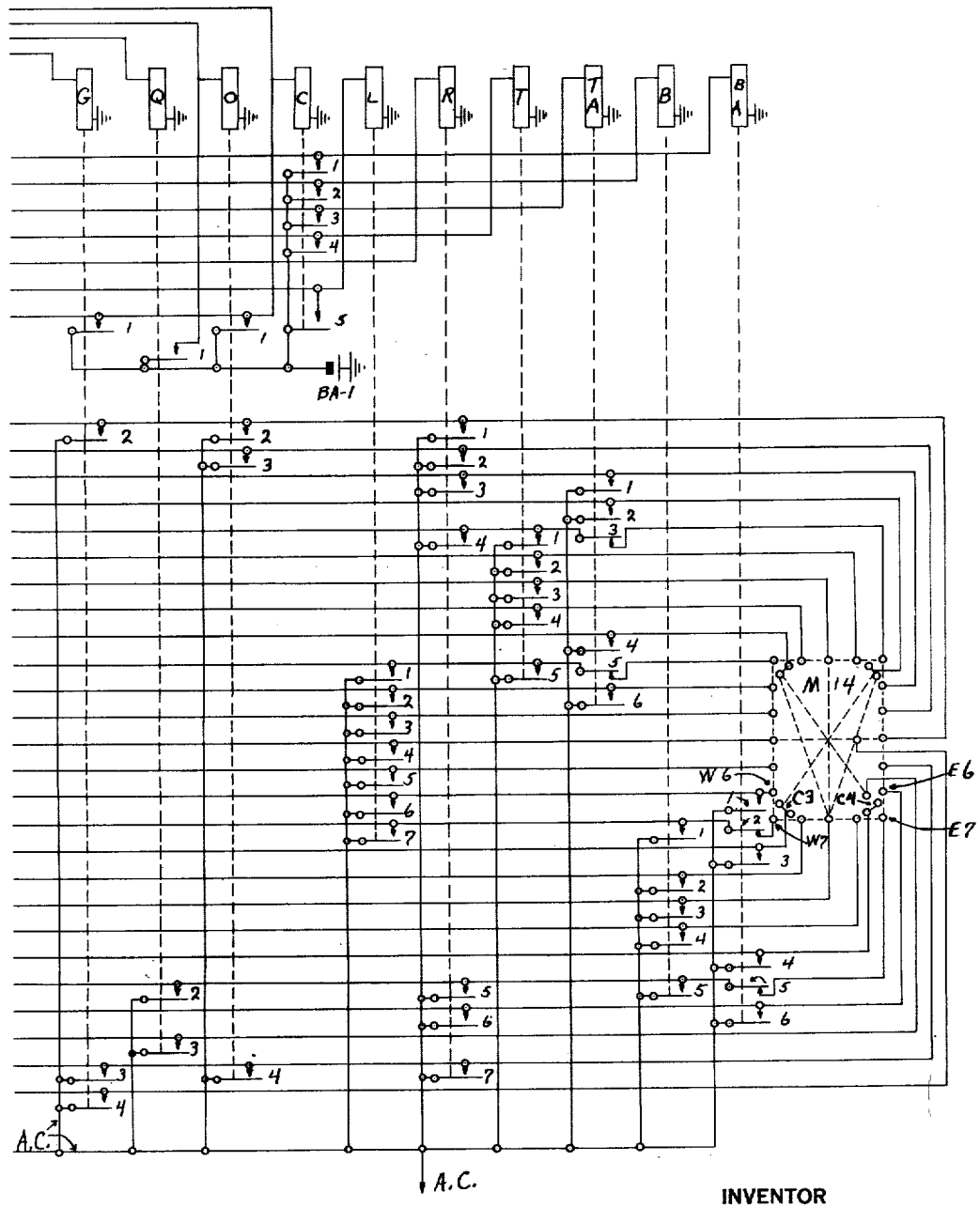

Figs. 13, 13A and 14 illustrate diagrammatically, one method of utilizing relay combinations for character forming purposes.

Fig. 15 is the circuit of a modification of Figs. 13, 13A, and 14. Herein is shown schematically a six coil multi-armature relay combination, capable of being operated automatically by electrical means, or manually to de-code and form original characters on the lamps of the monogram panels.

According to my electric display system, printing and/or running displays may be operated or alternately displayed on the same monogram panels, by the utilization of the same storage controller, a section of which is shown on Fig. 7. It will hereinafter be referred to as SC. In running displays, and during the process of storing characters, the rotor of SC is stepped intermittently, but in producing a printing display, this rotor remains stationary, and the selection of characters is made by an auxiliary drum selector, shown on Fig. 6. The drum selector will hereinafter be designated as DS.

The characters shown illustrated on the display panels of Fig. 10, are also illustrated as being stored on four rows of SC of Fig. 7. A sample message, using the words Good Cars, will be used to demonstrate the continuity of circuits.

The sample message Good Cars has a maximum of four letters each to accommodate the four panels of the display device. When it is necessary to extend the explanation beyond a monogrammic field of this size, a sample message containing the names of the forty-eight States will be specified. This would require a display field with a minimum of thirteen monogram panels, to accommodate the longest State name of Massachusetts.

*Transmission of code. Detail 4*

When remote control is used, all letters and figures are assigned a permutation code of combinations of impulses represented by two digits. For the most efficient operation, the combination of the lowest digits are so allocated as to favor and represent letters most frequently used in the printing art and in the following order; ETNOAHDISCRUM, etc. Instead of punching a tape to record and re-transmit the coded characters as used in some other systems of electric display, I accomplish the same result by transmitting the code to a storage controller by use of a standard telephone dial, as illustrated at D, on Fig. 1 (see Detail 8).

As is well known in teletype and automatic printing systems in which a code is used, the contacts of a five relay receiving combination prints 32 different characters. In my display system, there are 26 letters, 8 figures, (the 1 and 0 are repetitions), and various other coded instructions to be transmitted. By the addition of another relay in a combination such as above mentioned, 64 different designations are available. Therefore, six is the minimum number of receiving relays in use in the storage and also character forming parts of my improved electric display system.

It will be apparent to those skilled in the art, that in a transmitting system restricted to six receiving relays, working in conjunction with, and limited to a combination of any two digits of a standard telephone dial, that some method of re-coding and re-transmitting the original code must be provided when digits higher than six are used.

According to my invention, some two digit code combinations are automatically de-coded and re- coded at the distributor of Fig. 3, (see Detail 20), to codes containing from one to five digits, and re-transmitted to the receiving or storage relays of SC of Fig. 7. The coded instructions, set up on SC, is automatically transferred to the character forming relays of the monogrammic panels.

It will be noted that the digit 2 is appended to each original code designation. This number, while not a part of the code, is necessarily a part of the system. The reason that the digit 1 is not used as an appended number will be explained later in connection with the description of the application of this number (see Detail 15).

*Storage relays. Detail 5*

The first six relays act as storage relays for characters. They are mounted in one transverse row on the stator of SC of Fig. 7. Relay 07 is the hyphen storage relay. R and G are for storing characters in color. E is the end storing relay, and ST is the start storage relay. The function of these relays is to lock the brush switch directly under them and according to the permutations of the transmitted code. This row on SC is marked 1-Z of section Z. Automatic movement of the rotor of SC after the locking of certain brush switches, is explained under Detail 34.

As a modification of my system, if it is desired to eliminate the first station equipment comprising the dial transmitting remote control device, the brush switches of the storage controller may be manually manipulated by pressing down tab b, of armature extension arms 70 of SC of Fig. 7 according to the digits of the code. All locked brush switches rest in wiping contact with a companion contact segment 72 of SC. All unlocked brush switches remain on open circuit. SC is a combination storage transmitting controller, and when its transmitting feature is in operation, the locked brush switches, through segments 72 transmit the coded characters to the character forming relays (CFR), and panel color relays of the monogram panels of Fig. 10 (see Details 58 and 85).

*Code methods. Detail 6*

In my present invention, two distinct methods of re-coding and completing character forming operations on the monogram panels of Fig. 10 are disclosed. In method A, the code is changed at the distributor of Fig. 3 from two original digits, to a code containing combinations of from one to three of the first six lowest digits. Method B is a modification of method A and is so designed as to translate the original two digit code to one containing combinations of from one to five of the first six lowest digits.

Each monogram panel of the display apparatus of Fig. 10 is equipped with a six coil character forming relay capable of receiving and de-ciphering or translating the code of either method A or B into its original character and producing it on the illuminable devices of said panel. Code numbers of either method pass through the distributor of Fig. 3 in the same manner. CFR of both methods are explained under Details 48 and 49.

It is important to state, that whenever method A or B is used, the permutations of the transmitting code are limited to two digits. This is an integral part of the system. In actual practice, the apparatus will be designed for one code only. The choice is optional but the CFR of the monogram panels would have to be wired for the code adopted. The code according to method A is used throughout these specifications unless otherwise mentioned.

Code chart. Detail 7

In the following chart, the letters, numbers, and other character designations to be transmitted, are listed in column #1. The code digits to be dialed for characters of either method A or B are listed with their appended number 2, in column #2. The individual digits using from one to three of any six coils of the character forming relays of method A, energized by dialing code numbers of column #2, are listed in column #3. The individual digits using from one to five of any six coils of the character forming relays of method B, energized by dialing the code numbers of column #2, are listed in column #4. Columns #3 and #4 of Section one, represent the re-coded digits resulting from the initial code of column #2 passing through the distributor of Fig. 3. It will be noted that some of the code numbers do not require re-coding.

The code digits of column #2 of Section one are to be dialed only in transmitting instructions to the storage relays of SC only while the display apparatus is not in operation. It is to be noted that whenever a new set of characters are to be stored, it is necessary first to erase or obliterate the characters from SC. This is accomplished by dialing 0-0, either while SC is or is not in operation (see Details 41, 43 and 44).

The following is the code chart as just mentioned.

SECTION ONE

| Column #1 | Column #2 | Column #3 | Column #4 |
|---|---|---|---|
| For A | Dial 6-0-2 | 6 | 6 |
| For B | Dial 5-3-2 | 5-3 | 6-5-2-1 |
| For C | Dial 4-2-2 | 4-2 | 6-3-2-1 |
| For D | Dial 3-1-2 | 3-1 | 6-2-1 |
| For E | Dial 2-0-2 | 2 | 5-2-1 |
| For F | Dial 5-4-2 | 5-4 | 5-1 |
| For G | Dial 6-1-2 | 6-1 | 6-3-2 |
| For H | Dial 7-0-2 | 2-1 | 5-4-3-2-1 |
| For I | Dial 3-2-2 | 3-2 | 2 |
| For J | Dial 2-7-2 | 6-4-2 | 4 |
| For K | Dial 2-8-2 | 5-3-2 | 5-4-3-2 |
| For L | Dial 6-2-2 | 6-2 | 4-1 |
| For M | Dial 5-2-2 | 5-2 | 6-2 |
| For N | Dial 4-0-2 | 4 | 6-1 |
| For O | Dial 5-0-2 | 5 | 6-3-1 |
| For P | Dial 6-3-2 | 6-3 | 5 |
| For Q | Dial 7-6-2 | 6-2-1 | 6-3 |
| For R | Dial 4-3-2 | 4-3 | 6-5-2 |
| For S | Dial 4-1-2 | 4-1 | 6-5-4 |
| For T | Dial 3-0-2 | 3 | 2-1 |
| For U | Dial 5-1-2 | 5-1 | 5-4-1 |
| For V | Dial 6-5-2 | 6-5 | 1 |
| For W | Dial 6-4-2 | 6-4 | 5-4 |
| For X | Dial 3-7-2 | 5-4-3 | 3-2 |
| For Y | Dial 3-8-2 | 5-3-1 | 3 |
| For Z | Dial 4-7-2 | 4-3-2 | 3-2-1 |

The code chart for numbers is as follows:

| Column #1 | Column #2 | Column #3 | Column #4 |
|---|---|---|---|
| For 2 | Dial 4-8-2 | 4-3-1 | 6-5 |
| For 3 | Dial 5-7-2 | 5-4-1 | 6-5-4-1 |
| For 4 | Dial 5-8-2 | 5-4-2 | 5-4-3 |
| For 5 | Dial 6-7-2 | 6-3-1 | 5-2 |
| For 6 | Dial 6-8-2 | 6-3-2 | 6-5-4-3-1 |
| For 7 | Dial 7-3-2 | 3-2-1 | 3-1 |
| For 8 | Dial 7-4-2 | 4-2-1 | 6-5-4-3 |
| For 9 | Dial 7-5-2 | 5-2-1 | 6-5-1 |

SECTION TWO

The code digits of column #2 of this section are to be dialed only while setting characters up if the display apparatus is not in operation. The designations are listed under column #1. The code shown under column #2 of section two and section three, are the same for either method A or B.

| Column #1 | Column #2 |
|---|---|
| For yellow | Dial 1-1-2 |
| For green | Dial 1-2-2 |
| For red | Dial 1-3-2 |
| Return display to white | Dial 1-8-2 |
| Blanking a monogram panel | Dial 8-0-2 |
| For a hyphen in front of a character | Dial 0-7-2 |
| End of storing operation by dial | Dial 8-8-2 |

The code numbers of the following section (#3), are to be dialed only after a complete display is set up on the storage relays of SC of Fig. 7. The display apparatus may, or may not, be in operation when dialing the following instructions.

SECTION THREE

| Column #1 | Column #2 |
|---|---|
| For following designations | Dial these digits |
| Operate printing display | 8-7-2 |
| Operate running display | 9-7-2 |
| Test operation of control apparatus | 9-8-2 |
| Operate an auxiliary controller | 9-9-2 |
| Alternate in green and red | 1-4-2 |
| Alternate in yellow and green | 1-5-2 |
| Alternate in red and yellow | 1-6-2 |
| Alternate in green, red, and yellow | 1-7-2 |
| Return display to controller color | 1-8-2 |
| Stop operation of controller and display | 9-0-2 |

It is presumed that the printing and/or running code number has been dialed before "stop operation" code number 9-0-2 is dialed (see Detail 45). Code number 0-0-2 is the erase number to be dialed to clear all coded instructions off of the controller and set a new starting indication so as to prepare the controller for a new set of characters. This code number may be dialed at any time regardless of whether or not the controller is in operation.

Dialing of code. Detail 8

While the mechanical construction of the dial and its incidental selecting switches of Fig. 1, with their associated "off normal" springs are well known in the telephone art, it is necessary to briefly describe their functions in connection with my improved system of electric display. All switches are shown in their normal position, but off normal switches are shown in their off normal position, and will return to this position upon completing their functions.

To transmit coded permutations, the operator places control switch CS of Fig. 1 on its contact CS-B. An extension arm E of CS normally holds pilot light switch PS open, but when CS is moved towards contact CS-B, the extension arm E releases switch PS, and it connects battery BA-1 through the back contact of armature 1 of relay P, through red pilot lamp R to ground. Swith CS has also closed a circuit from battery BA-6 of Fig. 2, back contact of armature 2 of relay K, conductor C-1, winding of relay A, conductor C-2, back contact and armature 1 of relay T, remote control conductor C-1-2 to conductor C-1-2 of Fig. 1, switch EX, dial switch springs DS', switch CS, point CS-B, conductor C-4, winding of relay A, conductor C-5, winding of pilot light relay P, to ground. Relay A and relay P of Fig. 1, and relay A of Fig. 2 are now connected in series in a circuit susceptible to interruption by the opening and closing of the dial springs DS' of Fig. 1.

When attracted, armature 1 of relay P of Fig. 1 lights the green pilot lamp G, this is to be interpreted as a signal that the dial circuit is prepared for operation. After the code digits and the appended number 2 has been dialed, the circuit is so arranged that it is open at armature 2 of relay K of Fig. 2. This causes relay P of Fig. 1 to drop its armature, thus holding the red pilot lamp R lit until the transmitting operation has been completed. This is an indication that the dial must not be used until the red light is extinguished and the green light is again lit. It is intended that the instructions to the operator will read: Dial Only on Green Light. The yellow pilot lamp is for testing purposes and will be explained under Detail 99.

The slow to release feature of relay P prohibits its armature from dropping during the time impulses are being dialed. The current through the remote control conductor C-1-2 is automatically restored when the transmitted code has completed its operations. It is to be noted that when SC of Fig. 7 is to be cleared, the red pilot light will not become extinguished until the erase operation has been completed (see Detail 18).

*Minor switches. Detail 9*

As the four switches MS-1 and MS-2 of Fig. 1, and MS-2 and MS-4 of Fig. 2 are identical, only one, MS-1 of Fig. 1 will be described. A selector switch of this type is known in automatic telephone systems as a "minor switch." Digit storing being one of its main features makes it an ideal selector for use in the transmitting circuit of my invention. It is operated by a rotary pawl P attached to the armature of relay RO1. This is the rotary magnet which stepping impulses energize to move the ratchet over one contact point of wiper W for each impulse sent out by the dial. Release magnet RLSE-1 when energized, disengages pawl P and its holding pawl P' by the operation of its armature, thus restoring the wiper W to normal by the influence of spring S.

MS-1 and MS-2 of Fig. 1 are used only to operate the indicator lamps as a check for the operator. If it is desired to eliminate this feature from the system, it may be shunted out by connecting a jumper between points S-1 and S-2 of Fig. 1 without interfering with the dial circuit functions. It is to be noted that the wipers of all minor switches of Fig. 1 and figure 2 return automatically to their normal position as soon as the coded instructions reach the storage relays.

*The A&B relay. Detail 10*

Before tracing the circuit through MS-1 and its off normal springs of Fig. 1, the A&B relay combination will be briefly described. The operation of a combination of relays of this character embraces a fundamental principle of automatic telephony, and as it is incorporated in several circuits of my system, it will hereinafter be referred to as an A&B relay. The following description will be deemed as sufficient:

Relay A of Fig. 1 is susceptible to dial impulses, and relay B, due to its slow to release feature, is not. The energization of the A relay, causes the B relay to operate by an obvious circuit. Dial impulses synchronously vibrates the armature of relay A. This armature in turn repeats these impulses through its back contact to the armature of the relay B. The armature of the slow to release B relay is maintained on its front contact while these impulses are being transmitted and rotary magnet RO-1 of MS-1 is intermittently energized and moved the number of steps transmitted by the dial.

*False impulse. Detail 11*

As long as the control switch CS of Fig. 1 is on contact CS-B, or the dial is in use, the armature of relay A will return to its front position in time to re-energize relay B before it has had time to release its armatures. When for any reason the circuit through relay A is held open, its armature remains dropped. This tends to restore the armatures of relay B to normal. Due to its slow to release feature, its armatures do not drop until one false impulse has been sent through the back contact of the armature of relay A and through the front contact of armature 1 of relay B. How this false impulse is absorbed is explained under Detail 15.

*Off normal springs. Detail 12*

In conjunction with the A&B relay, the minor switch MS-1 and MS-2 of Fig. 1, and MS-2 and MS-3 of Fig. 2 and their respective off normal springs ONS-1 to 4, function chiefly to step the impulse circuit from one minor switch to the succeeding one. Let it be assumed that the letter C is to be transmitted. Its corresponding code number, according to Detail 7 is 4-2- (not including the appended number).

Upon dialing the first digit of the code, four impulses are sent through the A&B relay of Fig. 1. Dial mechanisms are well known in the automatic telephone art, and by dialing code digit 4, the dial springs DS' will open and close in rapid succession. The circuit thus interrupted and restored through operation of the A&B relay, effects the following circuit. At each interruption, the armature of the relay A of Fig. 1 drops, and sends current from battery BA-2, back contact of armature 1 of relay A, front contact of armature 1 of relay B, conductor C-6, closed contact 2, conductor C-8, through winding of relay C, conductor C-13, through winding of rotary magnet RO-1, to ground. These four impulses cause rotary magnet RO-1 to step the wiper W of MS-1 to its fourth contact. Locking pawl P' holds it in this position until released. During the time the wiper is being moved in response to this first impulse, the off normal springs ONS, are mechanically released by the right movement of lug L, on wiper W, and their contacts are all closed. Contact point 1, of ONS-1 is made before contact point 2 breaks its circuit, therefore during the time the wiper W is being moved to its first contact, the closing of contact points 1, shunts the circuit for the succeeding three impulses of the first digit (4) through conductor C-7, to front contact of (now attracted) armature 1 of relay C, to joint J, where it connects to conductor C-8. Relays C and RO1 are already connected in series, but only relay C is slow to release and therefore, does not allow its armatures to drop during the impulses of the first digit dialed. However, during the time consumed in advancing the dial for the transmission of the second digit of the code, relay C drops its armatures, and the succeeding impulses of the next digit dialed, now pass from battery BA-2 of Fig. 1, back contact of armature 1 of relay A, front contact of armature 1 of relay B, conductor C-6, contact 1 of ONS-1, conductor C-7, back contact of armature 1 of relay C, conductor C-14 point 2 on ONS-2, conductor C-15, winding of relay D, conductor C-16, winding of rotary magnet RO-2, to ground. This steps the wiper W-1 of MS-2 to its second contact. Points 5 on ONS-1 and ONS-2, in closing, prepares a circuit to the release magnet RLSE 1 and 2 respectively. When the B relay is caused to drop its armatures, the release circuit is completed from battery BA-3 of Fig. 1, back contact of armature 2 of relay B, conductor C-12, and through the release relays RLSE 1 and 2 to ground (see Detail 19).

*Indicator lamps. Detail 13*

It will be noted that there is an extra set of contact points 6 on ONS-1 and 2 of Fig. 1. These control the current to the indicator lamps through the following circuit. (It will be assumed that only the first digit 4 of the code has been dialed.) Battery BA-3, front contact of armature 2 of relay B, conductor C-20, back contact of armature 2 of relay C, conductor C-9, closed ONS-1 contacts 6, conductor C-10, wiper contact K, and wiper W and its fourth contact, cable CA to lamp L-4.

Although this circuit is now complete, it was held open until armature 2 of relay C dropped while transferring the circuits from MS-1 to MS-2 as previously traced. A similar circuit controls the second bank of indicator lamps and will light L-2 of the second bank only after armature 2 of the D relay has dropped. This arrangement avoids flashing of indicator lamps while the wiper is in forward motion. The opening of armature 2 of relay B, not only energizes the release magnets RLSE, but cuts off the current to the lamps, thereby preventing their flashing while the wiper is returning to normal position. It is to be noted that battery current may be used for indicator lamps and pilot lamps.

It is also to be noted that relays A of Figs. 1 and 2 operate in series, therefore the minor switches MS-3 and 4 of Fig. 2 are stepped ahead and released at the same time and in synchronism with MS-1 and MS-2 of Fig. 1 respectively. The contacts of the minor switches of Fig. 2 connect the proper relays of the distributor of Fig. 3, as will be explained in Detail 20.

*Erase dial error. Detail 14*

If after the desired code number, (always consisting of two digits), is dialed, and the indicator lamps reveal that an error has been made, the code thus far set up on MS-1 and MS-2 of Fig. 1, and MS-3 and 4 of Fig. 2 must be obliterated before the appended number 2 is dialed. This is accomplished by opening and slowly closing switch CS of Fig. 1. The dash pot DP, or similar retarding means attached to extension arm E of CS, mechanically prevents a rapid switch return movement that would correspond to a dial impulse. Switch CS in moving to CS-A, opens the dial circuit and drops the armature of the relay A, thus sending one false impulse through the front contact of the armature of relay B before this relay can release. On MS-1 and 2 of Fig. 1 this action would do no harm, but on MS-3 and 4 of Fig. 2 it would cause the apparatus to complete the operation through the distributor of Fig. 3 if some provision were not made to absorb or neutralize this false impulse. This will now be explained.

*Appended number 2. Detail 15*

Reference is now had to Fig. 2. It is assumed that the code digits 4 and 2 have been transmitted by the dial and MS-3 is on its fourth contact and MS-4 is on its second contact. Both off normal springs ONS-3 and 4 are in their closed position preparing the circuit for the reception of the appended number. If an error has been made at this stage, such as transmitting the wrong digit, switch CS of Fig. 1 is opened and the false impulse passes through contact point 9 of ONS-4 of Fig. 2, back contact of armature 1 of relay D, back contact of armature 1 of relay E, through winding of relay F, to ground.

Relay F by attracting its armature 1 completes a circuit from battery BA-6 of Fig. 2, closed contact 8 of ONS-4, conductor C-20, through the winding of relay E, front contact of armature 1 of energized relay F, through winding of relay F to ground, thus throwing relays E and F in series. This is as far as one impulse can progress, as by the opening of CS of Fig. 1, which caused this false impulse, the circuit through the A&B relay has opened, and the operation of the release magnets resulting, has set the wipers W of all minor switches MS-1 to 4 back to their normal position. All ONS springs are now open and no further impulses have been transmitted because the final setting relay G of Fig. 2 has not operated.

If the indicator lamps of Fig. 1 correspond to the first two code digits dialed, the appended number 2 is then dialed. The first impulse of this appended number has a result similar to that of the circuit just traced, but its second impulse would now go through the front contact of armature 1 of relay E, and through the winding of relay G to ground, thus completing the transmission of the code (see Detail 17, for further description of relay G). It should be apparent from the above, why the number 1 cannot be used for the appended number of the transmitted code.

It will be noted that some code numbers end in 0 (zero). This zero in numbers 2-0, 3-0, 4-0, 5-0, 6-0, and 7-0, is used only as a means for stepping the code through the second set of minor switches MS-4 of Fig. 2, so as to actuate the G relay when the appended number 2 of the code is dialed.

The several positions X-1, X-2, etc., of switch EX of Fig. 1, connects the dial circuit with other auxiliary apparatus of the system (see Detail 100). The test position of switch CS of Fig. 1 connects the dial circuit direct with a yellow pilot lamp Y. Test circuits will be explained under Detail 99.

*Display rack. Detail 16*

Before tracing the transmitting circuit through the distributor of Fig. 3, a brief description of the character token display rack at the first station (Fig. 1A) will be given.

This rack in practice will contain an indefinite number of horizontal rows. It is designed so that the number of verticle rows will be governed by the number of monogram panels in the display device. Slides SL are placed over each side of the display rack so as to condense its size whenever the number of display panels is less than the number of rows.

While a standard size display apparatus will probably call for at least 12 monogram panels, only four are shown throughout the drawings to illustrate more clearly the working of the system, in the space available.

A preferred form of mounting the character tokens (hereinafter called token) is shown at the right of Fig. 1E. It is so formed so as to provide a projection on its top end E1 bent in both directions. The back projection permits it to be hung on the bent in sides of the channel metal E2, shown more clearly in Fig. 1D. The front projection E-1 forms a convenient lug by which it may be handled. A light piece of angle metal E3 extends across the rack, forming an opaque screen and is so positioned that the tokens may be dropped behind it just far enough to hide the portion on which the code is printed, after the code numbers on the character portion has been transmitted and checked on the indicator lamps. A token T is shown hooked over the bent sides E2 of the channel metal in display position in Fig. 1E, and the token V is shown before and after dialing in Fig. 1B.

The token consists of a light metal stamping with the character printed on the top portion, and its code and appended number printed on the bottom. When a new display is to be transmitted to the storage relays of SC of Fig. 7, the copy is set up in the display rack with the tokens of characters, blank space, hyphen, color designations, or other coded instructions placed in their proper order. Each token is hung on its projection E2, and after the code number is dialed, the operator drops the token behind E3 of the rack, thus hiding the code number portion. This also indicates to the operator, the location on the rack of the last code number dialed.

The rack also furnishes the office with an exact copy or picture of the message set up on the storage controller SC of Fig. 7. Only the upper or character portions of the tokens are now in view.

The color tokens E5, and the hyphen token E6, of Fig. 1E, are of half size so that both designations may be placed on the same space on the rack if wanted. Holes or slots E8 are provided in E7 at the proper place to accommodate the bent portion of E6. These small color tokens are of the same color as that represented by their code number, and they are turned over as soon as transmitted to give proof that they have been dialed (see Fig. 1-C). The token designating "end of storing," E10, of Fig. 1E, is placed at the end of the last column used in the rack. It is of full length and this column is reserved for its exclusive use.

The left schematic view of Fig. 1E illustrates one horizontal row of the display rack upon which the copy is set up. It will be seen in Detail 24 that the stator of SC of Fig. 7 is divided into sections, and each section contains the same number of rows of brush switches and contact segments, as there are monogram panels in the display field. In the present illustration, the characters A-Blank space-V-8 fill one row of the display rack as shown on Fig. 1E, and occupy four rows of one section of SC as shown on Fig. 7. They also occupy four monogram panels as shown on Fig. 10. The tokens set up for a guide for the operator are also shown as designating various colors. The transmitting sequence of operation for this display is as follows: Dial 1-3: this will store on Fig. 7 on all rows of SC, the coded instructions in red, until changed by a different code number (see Detail 50).

The next letter set up on the rack is A, and as its code number is 6-0, this number is dialed. Next, dial 8-0. This allows a monogram panel to remain blank. It will be noted that the space before V, on Fig. 1E is occupied by a green token, 1-2. The next operation therefore is to dial this number. This will store the next and succeeding character in green until another color code number is dialed. Then dial 6-5 for the letter V, then dial 1-1, this changes the next character to yellow. Then dial 0-7 for hyphen, then dial 7-4 for the figure 8. This being all of the characters to be transmitted, as shown by the display rack, the operator now dials end storing code number 8-8. These characters and colors are now stored on the four rows of one section of SC of Fig. 7 as folows; A-hyphen, blank space-hyphen, (all in red), V-hyphen, (in green), 8, (in yelow). Color circuits are described more fully in Detail 50.

It is to be understood that the appended number 2 is to be dialed after each of the code numbers above mentioned, and according to the description previously given. It will be noted also that there is a provision in the code for a blank space (Detail 35), as well as a hyphen, (Detail 97). It is only necessary to mention here, that if a hyphen is desired, code number 0-7 is dialed. The hyphen will then only extend to the next panel of the display device. If a blank space is desired between letters or words of a message, blank space code number 8-0 is dialed. This results in the next monogram panel being left blank, but the hyphen will automatically be set up before, after, and across the blanked panel, thus lighting a continuous line of display elements from one panel, across the center of the display apparatus to the next monogram panel in use. The hyphen lamps will be of the dialed color.

*Relay G. Detail 17*

If upon completion of the dialing of the first two digits of a code number, the indicating lamps of Fig. 1, are found to check accurately with the two digits dialed, the appended number 2 is dialed, and the G relay of Fig. 2 is caused to operate. Its armature 1 forms a stick circuit from battery BA-5, back contact of armature 1 of relay K, conductor C-G-1, front contact of armature 1, and stick winding of relay G, to ground. Armature 3 of relay G, upon closing its front contact, sends current from battery BA-9, conductor C-2-4, to wiper strip K of MS-3, and wiper strip K-2, of MS-4, and by a branch circuit through relay J, to ground. Relay J is slow to pick up, and a fraction of a second elapses before its armatures are attracted. This allows current to flow through the contacts of the wiper switches, governed by wiper contacts K, and K-2 before it is caused to flow through the armatures of relay J. It is to be noted that the wiper segments K-1 and K-2, of MS-4, comprise two sections. When the second digit of the code containing any number from 1 to 6 is dialed, wiper W-1 will rest on K-1, but when the second digit is 7, 8, 9, or 0, W-1 rests on K-2. In the latter case, K-2 and relay J are energized at the same time, but if wiper W-1 is on upper segment K-1, current will be delayed through it until relay J has closed a circuit from battery BA-3, and the front contact of its armature 1, conductor C-G-2, front contact of armature 2 of relay G, conductor C-K-1, to wiper strip K-1. A branch circuit of conductor C-K-1 runs to sheet 3 and 4, and is marked C-2-3-4. The purpose of the delayed impulse sent over C-2-3-4 is to allow armatures of the distributor relays of Fig. 3 to become aligned to their proper circuits, previous to the reception of this impulse. Battery BA-4, through front contact of armature 2 of relay J, now energizes the K relay over an obvious circuit, while by opening its back contact, current is now removed from release magnets RLSE (see Detail 19).

Relay K, upon energization, causes its armature 2 to open the A relay circuit that has been fed through conductor C-1, as previously traced in Detail 8. The front contacts of armature 2 of relay K, and armature 3 of relay B, of Fig. 2, operate in multiple to send current to the motor control relay 6 of Fig. 6, over conductor C-C, through cable CA-2-6, when either of these armatures are on their front contacts (see Detail 26). Armature 3 of relay K of Fig. 2, opens a circuit that has run through conductor C-21, to armature 1 of relay A of Fig. 2.

Relay K. Detail 18

The front contact of armature 1 of relay K, closes a stick circuit for this relay, through its stick or auxiliary winding, conductor C-S of cable CA-2-6, to Fig. 6. One ground is made at points 5 and 6 of the switch of cam B of Fig. 6, whenever shaft 65, as described in Details 26 and 28, is rotating. One ground is made at armature 6 of relay A' of Fig. 6, whenever the erase mechanism, described in Detail 41, is in operation. A branch ground from Fig. 6, runs over conductor C-S-6-7, to front contact of armature 2 of relay B of Fig. 7, as described in Detail 36. Another branch of the stick circuit of relay K of Fig. 2, runs over conductor C-2-3-S, to ground at front contact of armature 3 of relay ERA of Fig. 3 (see Detail 46). These grounds are designed to provide an interlocking circuit, and also an indication to the operator as follows: Whenever relay K of Fig. 2 is held up by any of the grounds on its stick circuit, the red pilot lamp R of Fig. 1 will remain lighted. This is a warning to the operator that the instructions sent out by the dial have not been completed.

The opening of the back contact of armature 1 of relay K of Fig. 2, releases the stick circuit of relay G, connected by conductor C-G-1, allowing this relay to restore its armatures to their normal position. This releases the J relay, and cuts current off of wiper strip K and K-2. Relay K armatures have also dropped, but not until the slow release feature of the K relay has consumed a fraction of a second. Relays G, J and K, are slow acting for the following reasons: Relay G operates relay J, and relay J operates relay K, and relay K operates in turn to open the G relay circuit. It is obvious that this cycle of operation would not function properly without some retarding element introduced into the circuit. Further, armature 3 of relay G, causes certain of the relays of the distributor of Fig. 3 to operate through wipers W and W-1 of Fig. 2. The conductors connected to contacts of MS-3 and MS-4, run through cables CA-2-3 and CA'-2-3 respectively. Operation of relay J, causes current to flow over conductor C-2-3-4, and the newly aligned armatures of certain relays of the distributor of Fig. 3, from battery BA-3 of Fig. 2, front contact of armature 1 of relay J, and through front contact of armature 2 of relay G. The slow to pick up feature of relay J, serves its purpose by insuring a complete relay set up on the distributor of Fig. 3, before current from its armature 1 is sent through the new-aligned armatures of Fig. 3. Thus, the first digit dialed will lock one relay of the distributor, the second digit dialed will lock a second relay, and the dialing of the appended number, will send an impulse through this new circuit to the relays designated by the coded instructions.

Release circuit. Detail 19

The release relays RLSE 1 and 2 of Fig. 1 are operated whenever relay B drops its armature 2. This circuit originates at battery BA-3, back contact of armature 2 of relay B, conductor C-12, closed contact points 5 of ONS 1 and 2, and RLSE relays 1 and 2, to ground. As the wipers W and W-1, of Figs. 1 and 2, return to normal by action of their springs S, lugs L move ONS springs, thus opening their circuits.

Current for the releasing of RLSE relays 3 and 4 of Fig. 2, originates at battery BA-4, back contact of armature 2 of relay J, and runs through conductor C-26, back contact of armature 2 of relay B, conductor C-12, contact points 5 of ONS-3 and 4, through RLSE relays 3 and 4 to ground. The release relays of Fig. 1 will operate whenever relay B of Fig. 1 is released, but RLSE relays of Fig. 2, will not operate until both relays B and J of Fig. 2 are de-energized. This guarantees that MS-3 and MS-4 will not release until relay J has completed its functions.

The distributor. Detail 20

As my improved electric display system calls for a predetermined two digit permutation code, some automatic means are necessary to re-code the original two digit code to one with more digits. It is to be noted that if a code unrestricted as to digits were adopted, the relays of the distributor of Fig. 3 could be eliminated, but the operator would have to dial more than two numbers. Fig. 3 diagrammatically illustrates the circuits of the distributor, through which some of the code numbers are translated or re-coded before being sent to the storage relays of Fig. 7. The letter C, code number 4-2, the circuit of which has been previously described will be used. It is assumed that wiper W, of MS-3 of Fig. 2, is resting on its fourth contact, and wiper W-1 of MS-4 is resting on its second contact. Upon dialing the appended number 2, current is sent first through contact 4 of MS-3, through cable CA-2-3, to relay 4 on Fig. 3, to ground, causing this relay to pick up its armatures. After a split second elapses, current flows through contact 2 of MS-4 of Fig. 2, through cable CA'2-3, to trunk 2' of Fig. 3. The delayed impulse now comes over conductor C-2-3-4 to energize any of the attracted armatures of distributor relays of Fig. 3. Current is supplied to the trunks only momentarily, as it has been shown in Detail 17, that relay G of Fig. 2 soon drops its armature and opens its circuit. It is pointed out that the code number 4-2 is one that goes through the distributor without re-coding. It will give a clearer understanding if a code number requiring re-coding is traced, therefore let it be assumed that the letter X is to be transmitted. Its code number is 3-7, and as shown by column 3 of the code chart of Detail 7, it is re-coded at the distributor of Fig. 3, (according to method A), to 5-4-3. Upon dialing 3-7, wiper W of MS-3 of Fig. 2, rests on contact 3 and W-1 of MS-4, rests on contact 7 of MS-4.

It will be noted that the last four contacts of MS-4 are in line with the wiper strip K-2. This strip is multipled to strip K of MS-3, therefore upon energization by the action of relay G, current will immediately flow through both contacts 3 and 7' of MS-3 and MS-4 respectively. Contact 3 of MS-3 connects through cable CA-2-3 to relay 3 of Fig. 3 to ground, and contact 7' of MS-4 connects through cable CA'2-3 to relay 7' of Fig. 3 to ground. Relays 3 and 7' of the distributor now close all of their armatures and line up a circuit for current that will come over conductor C-2-3-4, as soon as slow to pick up relay J of Fig. 2 is allowed to operate, as previously traced.

Armature 3 of relay 3 of Fig. 3, by its front contact is connected direct to trunk number 3'. Armature 1 of relay 3 connects to trunk number 4' through its front contact, back contact of armature 3 of relay 8', and the front contact of armature 3 of relay 7'. Armature 2 of relay 3 connects to trunk 5' through its front contact, back contact of armature 4 of relay 8', front contact of armature 4 of relay 7'. Thus it has been shown how the initial code number 3-7, is translated or re-coded and energizing temporarily trunks 5-4-3. Trunks numbered 1', 2', 3', 4', 5', and 6', are connected through the back contacts of armatures of relay 1 of Fig. 3, through cable CA-3-7 to correspondingly marked storage relays of SC of Fig. 7, and the dialing of the original code number is completed when the storage relays lock their respective brush switches on the storage controller (see Detail 5). When numbers need re-coding, it is to be noted that only these numbers reach the storage relays after they have been re-coded. Any code number may be traced in this same manner, however it is to be noted that the wiring of the distributor of Fig. 3 is limited to the code of method A. A distributor will be designed according to the adopted code.

Relay 1 of Fig. 3 is a circuit routing relay and its function is to transfer color code numbers to their proper circuits. As all color code numbers commence with the digit 1, the relay 1 of the distributor will pick up upon the dialing of one as the first digit of the code, and the next digit dialed will be routed through front contacts of its armatures.

*Relay SET. Detail 21*

The relay marked SET of Fig. 4 is a transfer relay. Its function is to control all circuits running from the transmitting apparatus of the first station, to the storage relays of SC of Fig. 7 of the second station. It is automatically energized during an erase operation (see Detail 41). As current from the erase circuit is only momentary, latch L, attached to armature 1 of relay 88A of Fig. 4, locks all armatures of relay SET against their front contacts. When the operator has finished transmitting the characters of the new message, "end storing" code number 8-8 is dialed (see Detail 37); relay 88 of Fig. 4 now operates and current from battery BA-6, front contact of its armature 1 energizes relay 88A. This releases the latch L, attached to armature 1, and all armatures of relay SET are restored to their normal position, and rest on back contacts. This disconnects conductor C-2-3-4 at armature 4 but the slow to pick up feature of relay 88A, prevents opening of the armatures of relay SET before they have completed their functions. Coded instructions dialed after relay SET has been released will not reach the storage relays of SC of Fig. 7, but color instructions will reach color sequence relays. This circuit is explained under Detail 54.

*Control apparatus. Detail 22*

The storage transmitting controller SC, and the drum selector DS of Fig. 6, are used in stored character transfer operations from SC of Fig. 7, to the display device of Fig. 10. Before outlining details, a general description of the combination storage transmitting controller SC will be given as it bears an important part in my electric display system.

The entire circumference of SC, (a broken portion is shown on Fig. 7), is divided equally into sections. Only one row of storage relays are required. They are mounted in one transverse row across the top of the stator of SC, so as to allow their armatures and extension arms to actuate brush switches that are mounted in transverse rows on the rotor, and lock them in wiping contact with companion contact segments, mounted on the stator. As the locked brush switches are not released until erase code number 0-0 is dialed, (see Detail 41), the storage feature of SC is apparent.

Each section of SC contains the same number of rows of brush switches on its rotor, and the same number of rows of contact segments on its stator, as there are monogram panels in the display field. As there are only four panels used for an illustration on Fig. 10, there are only four rows shown in one section of SC of Fig. 7.

When a brush switch 71, in row 1-Z of the rotor is actuated, it rests in wiping contact with a companion contact segment 72, of the stator. The first six storage relays on the left, numbered 1', 2', 3', 4', 5', and 6', on SC, are used for storing coded characters. Storage relays R and G, are used in storing the color of said characters. Storage relay O7 is used in storing a "hyphen." Storage relays E and ST control the ending and starting of operations on the display device respectively. The segments in each row of the stator are connected to character, color and hyphen relays of their respective monogram panels, through relays of Fig. 8 (see Detail 65). The end and start segments are not controlled by relays of Fig. 8, but are connected direct to their respective end and start relays of Fig. 9, as explained in Detail 68.

A start segment 72 S-Z, under storage relay ST, is inserted only in the first row, and an end segment 72-E, is inserted only in the last row of each section of the stator, such as is shown on section A of SC of Fig. 7. The conductors shown as running in cables CA-8-10-1 to CA-8-10-4 of Fig. 8, and bus rings connected to conductors of cable CA-6-9, and all other buses of Fig. 9, are installed in a complete circle around the periphery of the stator of SC of Fig. 7. This also applies to relays shown on Fig. 8 and 9. This is designed for compactness and to conserve connecting wire.

Through action of multi-armature relays of Fig. 8, segments of row 1 of each section of SC, (excepting the start segment), may be selectively multipled to conductors of cable CA-8-10-1. Segments of row 2 of each section of SC may be multipled selectively to conductors of cable CA-8-10-2, etc. All sections of the stator of SC will be given a letter. Each row of a section is controlled by a row selecting relay of Fig. 8, designated by the same appended letter. Thus, all segments of section A of SC will be connected to monogram panels of Fig. 10, by multi-armatures of row selecting relays 1A, 2A, 3A, and 4A, of Fig. 8. These relays will in turn, be controlled by relay MRA and RA of Fig. 9. In a printing display, relay RA is operated by start relay STA, (see Detail 71). In running displays, all relays and sections above mentioned, are controlled in the same manner with the exception of relay RA (see Detail 92).

In printing displays, the rotor of SC of Fig. 7 containing the locked brush switches upon which the message is stored, remains stationary. The coded instructions are transferred to the monogram panels through operation of the drum selector of Fig. 6, by the row selecting relays of Fig. 8. The relays of Fig. 8 are controlled by the section selectors of Fig. 9. In running displays, the locked brush switches of the rotor of SC, pass in wiping contact with the segments of the stator of the first section ahead of those occupied with stored characters of the message (see Detail 86).

If the printing and running displays are to be alternated, the same control applies. Let it be assumed that a stored message containing the words Good Cars occupies locked brush switches of the rows of the rotor of SC now contacting segments of sections of A and B of SC (only section A is shown on Fig. 7). When displayed as a running display, these locked brush switches would pass in wiping contact with the segments of section C, and come to rest against segments of sections D and E of the stator. If the next is a printing display operation, segments of section E, followed by segments of section D, would be multipled to the monogram panels through the operation of DS of Fig. 6, as explained in Detail 58. If the next operation is a running display, the locked brush switches would be caused to make wiping contact with segments of section F, and come to rest on segments of sections G and H of the stator of SC. No matter where the rotor in the running message stops on the sections of the stator of SC, the selector relays of Fig. 9 will automatically pick up the next operation indicated by the transmitted instructions. The control apparatus is so designed that a message when once started to the display apparatus, must complete a predetermined cycle of operation, as explained in Detail 39.

In order to show the continuity of sections of SC, it is assumed that its stator is designed with 26 sections, with each section given a letter of the alphabet. Section 1 is designated by the letter A, (the only full section shown on Fig. 7), and section 26 would be designated by the letter Z. The sections will make a complete circle, and the first three sections reading down and off the bottom of Fig. 7, continue as sections A, B, C, etc. The last three sections coming in from the top would be sections X, Y, and Z, and this would complete the circle. Each section of SC of Fig. 7 requires one group of relays of Figs. 8 and 9 designated by the same appended letter.

Rotor of SC. Detail 23

The rotor of SC, partially shown on Fig. 7, turns in the direction of arrow A by suitable gearing 78, through a shaft supported by bearing 79, mounted on the frame 701, (only the right side partially shown). The parts of the rotor used in the storage feature of SC are brush switches 71, lock arms 74, latches 75, latch release rods 76 together with their clearing levers 19, (shown only on Fig. 6). These rods are used in clearing the stored characters off of SC in an erase operation (see Detail 32). The rotor of SC also includes the ratchet wheel 69-R, and main shaft of SC 69-S (Fig. 6). The collector rings 703 of SC, (Fig. 7), are supported by an insulated ring, (not shown), and connects bus bars 704, to which all brush switches 71 are commonly connected with the circuit coming through stationary brush at 702. Current is cut off of this circuit while the characters are being stored on SC (see Detail 60).

The rotor of SC is moved step by step by the mechanism explained under Detail 34, during the character storing process, and also when the running display is in operation, (see Detail 85). It is to be noted that the rotor of SC does not move during the operation of a printing display.

Stator of SC. Detail 24

Section A of SC is shown on Fig. 7. Its entire periphery is divided into sections containing the same number of rows of brush switches and contact segments as there are monogram panels in the display apparatus. The sections of the stator are permanently located so that a first row of segments, (row 1-Z) remains directly under the row of storage relays. The number of sections, and size of the controller is unlimited and will depend upon the length of messages usually used in advertising. If a running display is contemplated, the full capacity of SC cannot be used because locked brush switches may cover segments of all sections but one (see Detail 86).

A number of circumferentially disposed rings 73, (the shaded portions of which represent insulation), extend completely around the stator of SC of Fig. 7. Segments 72 are imbedded flush in these insulated rings so as to permit a sliding contact for the locked brush switches 71, of the rotor. All storage relays, together with their armatures and armature extension arms 70, are also stationary and so positioned as to actuate the desired brush switches resting in row 1-Z of the rotor, and be free to repeat this operation when the next row of brush switches is moved in place. During the display operation, the stored code of the brush switches will be transferred to the character forming and color relays of Fig. 10.

Brush switches of SC. Detail 25

The storage relays of SC of Fig. 7, are mounted in one transverse row across the stator. Their armatures, through their respective extension arms, actuate certain brush switches mounted on the rotor of SC, locking them in wiping contact with a companion contact segment mounted on the stator of SC.

All locked brush switches hook over latch 75. These are all released at the time of an erase operation. All unlocked brush switches remain on open circuit. In storing characters on SC, an indefinite number of brush switches, mounted in rows on the rotor, pass by the extension arms of armatures of the storage relays of the stator. The same number of rows of segments of SC and the number of monogram panels of Fig. 10, is maintained because each row of segments is selectively connected through relays of Fig. 8 to respective panels. The number of rows of brush switches must correspond to the number of rows of segments and panels. This is accomplished as follows; A start brush switch is inserted in the first row, and an end brush switch is inserted in the last row of each section. On the illustration of Fig. 7, the sample message A, Blank space, V, 8, is shown stored on locked brush switches of the rows of section A, as follows; In row 1-A, (the first, or lower row), start brush switch 71-S-A, and the locked brush switch under storage relay 6'. (6 is the code number of letter A). As "blank space" occupies the next row, it will have no brush switches locked thereon. Upon row 3-A, the letter V is set (code number 6-5). Upon row 4-A, brush switches 4-2, and 1 are set, as they represent the code for the figure 8. The end print brush switch is also locked on row 4-A.

It will be noted that certain brush switches under storage relays R and G of SC are locked against their segments. This is explained under Detail 51. Brush switches locked under hyphen storage relay 97, is explained under Detail 97. The action of SC in a printing display is explained under Details 58 and 64, and for action during a running display, reference is had to Detail 85.

Relay 6. Detail 26

All mechanism incorporated in the moving part of the control apparatus, is run by a motor M, of Fig. 6. Current to this motor is furnished preferably from A. C., through front contact of armature 2 and 3 of relay 6. This is a circuit breaker relay, equipped with heavy duty contacts, and is operated by several circuits as follows; A multiple circuit from battery BA-10, front contact of armature 3 of relay B, battery BA-6, and front contact of armature 2 of relay K of Fig. 2, through conductor C-C, and cable CA-2-6, to relay 6 of Fig. 6. This circuit will cause the motor to operate whenever the dial and transmitting mechanism is in use (see Detail 18). Also from battery BA-9, front contact of armature 7 of relay OR of Fig. 5. Battery BA-11, and armature 3 of relay OP, over conductor C-5-6-6. This assures motor operation during a printing or a running display. Also a motor control circuit on Fig. 6 from battery BA-12, contact points 1 and 2 of switch B of relay DB. This assures motor operation while the dimmer is in use (see Detail 72). Also from battery BA-12, front contact of armature 1 of relay 60. This assures motor operation while the main clutch is in operation.

A stick circuit from battery BA-11 of Fig. 6, front contact of armature 1, and stick winding of relay 6 to ground, at points 1 and 2 of switch of cam B, assures motor operation until each revolution of the main shaft 65 has been completed.

Relay 60. Detail 27

Relay 60 of Fig. 6 is the main clutch relay, and whenever one or more revolutions of the main shaft 65 is desired, this relay operates. It is controlled by several circuits and an impulse is sufficient to trip this clutch relay. One of its control circuits originates at battery BA-11 of Fig. 5, front contact of armature 2 of relay OP, over conductor CL-5-6. This assures the operation of this relay while the printing display is in use. Also, from points 3 and 4 of switch B of relay DB of Fig. 6, used while the dimmer is in use. Also from battery BA-4 of Fig. 6 front contact of armature 2 of relay 4, and conductor C-8. This assures the operation of relay 60, while the erase mechanism is in operation (see Detail 41). From battery BA-8, front contact of armature 5 of relay AD, over conductor C-8. This circuit is used during the running display and also while characters are being set up by the storage relays of SC of Fig. 7 (see Detail 34).

Main clutch. Detail 28

The clutch apparatus comprises a driving and a driven disc. Disc cam 61 is splined on and turns with the motor shaft 62 of Fig. 6, in a clockwise direction. The clutch or coupling pawl 63, is rotatably journalled on pawl disc 64, which in turn, is splined to main shaft 65, upon which various switch cams are secured, and so positioned as to actuate certain switch springs upon being rotated. Although the cam disc 61 is independent of pawl disc 64, it may cause one or more revolutions of 64 and main shaft 65, through the medium of the pawl 63. To obtain this action, an impulse is sent to clutch relay 60. The movement of its armature 1 disengages lug 63', integral with pawl 63, and allows this pawl, (by action of a spring, not shown), to engage the tooth on the moving cam 61. The schematic illustration of the bent portion of armatures engaging lugs of pawls 63' and 63A, shows insulation. Armature 1, of relay 60, by resuming its normal position, again engages the pawl lug 63' after one complete revolution. This throws pawl 63 out of engagement with cam 61, thereby arresting the movement of disc 64 and main shaft 65. Cam 61 now revolves freely with shaft 62 of motor M. Clutches, or couplings of this type are well known, especially in electric adding machine operation, and it is obvious that the number of revolutions desired, depend upon the length of time that relay 60 is energized.

Ratchets. Detail 29

It has just been shown how rotary motion has been imparted to main shaft 65 of Fig. 6. At its upper end, disc 66 is fixedly secured and rotates with shaft 65. Two connecting rods 68 and 69, rotatably journalled on disc 66 on a stud at adjustable bearing 67, impart reciprocating motion to rocker arms 68-A and 69-A respectively. As the functions of both rocker arms are identical, only one, 68-A, which governs the movement of the drum selector DS, will be explained.

Connecting rod 68 is rotatably journalled on 68-A, and so positioned as to limit its reciprocating motion to the rotary motion imparted by disc 66. Rocker arm 68A is pivotally mounted on shaft 68-S, while DS of Fig. 6, and the ratchet wheel 68-R are fixedly secured on said shaft. At the upper end of rocker arm 68A is a pawl 68-P pivotally secured to it and so positioned as to be engageable with the teeth of the ratchet wheel 68-R, whenever the arcuated arm 68-E is dropped behind 68-R, by energization of relay 68-M. Arm 68-E is integral with armature 1 of relay 68M. This relay is energized whenever it is desired to have ratchet 68-R step DS over one or more spaces. The schematic view of the armature and pawl, shows them maintained in their normal position by the spring S, mounted in any suitable manner on the frame (not shown). The pawl 68-P is wide enough to straddle both the arm 68-E, and the face of the ratchet wheel 68-R, therefore, when the outer end of 68-E drops behind the rim of 68-R, the pawl 68-P, engages a ratchet tooth and moves DS one step in the direction of the arrow A. The distance is predetermined by the width of a step of DS and the length of one half of the reciprocating motion of 68-A.

Adjustments may be made in the reciprocating movement of 68 and 68A, by changing the radius of adjustable pin 67, of disc 66. Arcuated arm 68-E is of sufficient length to support 68-P, during its entire reciprocating movement. The same combination of parts advances ratchet wheel 69-R, which governs the movement of SC, as illustrated on Fig. 6, upon energization of its clutch relay 69M. This is the relay that causes ratchet 69-R to step the rotor of SC over the space of one row during the storing operation (see Detail 34), and also during its operation in producing a running display (see Detail 85).

As designed, one revolution of the main clutch MC of Fig. 6 imparts reciprocating motion to the ratchet rockers sufficiently to step them over the distance of one tooth of the ratchet, and they in turn, selectively impart intermittent rotary motion to the rotor of either DS or SC, as illustrated on Fig. 6, therefore, any such movement imparted is limited to one revolution of the main clutch MC. Intermediate gearing between motor and clutch, governing this movement, is not shown in the drawings.

Dimmer clutch. Detail 30

At the right of, and geared to disc 64 of Fig. 6, is disc 64A. When the dimmer DM is used, coupling pawl 63A, causes the rotation of shaft 65-A in the manner just described. Cam C is caused to revolve through gearing 65-B. This imparts reciprocating motion through connecting rod CR, to the wiper arm W of DM of Fig. 6, which causes the display on the monogram panels of Fig. 10 to gradually appear and then gradually disappear. The dimmer is more fully explained under Detail 72. The ratio of gearing of 65-B and 65-C of Fig. 6 is preferably four to one, so that the time consumed in operating DM will be equal to four revolutions of shaft 65-A.

Erase clutch. Detail 31

It will be observed on Fig. 6, that rocker arm 69A has another pawl 6P, pivotally mounted on its upper end in addition to 69-P. The reciprocating movement of this pawl is diagrammatically illustrated as being restricted to a horizontal plane, by means not shown. The latch at the outer end of 6P is engageable with the latch on armature 1 of relay 69E. This armature is pivotally mounted on a bifurcated connecting rod 12, which in turn is pivotally mounted at 13 to a suitable bearing fixedly secured on the frame, (not shown), and is bifurcated to straddle a bi-grooved collar 14, which is slidably mounted on the controller shaft 69-S. Pins 16, rigidly secured to 12, idle in the left groove 17 of the bi-grooved collar 14. When it is desired to obliterate or erase all characters from SC, erase clutch relay 69E is energized, (Detail 41), and attracts its armature 1, causing it to engage pawl 6P on the return half of a reciprocating movement.

Thus, armatures 1 and 12 move to the left sufficiently to cause the bi-grooved collar 14 to impart a left movement to the base of levers 19, which are pivoted at 20 on stud 21, which in turn is fixedly secured to the frame of SC, (not shown). The pins on the lower end of the lever 19, idle in the right groove 18, of collar 14. The left movement of collar 14 imparts a right movement at the upper end of 19, sufficiently to impart lateral movement to release rods 76 (shown on Figs. 6 and 7). Coil spring 15, mounted on the shaft 69-S of Fig. 6 compresses against collar 69-S-a, secured to shaft 69-S, and returns the collar to its normal position after an erase operation.

Unlocking rods. Detail 32

As will be shown in connection with Fig. 7, there are as many unlocking rods 76, as there are rows of brush switches. They are all mounted on the rotor of SC. Lever 19, (as shown on Fig. 6), may be arcuately flanged at its upper end to cover several of the ends of the unlocking rods 76, therefore the number of levers 19 required will depend upon the size of the flange, (not shown), of 19.

By energizing relay 69E, the engagement of its armature 1, of Fig. 6, with reciprocating pawl 6P, will move all of the levers 19, sliding unlocking rods 76 to the right to unlock and restore all of the locked brush switches around the periphery of the rotor of SC to normal, by engaging and moving all of the tops of latch levers 75' of Fig. 7 to the right. These latches are pivoted in the center and this movement causes the lower or latch end to move to the left, thus disengaging any brush switch arm 74 that has previously become locked over latch 75. SC is now cleared and is ready for the storing of a new set of coded instructions.

As illustrated on Fig. 6, swich 69G is opened whenever an erase movement has taken place. One of the unlocking rods 76, operates this switch (see Detail 41 for circuit). It is to be noted that only one lever 19, is shown on Fig. 6. In actual practice there will be enough levers 19, to move all rods 76. The lower ends of the levers 19 will idle in that portion of the right groove of the bi-grooved collar 14, directly under their respective bearings 20, instead of at the side of 14 as diagrammatically illustrated on Fig. 6. It is also to be noted that the main shaft 65 and attached cam switches will continue to revolve as long as clutch relay 60 is energized, and also shaft 65 may revolve independent of, or in conjunction with apparatus controlled either by clutch relays DB, 68M, 69M, or 69E. These relays however, are so electrically interlocked in their circuits, that only one at a time can operate in conjunction with the main shaft 65.

There are two occasions when it is necessary to obliterate coded characters from the locked brush switches of the rotor of SC of Fig. 7. First; when it is desired to set up a new set of characters, (see Detail 41, 43, and 44), and second; when an error is made in transmitting the coded characters to the storage relays of SC (see Detail 47).

Relay AD. Detail 33

Whenever the rotor of SC, or its erase mechanism is to be operated, the movement is controlled by advance relay AD of Fig. 6. It is operated by three distinct circuits as follows; First; from battery BA-9 of Fig. 5, front contact of armature 4 of relay OR, front contact of armature 7 of relay RU, conductor C-AD-5-6 of Figs. 5 and 6, back contact of armature 4 of relay 6, main winding of relay AD, conductor C-2 to ground at either the back contact of armature 5 of relay A', or front contact of this armature, conductor C-3, and points 2 and 3 of the disc switch at RS of Fig. 6, as described in Detail 47. This switch closes its points to ground relay AD at all times that SC is not in a proper start position.

The second circuit to operate relay AD is from battery BA-2 of Fig. 5, back contact of armature 2 of relay P, back contact of armature 3 of relay RU, conductor C-ER'-5-6 of Figs. 5 and 6, front contact of armature 4 of relay A' of Fig. 6, and the same ground circuit as just described.

The third circuit comprises a delayed impulse, from battery BA-2 of Fig. 7, through the A&B relay at the top of this figure, conductor C-AD-6-7, back contact of armature 4 of relay 4 of Fig. 6, through winding of relay AD, to the same ground as described above.

Whenever relay AD is energized, an auxiliary circuit holds it up until one revolution of the main shaft 65, of Fig. 6, and its attached cams has been started. This circuit originates at battery BA-6 and runs through front contact of armature 1 of relay AD, through its auxiliary winding, conductor C-7, points 2 and 3 of switch of cam A, to ground. As cam A completes its first quarter turn, its switch points separate, thus releasing this holding circuit of relay AD. The clutch explained in Detail 27 insures completion of one revolution of shaft 65.

Armature 2 of relay AD energizes clutch relay 69M. This relay causes the rotor of SC to be stepped row by row while storing characters and also while a running display is being produced. Relay 69M also moves the rotor to its proper erase position, as explained in Detail 47. It will be noted that current for armature 2 of relay AD, comes from battery BA-4 and back contact of armature 2 of relay 4. Relay 4 is only in use during an erase operation, and these circuits are in interlocking electric relation in a manner to prevent relay 69M, and the release relay for the erase mechanism, 69E, from being operated at the same time.

As the ground which completes the circuit of relay 4 is only connected at switch points 1 and 2 of disc switch RS of Fig. 6, whenever the rotor of SC is in its proper erase position, it is evident that as soon as relay 4 is energized, it will disconnect current to relay 69M, thus stopping the rotor of SC. Back contact of armature 3 of relay AD will energize erase clutch relay 69E through conductor C-5, and a circuit originating at battery BA-5 and front contact of armature 3 of relay 4. One of the electric interlocking circuits described in Detail 36, originates at battery BA-7 of Fig. 6, and runs through front contact of armature 4 of relay AD, through conductor C-G-6-7 of Figs. 6 and 7, to relay C of Fig. 7. This relay when energized, opens the common ground circuit of all storage relays, thus preventing their operation while the rotor of SC is in motion.

*Stepping of rotor of SC. Detail 34*

Reading from the left on Fig. 7, the first six storage relays are for coded characters. After they have been selectively energized by their respective digit impulse, and lock up a brush switch in the row directly under the row on which the storage relays are mounted, the rotor of SC is caused to be automatically stepped over until the next row of brush switches is directly under the storage relays.

As the functions of storage relays are the same, only one, that of number 4' will be explained: It is assumed that this relay has been energized by the impulse over conductor C-2-3-4 coming at the end of the dialing of code number 4-0, (for the letter N according to the code of Detail 7). The top armature T-1, and its lower armature L-1 are now attracted for the length of time the impulse of conductor C-2-3-4 remains.

The movement of armature L-1 and its extended arm 70, causes brush switch 71 of the rotor to lock against segment 72 of the stator in row 1-Z of SC of Fig. 7. Arm 74, integral with this brush switch, catches over latch 75, and remains in this locked position until all switches are released as described in Detail 32. A locked brush switch is shown under storage relay 4', in row 4-A of SC.

The movement of armature T-1 connects battery BA-1 through its lower or operating contact with conductor C-1, to relay A and ground. This forms an A&B relay combination, and produces a delayed impulse as explained in Detail 10. When storage relay 4' becomes de-energized, this delayed impulse reaches relay AD of Fig. 6, over conductor C-AD-6-7, and the rotor of SC is stepped over one row for reception of the next coded character. It is to be noted that top armatures are not required on the hyphen, color, end, or start storage relays as the rotor is not stepped after any of these relays are operated.

*Relay 80. Detail 35*

A branch circuit reaches relay A of Fig. 7, over conductor C-3-7. This circuit comes into use when it is desired to blank one of the monogram panels. Its respective row of brush switches on SC must therefore be blanked. In the sample message of Fig. 1E, it is shown that code number 8-0 is to be dialed for a blanking operation. Relays 8 and 0' of the distributor of Fig. 3, line up a circuit so that when the impulse comes over conductor C-2-3-4, it will reach relay A of Fig. 7 through conductor C-3-7. Relay A drops its armature as soon as this impulse ceases, and a delayed impulse reaches the relay AD of Fig. 6, and the rotor is stepped over one space.

*Interlocking. Detail 36*

Two electric interlocking circuits are provided in the movement of SC of Fig. 7. The first one prevents the storage relays from operating while the rotor of SC is in motion, by opening their common return circuit at armature 1 of relay C of Fig. 7. This relay is governed by armature 4 of advance relay AD of Fig. 6, by a circuit over conductor C-G-6-7, and is energized whenever the rotor of SC is in motion.

The second interlocking circuit is provided by the operation of the top armatures of the character storage relays of SC of Fig. 7. When these armatures are moved to their operating contacts, they actuate the A&B relay, the result of which has been described in Detail 33, therefore, the rotor of SC cannot move as long as one of the character storage relays remains energized.

It is intended in actual practice, that the armature T of Fig. 7 will be attached to, or near armatures L. These circuits are schematically shown on Fig. 7 as having two separate armatures for the sake of clearness.

*Relay 88. Detail 37*

According to the code of Detail 7, the number 8-8, designates "end storing." On Fig. 1E, the token marked END 88 is hung in the extreme right column after the last character token of the last row of the display rack. This code number must not be dialed until after the complete message set up on the rack, has been transmitted and set up on SC by the storage relays. The proper relays of the distributor of Fig. 3, line up a circuit so that when the impulse of conductor C-2-3-4 is sent, it energizes relay 88 of Fig. 4 through cable CA-3-4, raising all armatures of relay 88.

Armature 2 of relay 88 of Fig. 4 breaks the stick circuit of color selecting relays 11, 12, and/or 13 (see Detail 50), returning any energized color relay to normal position. Armature 1 of relay 88 energizes slow to pick up relay 88A, from battery BA-6. Action of this relay trips the mechanical latch L, which holds armatures of relay SET, thus restoring all armatures of relay SET to normal position (see Detail 21).

Storage relay E. Detail 38

Armature 3 of relay 88 of Fig. 4 lines up the circuit so that the impulse of conductor C-2-3-4, (Detail 17), runs in conductor C88 of cable CA-4-7, to the end storage relay E of SC of Fig. 7. Code number 8-8 is not dialed until after the entire message has been stored on the rows of brush switches of SC, and the rotor has made its final step. As storage relay E must lock its brush switch in the last row of stored characters, instead of in row 1-Z of SC, the extension arm 70E, of the armature of relay E is elongated to extend to its end brush switch in row 4-A of SC. In actual practice, end storage relay E would be positioned ahead of the other storage relays the distance of one row, and an armature extension arm of the usual length would be employed.

It is to be noted that storage relays 87, R, G, and ST, operate brush switches in row 1-Z of SC of Fig. 7. They are not equipped with stepping or top armatures T, and therefore will not move the rotor of SC during the storing process. During the operation of the printing display, the rotor of SC does not move, and only one end segment, such as 72-E, now in contact with end brush switch 71-E-A, is the one in use. It is connected through conductor C-E-7-8-A, to end relay EA of Fig. 9 (the only end relay in use in a printing display).

In producing a running display, the rotor of SC of Fig. 7, containing all brush switches, receives step by step motion. At the end of the running operation, the rows of brush switches containing the characters of the message, may be left in a different circumferential location on SC. The selector circuits of Fig. 9 are so designed that they will automatically pick up these occupied rows from its new location. For operation of the end relay of Fig. 9 in running displays, see Detail 90.

Cycle of operation. Detail 39

It will be noted under Detail 42, that the storage relay ST, automatically locks its start brush switch, 71-S-Z, in row 1-Z of SC of Fig. 7, after a previous message has been erased from the brush switches of SC. Storage relay E establishes the final limit of the new message in row 4-A of SC, as just explained. In actual practice, an indefinite number of characters will be stored on the locked brush switches in rows of several sections of the rotor of SC, before storage relay E is operated. The locked start brush switch ST, on the rotor of SC, is also moved during the storing process, and maintains its position in the first row of brush switches, and at all times at the head of the message.

The transmission to the monograms of Fig. 10, of the characters stored on the rotor of SC, between the energized start and end segments of the stator of SC, constitutes a cycle of operation. If the message is to be produced as either a printing, or a running display, the cycle ends at the completion of either operation. If used only as a printing display, the cycle is completed when the entire message has been run through the drum selector DS. The drum selector makes one revolution for each occupied section of the storage controller SC of Fig. 7.

The operation of DS is explained under Details 58 and 64. If it is desired to exhibit the message as a running display, the cycle is completed as soon as the entire message runs completely through all of the monogram panels (see Detail 85). When standard time is incorporated in the system, it is caused to be produced after either a printing or running display. If the printing and running display are to alternate, the circuit is designed so that standard time will preferably be displayed only after a printing operation. This however, is dependent upon the operator and is optional.

Operation clocks. Detail 40

The control apparatus is designed to be turned on and off by a time clock, schematically shown as OTC of Fig. 5. When the time clock turns the display "off" while the message is being displayed, means are provided to sustain the operation of the control apparatus until after a cycle of operation has been completed (see Detail 62). This provision also assures that when OTC cuts "on," the message will start from the beginning. When the message has once started from SC to the monogram panel display device, nothing can interrupt the circuits until a cycle of operation has ended. When it is desired to operate the display in the day time, the color most adapted to daylight operation is automatically cut in use. Connections to initiate this circuit is shown taken off of back contacts of the armature of OTC of Fig. 5. Preferably, this circuit would run to an auxiliary time clock OTC', (not shown), which would control the color of the display apparatus during certain daylight hours. As red or yellow have the highest daylight visibility, either one of these colors, or both, would be incorporated in the circuit connected to this auxiliary time clock.

Clearing SC. Detail 41

When the display apparatus is not in operation, and it is desired to clear all coded instructions off of the brush switches of the rotor of SC of Fig. 7, code number 0-0 is dialed. Relays 8 and 8' of the distributor of Fig. 3 line up a circuit for the impulse coming over conductor C-2-3-4, through conductor C-3-5 of Figs. 3 and 5, back contact of armature 5 of relay P of Fig. 5, back contact of armature 2a of relay RU of Fig. 5, conductor C-5-6-A', to erase relay A' on Fig. 6, and to ground.

The circuit to initiate the erase mechanism operation, originates at battery BA-2, through back contact of armatures 1 and 2 of relay P of Fig. 5, back contact of armatures 2 and 3 of relay RU. As the present description erases characters from the locked brush switches of the controller SC of Fig. 7, while SC is at rest, relays P and RU of Fig. 5 are not now in operation, therefore relay A' of Fig. 6 becomes immediately energized.

Front contact of armature 3 of relay A', closes a circuit through relay 4, conductor C-4, switch points 1 and 2 of disc switch RS, to ground. This switch is only grounded at the end of each section of SC, or when the rotor of SC is in its proper starting position, as illustrated in Fig. 6. This is also the proper stopping position of SC. Relay 4 now operates, and front contact of its armature 1 sends current over conductor C-4-6 to energize relay SET on Fig. 4 (see Detail 21). Front contact of its armature 2, sends current from battery BA-4, through conductor C-8, to energize clutch relay 60 (see Detail 27.) A circuit from battery BA-5, through front contact of armature 3 of relay 4 now runs to erase clutch relay 69E.

The operation of relay 69E is described under

Detail 31, and when unlocking rods 76 of SC cause switch 69G, (shown on Fig. 6), to open, it opens the stick circuit of relay A', causing it to drop its armatures.

Relay ST. Detail 42

An impulse is now sent from battery BA-1, back contact of armature 1 of relay A' of Fig. 6, front contact of armature 1 of relay B', conductor C-6-7, to energize the start storage relay ST (shown only on Fig. 7). This relay operates automatically, and by the circuit just traced, only after SC is cleared of all coded instructions. Its extension arm 70 causes brush switch 71-S-Z, to lock against segment 72 S-Z, in row 1-Z of SC of Fig. 7, thus storing the start circuit in the first row of a section of brush switches on a cleared controller. The function of this start segment will be explained in Details 68 and 92.

Erase running display. Detail 43

When it is desired to clear SC while it is in operation, (as used in producing a running display), the operator dials 0-0 in the usual manner. As soon as the cycle of operation is completed, relays P and RU of Fig. 5 drop their armatures, (see Detail 62), thus closing the circuit to erase relay A' of Fig. 6, resulting in obliterating all coded instructions from the locked brush switches of the rotor of SC, as explained in Detail 41.

Erase printing display. Detail 44

When a printing display is in use, SC of Fig. 7 remains stationary, and in its proper start, end, and erase position. As soon as DS of Fig. 6, (see Detail 64), completes its cycle of operation, relays P and RU of Fig. 6 drop their armatures. This completes the circuit to relay A' of Fig. 6, and if erase code number 0-0 has been dialed, the erase circuit explained under Detail 41 now operates.

Relay 90. Detail 45

Relay 90 of Fig. 5 operates the mechanical latches L1 and L2, which hold all armatures of relays 87 and/or 97, against their front contacts.

When it is desired to stop the display from the office or first station, "stop operation of display" code number 9-0 is dialed. The delayed impulse of conductor C-2-3-4 now runs through front contact of armature 1 of relay 9 of the distributor of Fig. 3, back contact of armature 13 of relays 8' and 7', front contact of armature 2 of relay 0', conductor C-90, cable CA-3-5 of Figs. 3 and 5, to relay 90 of Fig. 5 and ground. Relay 90 now trips its mechanical latches, and armatures of relays 87 and/or 97 cut off operating current to relays P and RU respectively. As soon as the cycle of operation is over, and the stick circuit of relays P and RU is broken, as explained in Detail 62, these relays drop their armatures and all operations of the display apparatus ceases.

A branch circuit of relay 90 of Fig. 5, from battery BA-2, front contact of armature 2 of relay A' of Fig. 6, over conductor C-5-6 whenever this erase relay A' is in operation. A branch connection to conductor C-90 comes from battery BA-1 of Fig. 3, front contact of armature 2 of relay ERA, whenever relay ERA is energized. Thus, when code number 0-0 is dialed when the display apparatus is in operation, the action of armature 2 of relay ERA, as described in Detail 46, releases the mechanical latches of relay 90 of Fig. 5 so that relays P and RU release their armatures at the end of a cycle.

Relay ERA. Detail 46

When erase code number 0-0 is dialed while the display apparatus is in operation, the resulting impulse sent over conductor C-3-5 of Fig. 3, will not reach erase relay A' of Fig. 6, because either or both relays P and RU of Fig. 5 would be energized. It is necessary therefore, to store this impulse so that when the circuit is lined up to reach relay A' of Fig. 6, by the releasing of relays P and RU, current will reach the erase relay A' and cause its operation at the proper time.

Relay ERA of Fig. 3 is designed to take care of this feature. A branch circuit of conductor C-3-5 runs through relay ERA, and through conductor C-3-6 of Figs. 3 and 6, to ground, at back contact of armature 7 of relay A' of Fig. 6. Current of battery BA-1 of Fig. 3, through front contact of armature 1 of relay ERA, not only provides a stick circuit for this relay running over conductor C-3-6 to the same ground just mentioned, but by a branch circuit at joint J, current is maintained in conductor C-3-5 so that when relays P and RU of Fig. 5 drop their armatures at the end of a cycle of operation, this circuit will energize relay A', the erase relay of Fig. 6. The balance of the erase operation is the same as described in Detail 41. A branch of the stick circuit for relay K of Fig. 2 is provided by front contact of armature 3 of relay ERA of Fig. 3, over conductor C-2-3-S. This is provided so that the dial apparatus cannot be used until the erase operation has been completed (see Detail 18).

In the erase circuit, provision is made to obliterate characters from SC of Fig. 7, if a mistake is made by the operator while dialing the coded instructions. By dialing 0-0, all coded characters will be cleared off of SC, as will now be explained.

Clearing dialing error. Detail 47

Detail 14 discloses a circuit whereby the operator may erase or obliterate the first two digits of a transmitted code before dialing the impulses of the appended number 2. After the appended number has been dialed and a mistake is discovered, all characters so far set up must be wiped off of the storage controller and a new start made.

If the rotor of the controller SC is not in a proper starting position when this mistake is discovered, the dialing of erase code number 0-0 will automatically step the rotor over the correct number of rows so that the start brush switch will automatically be set in the first row of brush switches in a new section of the rotor of SC, and opposite row 1-Z of the stationary section of the stator.

As relays P and RU are de-energized during the storing operation, erase relay A' of Fig. 6 immediately operates when 0-0 is dialed. Current through conductor C-ER'-5-6, as explained in Detail 41, runs through front contact of armature 4 of relay A' of Fig. 6, back contact of armature 4 of relay 4, through relay AD, conductor C-2, front contact of armature 5 of relay A', conductor C-3 to contact 3 of the switch of disc RS. (This disc is splined on the shaft of SC as shown on Fig. 6.) Its projections P are so located that they will close its switch contacts 1 and 2, and open contacts 2 and 3 each time a section of SC reaches a new start position, which is, each time a start brush switch is in contact with a start segment of the stator of SC. If a projection P, of RS is not in position to close its contacts 1 and 2, it is an indication that the rotor of SC is not in a proper erasing position and the rotor continues its step by step rotation.

The step by step motion is caused by relay AD of Fig. 6 operating through switch points 2 and 3 of disc switch RS. When the rotor reaches the proper starting position, the switch is operated by one of the projections P, and points 2 and 3 open, and points 1 and 2 close a circuit from relay 4 to ground, through conductor C-4. A circuit from battery BA-5, front contact of armature 3 of relay 4, back contact of armature 3 of relay AD, conductor C-5, erase clutch relay 69E, to ground, will operate the erase mechanism explained under Details 31 and 32.

De-coding. Method A. Detail 48

In Detail 6, two code methods are mentioned. The operation of character forming relays, (CFR), according to method A, is as follows: Refer now to Fig. 13, 13A, and 14, wherein certain of the electro-magnet coils 1, 2, 3, 4, 5, and 6, of the character forming relay, operate their multi-armatures in response to current sent from the segments of one row of SC of Fig. 7. When one or more of these coils operate, (according to the coded instructions set up on rows of SC), they de-cipher the code and produce it on the illuminable devices of the monogram panels in its original form.

In actual practice, according to method A, each letter or figure will have an individual character relay, such as D, L, U, and J, of Fig. 13A, energized from its respective contact, shown connected at the ends of certain armatures of Fig. 13. The character relays will either flash their respective character directly on monogram panel M14, of Fig. 14, or energize contacts to certain monogrammic portion relays that control portions of characters that are identical in form. For instance, the letter B is an extension of the letters P and R.

The armatures of character forming relays are usually fanned, or arranged in pyramidal formation, however, the CFR of Fig. 13 are preferably designed so that some of their armatures receive energy from the right, and some from the left side, thereby making the construction of the relay more symmetrical. The six conductors leading to CFR of Fig. 13 are the same as the six running to the CFR under one monogram panel of Fig. 10. The cable containing these conductors is marked CA-8-13, and is presumed to be the same as one of the cables marked CA-8-10, on Figs. 8 and 10. The armatures of all CFR of Fig. 10 are schematically lined up to print the characters of the sample message A, Blank space, V, 8, stored on locked brush switches of section A of SC of Fig. 7, and according to the code of method A.

Fig. 13A and Fig. 14 illustrate diagrammatically a group of monogrammic portion relays operated from the contacts of the CFR of Fig. 13. To conserve space, portion relays for only a few characters are illustrated but sufficient circuits are contained therein, to convey the general idea of the scheme of method A.

The circuits for the letters J and U will be traced for an example, as it is easily seen what parts are identical. The letter J is dialed as 2-7, and is re-coded at the distributor of Fig. 3, and stored on SC as 6-4-2 (see Details 7 and 20). By the energization of coils 6 and 4 and 2 of the CFR of Fig. 13, the respective columns of armatures are raised, causing the letter J to be flashed on the monogram panel. A sample panel M14 is shown on Fig. 14. It is presumed to be of the same construction as the panel M-15 of Fig. 15 and also the same as the panels of Fig. 10.

The circuit for producing the letter J, is as follows: Battery BA-2 at armature 1 of coil 6 of CFR of Fig. 13. Front contact of armature 1, back contact of armature 1 of coil 5, back contact of armature 8 of coil 1, front contact of armature 8 of coil 2, back contact of armature 7 of coil 3, and front contact of armature 6 of coil 4, over conductor C-J, to character relay J of Fig. 13A and ground. The lamps representing four sides of the skeleton monogram M14 of Fig. 14, are grouped so as to be controlled by the monogram portion relay T for the top row; B, for the bottom row; R, for the right row; and L, for the left row. It will be seen that relay TA cuts out certain lamps of the top row and adds certain other lamps, and that relay BA, cuts out certain lamps in the bottom row, and adds certain other lamps. This feature will be further illustrated in tracing the letters J and U through to the monogram panel M14, from CFR of Fig. 13.

Character relay J of Fig. 13A, upon being energized, forms a circuit from battery BA-1 and front contact of its armatures 1, 2, and 3, to portion relays BA, B, and R, respectively on Fig. 14. This causes the following lamps on the monogram M14 to be energized. Lamps W6, C3, C4, and E6, from front contacts of armatures under relay BA (it will be noted that relay BA has cut out lamps W7 and E7 by opening armature contacts at armatures 2 and 5 respectively). All lamps on the right side of M14 are lit from energized relay, or portion relay R. It will be noted that lamp E7 has already been cut off. In the above manner, the letter J is produced on M14. To show the working of another portion relay, the letter U will be taken as an example, as the left portion of U is an extension of the letter J that has just been traced.

According to the code of Method A, the letter U retains its code number 5-1, therefore, by the energization of relays 5 and 1 of CFR of Fig. 13, the character relay U will become energized as follows: Battery at armature 1 of coil 6 and its back contact, front contact of armature 2 of coil 5, front contact of armature 7 of coil 1, back contact of armature 5 of coil 2, back contact of armature 3 of coil 3, back contact of armature 2 of coil 4, conductor C-U, to character relay U of Fig. 13A, to ground.

Character relay U causes character relay J to operate, from battery BA-1, front contact of its armature 2, to relay J, to ground. This will light the lamps on M14 to form the letter J, as just traced. Armature 1 of the character relay U, causes portion relay L of Fig. 14 to operate, lighting all lamps of the left side of M14, with the exception of W7, which has been cut off by portion relay BA, also as previously traced. Thus the letter U is produced on M14. It will be noted that some lamps of M14 are controlled by more than one relay. In actual practice and according to Method A, most all of the lamps will be so controlled. Commercial current, probably A. C., is furnished to light the lamps through armatures of relays of Fig. 14. Only one side of the lamp circuit is shown. The return circuit is described under Detail 98. As any character may take advantage of character relays and monogrammic portion relays, according to Method A, the tracing of the letters J and U is deemed as sufficient. However any letter or figure may be traced in the same manner. A more simple manner of decoding the code into its original character will now be explained under the caption of decoding according to Method B, as follows.

Decoding. Method B. Detail 49

To simplify the character forming relays, especially for the operation of small monograms for store windows etc., where this relay has to be built in the monogram box, a modification of Method A is shown on Fig. 15. The code according to Method B is used in this description.

Six coils, with multi-armatures, comprise this character forming relay. Commercial current from A. C., runs through the armature combinations straight to the lamps of the monogram panel, diagrammatically shown as M-15, on Fig. 15. Character or monogram portion relays are not necessary in Method B, and the armatures may be fanned or arranged in pyramidal formation, or arranged as shown on CFR of Fig. 13.

To confine the wiring of the multi-armatures of the CFR to one sheet, the drawing on Fig. 15 has been divided (at broken lines), into sections A and B, but should be read as if in one complete section. Each lamp, or multipled lamps of M-15 is numbered, and each armature contact bears the number of the lamp lighted by the energization of that contact. Any column of armatures of the CFR of Fig. 15, may be raised electrically by the energization of its respective coil 1, 2, 3, 4, 5, or 6, at the top of each column of section A.

These columns may be manually raised by turning their respective cam C, shown under each column of armatures of its section B, as follows; A quarter turn of the knob K, to the right causes the cam C to push up plate P, integral with the column rod, thus throwing all armatures of a column against their front contacts. Cam C of each column has a flat surfaced end E which prevents the column from leaving the cam until the cam has been manually released.

The advantage of CFR of Fig. 15 lies in its compactness and as it requires very little space, it is preferable for the control of small monogram panels, such as train announcing boards, score boards, theatre marquees, etc., or in use with larger monograms for air-port signalling or code signalling in times of war. Where remote control is not necessary, its manually operated feature is always available, and when so used, the coils at the top of each column of armatures may be eliminated.

To demonstrate the use of the CFR of Fig. 15, it is deemed sufficient to trace only one character through the circuits, and for an illustration, the figure 8 will be taken.

According to Method B, the code number for this figure is re-coded to 6-5-4-3 (see column 4 of Detail 7). When these coils of the CFR of Fig. 15 are energized, or are manually put in place, the respective column of armatures raise and break their back contacts, making their front contacts in the usual manner. Most of the circuits start at armatures under coil 6, and run through other armatures to the right to lamps of M-15.

For clearness in tracing the drawings, each armature under coil 6 is lettered, and listed under column 1 of the chart following. It is connected to one side of the A. C. circuit. Most all of the circuits for lamps of M-15, representing the figure 8, run through certain armatures under coils 6-5-4- and 3. Column 2 of the following chart gives the number of the lamp or multipled lamp circuit on M-15 that are energized to form the figure 8. It is to be remembered that M-15 is the same in all respects to the monogram panels of Fig. 10, and that the CFR of Fig. 15 may be either electrically or manually operated for the production of any letter or figure.

When the columns of armatures of coils 6, 5, 4, and 3 are energized, or when these same columns are manually raised as just explained, current from A. C., energizes certain lamps of M-15 of Fig. 15 to for the figure 8. The armatures are listed under column one, and the lamps affected are listed under column two.

| Column 1 | Column 2 | Column 1 | Column 2 | Column 1 | Column 2 |
|---|---|---|---|---|---|
| A | 34 | B | 2 | C | 13 |
| C-A | 13 | D | 3 | E | 8 |
| F | 15 | F-A | 8 | G | 7 |
| H | 5 | I | 16 | J | 19 |
| K | 20 | L | 9 | M | 14 |
| N | 29 | O | 18 | O-A | 31 |
| P | 23 | Q | 31 | R | 28 |
| S | 24 | T | 32 | T-A | 18 |
| U | 36 | V | 22 | W | 37 |

In the manner just illustrated, any character listed under method B of the code chart, may be traced through the CFR of Fig. 15 to M-15. It is to be assumed that the return circuit from each lamp of the monogram is either connected to the common return side of A. C., directly, or through the contacts of panel color relays. For the sake of clearness, return circuits are not shown on either M14, or M-15. They are described under Detail 98.

An important feature of the CFR of Fig. 15 lies in the designation of certain numbers of the re-coded code, to some of the characters, whereby advantage may be taken of the fact that various lamps, or lamp combinations form identical parts of different characters. Therefore letters and/or figures having rounded parts, have code numbers starting with digit 6.

A study of M-15 of Fig. 15 will also show that certain lamps are common to all characters in which the re-coded number commences with the figure 6, therefore when such a lamp is included in the circuit, it will be sufficient to connect it direct to the front contact of an armature in a column under coil 6 of the CFR of Fig. 15, regardless of its code number. By designing the CFR in this manner, the number of armatures necessary are reduced to a minimum.

Certain other similar characters are likewise allotted recoded numbers commencing with the figure 5, and in such a manner as to allow the coil 5 to substitute for any code number beginning with this number. This further contributes to the minimizing of armatures and contacts required. Also, it will be found, according to this design that lamps 2, 7, 8, 9, 13, 24, 28, 29, and 31, of M-15, are directly connected to a front contact of an armature under coil 6. Also connections to certain lamps may be taken off of armature front contacts of coil 5, if coils 6 and 5 are energized.

As a further example of reducing contacts to a minimum, reference is made to connections to lamp 31 of M-15. A study of the code chart of method B, will reveal that this lamp is included in every character display in which the recoded number contains the digit 4. In armature row O-A of Fig. 15, a contact is taken to lamp 31 which is sufficient, and which will eliminate a number of contacts that would otherwise be necessary. A further study of the code chart and its applications to the peculiar and inherent characteristics pertaining to the identical form of parts of letters and figures, will further demonstrate the efficiency and novelty of my design of the CFR of Fig. 15, especially for use with small monograms.

It will be noted that method A has low recoded numbers, and a larger number of contacts on its CFR, and method B has a larger number of recoded units and a smaller number of contacts on its CFR. Conductors to the six coils of the CFR of Fig. 15, are presumed to come through a cable (not shown), but similar to CA-8-13 of Fig. 13. It is pointed out in Detail 20 that the distributor of Fig. 3 is designed to accommodate the code of the method adopted. Unless otherwise specified, method A code is used throughout the drawings.

*Color control in storing. Detail 50*

The code chart of Detail 7 shows that all code numbers commencing with the digit 1 are allotted to color designations. It is possible according to my invention to print each letter of a display in a different color, or to cause said display to be produced entirely in one or more colors.

Let it be assumed that the next character dialed is to be stored on SC of Fig. 7, in green. The code number of this designation is 1-2. Whenever 1 is dialed as the first digit of the code, a multi-armature color circuit routing relay, shown as relay 1 on Fig. 3 operates, and moves all of its armatures against their front contacts, where they will remain until the code transmission of a color is completed (see Detail 15). Relay 1 is slow to release so as to prevent it from dropping its armatures before they have completed their functions.

The second dialed digit of the color code will now energize a respectively numbered relay of the distributor of Fig. 3 (in this case, relay 2, however will not be energized, as by dialing 1 as the first digit, the selectors of Fig. 2 will energize bus, or trunk #2' of Fig. 3, when 2 is the second digit).

By a study of Fig. 3, and Detail 17, it will be seen that when any digit from 1 to 6 is dialed as the second digit of the code, the second selector of Fig. 2 will energize a respective bus of Fig. 3 marked from 1' to 6'. The impulse of C-2-3-4 starting at Fig. 2 is also connected to wiper contact strip K-1 of MS-4 of Fig. 2, therefore as soon as relay G is energized, current of an impulse nature will now energize color selecting relay 12, of Fig. 4. A branch circuit of C-2-3-4 reaches armature 4 of relay SET of Fig. 4, and as this armature is now on its front contact, the impulse continues through armature 4 of now energized color selecting relay 12, conductor C-G, cable CA-4-7, to storage relay G of SC of Fig. 7. Relay 12 of Fig. 4 is now held up by a stick circuit from battery BA-4, running through front contact of its armature 1, stick winding of its relay coil, back contact of armature 2 of color selecting relay 13, back contact of armature 2 of color selecting relay 11, back contact of armature 2 of end storing relay 88, back contact of armature of relay 18A to ground. The green color selecting relay 12 will now remain energized until its stick circuit is opened by the operation of any of the armatures above mentioned. Unless the operator dials a different color instruction, each succeeding character dialed will be stored on SC of Fig. 7 in green.

If it is desired to change the color to white or normal, while storing a message, code number 1-8 is dialed, and relay 18A of Fig. 4 is energized. Armature 1 of this relay will open the stick circuit of all color selecting relays, thus restoring them to their normal position. It is to be noted that by dialing 1-8, during a storing operation, relay 18A of Fig. 4 is energized. For energization of relay 18, see Detail 52. Color control of my system is divided into two different circuits, one to be used in storing operations, and the other circuit to be used after the storing operation has been completed. The code numbers 1-1, 1-2, and 1-3 are to be used only during the first circuit just mentioned.

Color control code numbers 1-4, 1-5, 1-6, and 1-7 are used for changing the color of the monogram panels while SC of Fig. 7, or the display apparatus of Fig. 10, is in operation (see Detail 52). Code number 1-8 restores storing colors or the colors of the display to white and this code number may be dialed irrespective of the operation of the control or display device.

*Storage relays R and G. Detail 51*

Energization of color storage relays R and/or G of SC of Fig. 7, causes their brush switch 71, directly under their influence in row 1-Z to assume a locked position against their respective segment. It has just been explained how color selecting relay 12 of Fig. 4 is now being held up by its stick circuit, and until this relay is released or superseded, the color storage relay G of Fig. 7 will become energized each time a new row of brush switches moves under the storage relays of SC, and the dialing appended number has functioned.

The operation of color selecting relays 11, and 13 of Fig. 4, are similar to the circuit just described for color selecting relay 12, and is to be noted that each color selecting relay in operating, causes the stick circuit of the other two color selecting relays to be opened. Thus the last color instruction dialed will predominate and will be maintained until superseded by the dialing of a different color code number or by dialing 1-8, which will change the characters stored thereafter to white, or the normal color.

The only difference between setting up green, and red, and yellow, during the storing process is that green and red each have individual color selecting relays, while yellow is produced by the energization of both color selecting relays 12 and 13, as follows; Conductors C-R and C-G of Fig. 4 run through cable CA-4-7, to color storage relays R and G of SC of Fig. 7. It will be noted on Fig. 4 that armature 4 of color selecting relay 13 will send current of the impulse conductor C-2-3-4, through conductor C-R of cable CA-4-7, when color selecting relay 13 is energized. Likewise armature 4 of color selecting relay 12 will send current of the impulse through conductor C-G, when relay 12 is energized. When yellow color selecting relay 11 is energized, current of the impulse circuit of conductor C-2-3-4, now runs through both conductors C-R, and C-G of cable CA-4-7, and both color storage relays R and G of SC of Fig. 7 operate.

It is to be noted that the impulse over conductor C-2-3-4 is cut off at armature 4 of relay SET, as soon as the storing process is completed. Further circuits governed by action of color selecting relays 11, 12, or 13, will receive current from battery BA-2, and lower contact of armature 5 of relay SET.

*Superimposed color. Detail 52*

As previously mentioned, the code numbers 1-1, 1-2, and 1-3, are for use only in transmitting color instructions from the dial, to the color storage relays of SC of Fig. 7 during storing operations. The complete color control system of my invention, has incorporated within it, a superimposed color control to be used only after the message has been stored on SC, or while the display monogram panels are in process of producing a printing or running display.

The code numbers to be used in superimposing a color are 1-4, 1-5, 1-6, and 1-7. They cause a color sequence to be stored on color sequence relays of their respective numbers (see lower portion of Fig. 4). At the end of a cycle of operation of the display device, the color of the whole monogrammic field is changed according to the color stored on the series of sequence relays, regardless of the color instructions stored on SC of Fig. 7.

It has been mentioned, that armatures of relay SET, are locked on their front contacts during storing operations, and rest on their back contacts while SC is in operation. It is also to be noted, that code number 1-8 operates relay 18A during the storing process, and operates relay 18, (both on Fig. 4), after relay SET armatures have been released.

*Two color sequence. Detail 53*

As an example of two color change, let it be assumed that after the display is operating in the set colors of the sample message of Fig. 1-E, that it is desired to change the display to a sequence of green and red. Code number 1-4 dialed, will set up this circuit, and the display will be run once in green, and then once in red. These colors will alternate at the end of a cycle of operation, until other color instructions are received from the dial, as follows; When the operator dials code number 1-4, color sequence relay 14, at the bottom of Fig. 4, will raise all of its armatures and lock them against their front contacts by the action of the mechanical latch L which catches any armature 1. Current now flows from battery BA-14, front contact of armature 2 of relay 14, through relay U, to ground. This relay U, through front contact of its lower armature B-1, connects relay 18 to ground.

Upper armature T-1 of relay U, now connects the A&B relay of Fig. 4, with conductor C-4-5 coming from the sequence changing contacts of Fig. 5. By a study of Detail 57, it will be seen that an impulse will not come over this circuit until one complete cycle of operation of the display has been made.

Battery BA-14 of Fig. 4 is also connected through front contact of armature 3 of relay 14, back contact of armature 2 of relay 6 and conductor C'G, to green color selecting relay 12 and ground. From battery BA-2, lower contact of armtaure 5 of relay SET, front contact of armature 5 of color selecting relay 12, relay G is energized (upper right of Fig. 4), and current is now sent to all panel color relays G-1 to G-4 controlling green color for all monogram panels, of Fig. 10. These connections run through front contacts of armatures of relay G and conductors running through cable CA-B-4-10. These green relays at the display device will remain energized until the end of a cycle of operation.

The instructions of code numbers 1-4, 1-5, 1-6, and 1-7 will predominate, and will follow the sequence as listed in the code chart of Detail 7, regardless of the color instructions previously stored on SC of Fig. 7. This feature is accomplished by the operation of an interlocking common ground circuit as follows; Refer now to armatures 5 and 6 of relays R and G, at upper right of Fig. 4. In the set message, A, Blank space, V, 8, used for an illustration, the letter A is set up on SC of Fig. 7, to be displayed in red, and relay R of monogram panel M-1, of Fig. 10, is energized through a circuit from its segment on SC. The common return circuit for all panel color relays of Fig. 10 is carried back to Fig. 4, through conductors CR' and CG', of cable CA-4-10, to the interlocking armatures of relays G and R.

As long as the armatures of relays R and G, of Fig. 4 remain in their normal position, the return circuits just mentioned, are not disturbed. However, if red relay R becomes energized, its armature 5 opens the circuit of conductor CG'. This disconnects all green panel color relays of Fig. 10 from ground. Likewise, armature 6 of green relay G of Fig. 4, by its operation, disconnects conductor CR', and consequently, all red panel color relays of Fig. 10, from ground.

If yellow color is desired, both relays R and G of Fig. 4 are energized by a circuit from battery BA-2, back contact of armature 5 of relay SET, front contact of armatures 5 and 6 of color selecting relay 11, and conductor CG' remains grounded through the front contact of armature 5 of relays R and G, and conductor CR' remains grounded through the front contact of armature 6 of relays R and G. It will be noted that the conductors running to relays 88, 11, 12, 13, 14, 15, 16, 17, 18, and 18A, of Fig. 4, all come from Fig. 3, through cable CA-3-4, and also that by operation of relays 18, 17, 16, 15, or 14, the mechanical latch, holding armatures of any of the above mentioned relays, will be tripped by the momentary sliding action of release rod LA (see Detail 55).

*Color change. Detail 54*

Let it be assumed that a cycle of operation of the display device, has just been completed in green. Current now is sent over conductor C-4-5, from Fig. 5, to now closed top armature T-1 of relay U, to the A&B relay of Fig. 4, and both relays are energized. When this current is cut off, an impulse is sent from battery BA-7, back contact of armature 1 of relay A, front contact of armature 1 of relay B, make before break contact 2 of step relay 1, to relay 1 and 2, to ground.

The effect of switching, or step relay circuits, is explained under Detail 12, and a short review of their functions will be helpful. It is shown therein, that the make before break contacts of off normal springs, ONS of Figs. 1 and 2, are moved to their normal or contacting position, by the removal of wiper W, and maintain their contacts until W is returned to its normal position.

In Fig. 4, a stick circuit, through armature 1 of relay 1, of the step relay series, accomplishes the same purpose, and step relay 1 remains energized until the stick circuit is broken at armature 1 of stick circuit release relay 5. Armatures 2 and 3, of step relays 1 and 3, are equipped with make before break contacts, and the points of armature 3 are closed before the points of armature 2 are opened.

Relay 2 is normally connected in series with relay 1, but after the first impulse from the A&B relay has ceased, relay 2, due to its slow to release feature, will drop its armatures, thus lining up a circuit for the next impulse of the A&B relay, through now closed contacts 3 of step relay 1, back contact of armature 1 of step relay 2, contact 2 of step relay 3. This will cause step relays 3 and 4, to operate in series, in a manner similar to step relays 1 and 2 as just described, as soon as the next impulse is received at the end of the next cycle of operation.

While step relay 2 of Fig. 4 was momentarily energized at the end of the green cycle, relay 6 became energized from battery BA-10, front contact of armature 2 of step relay 2, the winding of relay 6, back contact of armature 2 of relay 7, back contact of armature 2 of stick circuit release relay 5, to ground. This controls all step relay stick circuits.

All armatures of relay 6 are now moved against their front contacts, and its armature 2 in raising, now energizes red color selecting relay 13 through its front contact and conductor C'-R, and de-energizes green color selecting relay 12. All of the monogram panels will now flash in red, and when a cycle of operation in this color is completed, another impulse is sent to the A&B relay of Fig. 4 over conductor C-4-5, and the step relays 3 and 4 will operate and again change the display color to green (see Detail 57 for origin of impulse).

While relay 4 was momentarily energized, its armature 2 closed, and energized relay 7 through an obvious circuit from battery BA-11. Relay 7, when energized, is locked up through its stick circuit originating at battery BA-13 at its armature 1, to ground at back contact of armature 2 of stick circuit release relay 5. Armature 2 of relay 7, upon leaving its back contact, opens the stick circuit of relay 6, compelling it to again drop its armatures. Current is now sent from battery BA-14, front contact of armature 3 of relay 14, back contact of armature 2 of relay 6, conductor C'-G to color selecting relay 12, which will again operate and again cause a green display through the next cycle of operation.

If the sequence consists of only two colors, stick circuit release relay 5, will not be operated by an impulse of the A&B relay, but will operate at the end of the second sequence, by the following circuit: Operation of relay 7 restores relay 6 to normal, causing the green color selecting relay to become energized through back contact of its armature 2 and conductor C'-G. It will be noted that armature 4 of relay 7 is now against its front contact, and as soon as armature 6 of relay 6 moves against its back contact, current flows as follows. Battery BA-14, back contact of armature 3 of relay 17, back contact of armature 6 of relay 6, front contact of armature 4 of relay 7, through stick circuit release relay 5, to ground. Relay 5 in operating, opens the stick circuit at its armature 1, thus restoring all relays 1 to 7 to their normal position, thus preparing the circuit, so that at the end of the next cycle of operation, the impulse will again operate step relays 1 and 2, and in turn relay 6, to repeat the same color change of the sequence until different color sequence instructions are dialed.

*Three color sequence. Detail 55*

Let it be assumed that it is desired to run a sequence of three colors, green, red, and yellow. According to the code of Detail 7, the dialing of 1–7 will set up this circuit as follows: Code sequence relay 17 of Fig. 4 operates and locks its armatures 2 and 3 against their front contacts by the retaining of its armature 1 under the mechanical latch L.

The mechanism of the latches is so arranged, that the movement of any armature 1 of sequence relays will release any other sequence relay armatures that have been held up. This is accomplished by latch arm LA, which controls all latches. Relay 18 also operates latch arm LA. This mechanical movement, diagrammatically illustrated on Fig. 4 is well known, especially in key releasing mechanisms of adding machines.

Current now flows from battery BA-14 of Fig. 4, front contact of armature 2 of relay 17, to relay U, and ground. From this same battery, front contact of armature 3 of relay 17, back contact of armature 5 of relay 6, back contact of armature 3 of relay 7, through conductor C'-G, current now flows to color selecting "green" relay 12.

At the end of the green cycle of operation, relay 6 of Fig. 4 is operated by step relays 1 and 2, and the color is changed from green to red. At the end of the next cycle however, when step relays 3 and 44 operate, relay 7 locks up through a whole cycle, because the current that previously operated stick circuit release relay 5 at this stage, has been disconnected at back contact of armature 3 of relay 17. Relay 7 now remains energized, and relay 6 is now de-energized, and current flows from battery BA-14, front contact of armature 3 of relay 17, back contact of armature 5 of relay 6, front contact of armature 3 of relay 7, and conductor C'-Y, to yellow color selecting relay 11. This causes color selecting relays 12 and 13 to operate, and all monogram panels will display in yellow. When the yellow cycle is completed, the A&B relay causes an impulse to reach stick circuit release relay 5, through the following circuit; battery BA-7, back contact of armature 1 of relay A, front contact of armature 1 of relay B, point 3 of armatures of step relay 1, back contact of armature 1 of step relay 2, point 3 of armatures of step relay 3, back contact of armature 1 of step relay 4.

The momentary operation of this relay 5, will cause relays 1, 2, 3, 4, 6, and 7 to return to their normal position, and change the display color again to green by the circuit previously traced. This three color sequence will continue until the dialing of another color instruction, or until relay 17 is restored to normal by the action of relay 18.

It is to be noted that the dial circuit, during the operation of the display, is selectively connected to relay 18 of Fig. 4, and during the storing operation, it is connected to relay 18A, through operation of relay SET (see Detail 21).

*Relay 18. Detail 56*

According to the code of Detail 7, the dialing of 1–8 restores the display to the color set up on the storage relays of SC of Fig. 7. In case no color was set up, the display will be run in white. The operation of relay 18, raises its armatures I and 2. The movement of armature I, causes latch arm LA to move to the left, thus tripping all latches and freeing any armatures of color sequence relays 14, 15, 16, or 17, that may be locked, and restoring them to their normal position.

Armature 2 of relay 18 connects battery BA-15 to stick circuit release relay 5, to ground. When relay 5 is operated, it breaks the stick circuit of relays of the step circuit, and also the stick circuit of relays 6 and 7, and they all return to normal.

When armatures of sequence relays 14 to 17 return to normal, the circuit to relay U has opened and this relay releases its armatures. Its armature T-I opens the circuit of the A&B relay, and its armature B-I opens the ground circuit of relay 18. The false impulse of the A&B relay as described in Detail 11, will not occur here as there is now no current in conductor C-4-5, consequently, the relay A is not energized. The ground of the circuit of relay 18 remains open at armature B-I of relay U, until this relay is again energized by the front contacts of any armature numbered 2, of relays of either sequence series 14, 15, 16, or 17.

*Color change impulse. Detail 57*

The impulse to the A&B relay of Fig. 4 changes the sequence of colors at the end of a cycle of operation of the display if code numbers 14, 15, 16, or 17, have been dialed. By the operation of any of the sequence relays, relay U of Fig. 4 is energized. Its top armature T-I closes a circuit to relay A. The color sequence change takes place at the end of a printing and/or running display. If the displays are to be alternated, the color sequence will preferably change at the end of a running display. This is accomplished as follows:

Let it be assumed that relay U of Fig. 4 is energized and its top armature T-I has closed the circuit from conductor C-4-5, to relay A. This conductor is connected to the front contact of armature I of relay EP, and front contact of armature 2 of relay ER of Fig. 5. Armature 2 of relay ER, is connected to battery BA-7, and the sequence will change whenever this relay is operated.

At the end of a cycle of operation of a printing display, end print relay EP, of Fig. 5, operates, but the impulse will not reach relay A of Fig. 4, unless the circuits are set up to use only a printing display, because relay RU, of Fig. 5, which operates the running display, would hold these circuits open at back contact of its armature 5.

Whenever a printing display is the only one to be used, relay RU, remains de-energized, and current will flow from battery BA-5, back contact of armature 5 of relay RU, conductor C-4, to armature I of end print relay EP. Whenever relay EP operates at the end of a printing cycle, current is sent from front contact of its armature I, to relay A of Fig. 4, over conductor C-4-5. When current is cut off of this conductor, the A&B relay of Fig. 4 functions, and the sequence is changed as just explained in Details 53, 54, and 55. The color circuits of my invention will display in any color, or color combination or all color control may be eliminated if only white lamps are to be installed in the monogram panels of the display.

*Printing display. Detail 58*

The complete circuit of the printing display with drum selector, dimmer, and standard time, will be traced first. Modified circuit A, with drum selector and dimmer, will be explained under Detail 76. Modified circuit B, with drum selector, but without the dimmer or standard time, will be traced under Detail 77. Modified circuit C, with drum selector, dimmer, and standard time, displayed at the end of each revolution of the drum selector DS, will be traced under Detail 78. Modified circuit D, without either drum selector, dimmer, or standard time, will be traced under Detail 80. A modified circuit E, of circuit D, with standard time, is explained under Detail 81.

In the modified circuits mentioned above, certain relays and conductors will be eliminated, and certain extra or auxiliary parts will be used to demonstrate the substituted circuits. I have used the prefix X, to designate these extra parts whenever they pertain to a modification of the complete system. It is to be noted that in each of the above circuits, the end of the cycle comes only when the end print relay EP of Fig. 5, is finally energized (see Detail 75, for circuit). All circuits that are common to all of the above mentioned circuits, will now be described.

*Relay 87. Detail 59*

When it is desired to operate the printing display, code number 8-7 is dialed, and relays 8 and 7' of the distributor of Fig. 3, line up a circuit, so that when current comes over the impulse conductor C-2-3-4, in response to the dialing of the appended number, it finally reaches relay 87, at the top of Fig. 5 (see Detail 15, and 17, for appended number of the code of Detail 7). As the impulse to relay 87 of Fig. 5 was only momentary, a mechanical latch LI is provided on armature I, of relay 90, so that armature I of relay 87 is locked up, and its armature 2 is held in contact with a conductor leading to print relay P, and to ground.

If the operating time clock OTC of Fig. 5 is "off," no current will flow to relay P. Armature 2 of relay 87 however, will maintain its front contact until it is mechanically released from the latch LI, by the operation of relay 90 (see Detail 45). As soon as OTC of Fig. 5 cuts "on," current will flow from battery BA-I, front contact of armature of OTC, front contact of armature 2 of relay 87, through relay P, and ground, and the printing circuit will be set up.

*Current for SC. Detail 60*

From battery BA-3 of Fig. 5, and front contact of armature 3 of relay P, and/or from battery BA-5, and front contact of armature 4 of relay RU, current is sent through conductor C-5-7, to SC of Fig. 7 to energize brush 102, circular bus 103, (only a section shown), buses 104, and all locked brush switches in all rows of all sections of the rotor of SC of Fig. 7, occupied with coded characters of the desired message. Thus current is furnished locked brush switches of SC, during the operation of the printing display of relay P of Fig. 5, and by relay RU during the operation of the running display.

It is to be noted that the brush switches of SC are not energized during the storing operation when coded characters are being transmitted from the dial to the storage controller. This is also the case when the erase number 0-0 has been dialed and all characters are being obliterated or erased from the rotor of SC of Fig. 7.

Relay P. Detail 61

When relay P of Fig. 5 operates, the back contacts of its armatures 1 and 2 disconnect battery BA-2, from conductors C-ER-5-6, and C-ER'-5-6, which run to the erase control on Fig. 6 (see Detail 41). The front contact of armature 3 of relay P of Fig. 5, connects battery BA-3 to conductor C-5-7 (see Detail 60).

At joint J of conductor C-5-7, a branch conductor C-1, through back contact of armature 4 of relay EP, back contact of armature 2 of relay XE, back contact of armature 5 of relay H, connects battery BA-3, or BA-5, to power bus 2 on Fig. 9, over conductor C-PR-5-9 (see Detail 67).

Conductor C-B, and its extension C-B', of Fig. 5, when energized over conductor C-1, becomes a local battery power bus, and will remain energized, (subject to armature 4 of relay EP, and armature 2 of relay XE), as long as armature 3 of relay P, or armature 4 of relay RU, are either or both held against their front contacts.

Relay P, also energizes to operate print relay OP from battery BA-3, front contact of its armature 4, conductor C-5, back contact of armature 2 of relay OR. This circuit, after passing through relay OP, reaches ground at back contact of armature 3 of relay H.

Stick circuits of relays P and RU. Detail 62

A stick circuit from battery BA-2 of Fig. 5, front contact of armature 1 of relay P and its stick winding, and a stick circuit from battery BA-4, front contact of armature 1 of relay RU, joins conductor C-2, and runs through back contact of armature 2 of relay EP, to ground at back contact of armature 2 of relay N (shown at lower left of Fig. 5).

The stick circuit just described holds either or both relays P and RU in operation, until the end of a cycle of operation has been reached, by preventing these relays from dropping their armatures if the time clock OTC should cut off while the display apparatus is in operation. The operation of end print relay EP, at the end of the printing cycle, or the operation of relay N, at the end of a running cycle, will open this stick circuit, giving these relays an opportunity to drop their armatures at that period, if no different instructions are registered.

Relay OP. Detail 63

Relay OP controls the operation of the printing display. Its armature 1 of relay 5, through its front contact, connects bus CB', with conductor C-B-5-9, which runs to print bus #4, on Fig. 9. Armature X of relay OP, only operates in modified circuits D, and E, of Details 80 and 81, respectively, and will be disregarded in this description.

Armature 2 of relay OP connects battery BA-11, over conductor C-L-5-6, with relay 60 of Fig. 6, which operates the main clutch MC, connecting the motor main shaft 62, to the main shaft 65, as explained in Details 27 and 28. Armature 3 of relay OP of Fig. 5 connects battery BA-11 over conductor C-5-6-6, to relay 6, of Fig. 6, which in turn controls the motor operating circuit (see Detail 26).

A circuit from battery BA-9 of Fig. 5, back contact of armature 7 of relay OR, back contact of armature 3 of relay XG, and front contact of armature 4 of relay OP, through conductor C-D-5-6, closes points 1 and 2 of switch A, at relay DB of Fig. 6, and conductor C-D-2 energizes DS clutch relay 68M, as explained under Detail 29.

Drum selector. Detail 64

It is to be noted that the rotor of SC of Figs. 6 and 7 does not revolve during the operation of a printing display. The selection and sequence of characters and colors which have been previously set up on rows of locked brush switches of SC, are transferred to the character forming relays of the monogram panels of Fig. 10 by the step by step movement of the drum selector (DS) of Fig. 6 (except during the operation of the modified printing circuit of Details 80 and 81).

It is assumed that the motor M, relay 60, and the ratchet 68-R, of Fig. 6 are now operating, and DS is being intermittently rotated in the direction of arrow A, and through the series of steps marked at the left of DS. It requires seven step movements of ratchet 68-R to complete one revolution of DS, and while it may be desirable to have two or more series of steps around its periphery, DS is shown with only one. The broken portion of other series of steps, partially illustrated on Fig. 6, is shown merely to demonstrate in a diagrammatic manner, a possible continuity of steps.

The sliding brush contacts BC of DS are stationary, and so positioned as to allow DS to revolve under them. They receive energy from battery BA-10 and its attached brush contact, by the conducting segments represented by the light portions of DS. There are as many pairs of conductors connected to brush contacts BC, of DS, as there are monogram panels in the display apparatus. As there are four in the present illustration, DS shows four pairs of conductors. Each pair consists of one wire leading through cable CA-6-10, running to the stick circuits of lighting current control relays LC, of Fig. 10, as explained under Detail 84, and four other wires to Fig. 9, in cable CA-6-9.

It is noted that when the conductors leave cable CA-6-9 on Fig. 9, that they are connected to buses 1', 2', 3', and 4', designed to run entirely around the circumference of the stator of the controller SC of Fig. 7, so as to shorten their dependent connections. They are designated as DS buses, so as not to confuse them with the control buses, also of Fig. 9.

The segment under storage relay 6', in row 1A, of SC of Fig. 7, is energized by its locked brush switch. In the printing display, when DS of Fig. 6 moves to step 1, conductor C-1' energizes row selecting relay 1-A of Fig. 8, causing this segment to be connected, through its respective bus to CFR 6 of monogram panel M-1 of Fig. 10. According to the code of Detail 7, this number represents the letter A, therefore A will be set up on the illuminable devices of M-1 of Fig. 10. When DS of Fig. 6 moves to step 2, M-2 of Fig. 10 will be left blank, as this row of brush switches is set up as a blank space on SC of Fig. 7. When step 3 of DS is reached, the letter V is produced on M-3 of Fig. 10, and step 4 will produce the figure 8 on M-4.

If the monogram panels are in vertical alignment, the letter by letter printing will preferably start at the top panel. Step 5 of DS of Fig. 6, being an insulated strip causes all monogram panels to become darkened. According to the complete specifications of the printing display, the dimmer DM of Fig. 6 is now introduced into the circuit, and all previously printed characters will be gradually brought up to full brilliance on the display field of Fig. 10, and then gradually darkened, as the dimmer finishes its operation. The dimmer's use is optional and its application to the printing display circuit is more fully explained under Detail 72.

When step 6 of DS is reached, this being a conducting strip, all stored characters on brush switches in contact with segments of one entire section of SC of Fig. 7, (in this case A, blank space, V, 8, on section A), will be produced on the monogram panels of Fig. 10. When step 7 of DS of Fig. 6 is reached, the brush contacts are again on an insulated strip, and DS rests in its normal position awaiting further instructions. If there are more sections of SC to be printed, DS will commence another revolution.

In actual practice, a number of words or a sentence will be contained in the message to be printed. When this is the case, the characters set up on the locked brush switches of each section of SC of Fig. 7, will in turn be transferred to the monogram panels by succeeding revolutions of DS. If the display of standard time is to be used, it will come at the end of the display of the entire message.

By the above, it is shown that intermittent movement, (see Detail 29), has caused one revolution of DS of Fig. 6, to transfer characters from one section of SC of Fig. 7, through brush contacts of DS, through respective DS buses and row selecting relays of Fig. 8, to the monogram panels of Fig. 10, in the order just mentioned.

The steps represented by 5, 6, and 7, of DS of Fig. 6, will be required on any size drum selector, (DS). If, for example the names of the forty-eight States are to be printed, a display field of thirteen monogram panels would be required to accommodate the longest State name, Massachusetts. This would require a drum selector having sixteen steps, one for each letter, and one step for each of the functions of steps 5, 6, and 7, of DS of Fig. 6, as just mentioned.

*Relays of Fig. 8. Detail 65*

Each relay of Fig. 8, through its multi-armatures selectively connects a row of segments of SC of Fig. 7 with the CFR of its respective monogram panel of Fig. 10, and is termed a row selecting relay. Connections from each row of segments of SC enter a cable at a point below the arrow shown at the lower portion of each segment. On Fig. 8, they are shown as leaving the cable directly under the armatures of the row selecting relay. The top contacts of these armatures enter a cable CA, and are schematically shown at 8, as spliced on to their respective conductors in cables leading to CFR and color relays of Fig. 10.

All conductors connecting segments of the first row of each section of SC, are selectively multiplied to the CFR of the first monogram panel, through cable CA-8-10-1. All segments of each second row of each section of SC are selectively multiplied to the relays of the second monogram panel through cable CA-8-10-2, etc. It is to be noted that the row selecting relays of Fig. 8 control only the first nine segments, counting from the left, of a row of SC of Fig. 7. The end and start segments are connected direct to their respective relays and circuits of Fig. 9.

As the drawings are limited to a four monogram panel display, the row selecting relays of Fig. 8 are grouped in fours, with each group representing the four rows of its respective section, and designated by the same letter that its section bears. Thus, relays 1-A, 2-A, 3-A, and 4-A of Fig. 8, selectively control the four rows of respective segments of section A of SC of Fig. 7, and these four relays are in turn connected to their respective DS buses of Fig. 9, by armatures of energized relay MR-A (see Detail 68).

Relays marked MRA on Fig. 9 are section control relays. They are in turn controlled by a relay marked RA, also on Fig. 9. It will be noted on SC of Fig. 7 that the characters of the sample message are to be printed on the display apparatus in various colors. The brush switches of section A, controlling the designated color are in locked position on SC. This circuit will not be traced here as color control is disregarded in this description. However, when used, current is sent through their respective armatures of row selecting relays of Fig. 8, to the panel color relays of Fig. 10, in the manner just described, and the monogram panels will be illuminated in the selected color (see Detail 50). The circuit through relays of Fig. 8 also transfer instructions for the hyphen control relay of the display device, as set up by the hyphen storage relay of SC of Fig. 7. This is explained under Detail 97.

Relays, connections, and buses of Figs. 8 and 9 are stationary and are preferably positioned around the circumference of the stator of SC of Fig. 7 and in close proximity to their respective rows of segments, so as to reduce to a minimum the amount of connecting wire.

In a printing display, rows of segments of each section of SC may be individually and successively connected to the control relays of the monogram panels of Fig. 10, as just explained in Detail 64, or the segments of an entire section may be connected to all panels of the monogrammic field for displaying the entire message of one section at one time. All row selecting relays controlling one section of SC are then energized at the same time by the action of relay M, of Fig. 9, which will now be explained.

*Relay M. Detail 66*

The function of multi-armature relay M, of Fig. 9 is to connect its battery BA-1 to DS buses through the front contacts of its armatures, so that when relay MR-A, (or any other MR relay of Fig. 9), is energized, the resulting current will energize all row selecting relays of a section of SC of Fig. 7, controlled by that respective MR relay.

The number of armatures of relay M is governed by the number of rows of segments in a section of SC. This also controls the number of DS buses and conductors in cable CA-6-9. In the present illustration, there are four buses and conductors 1', 2', 3', and 4', as shown on Fig. 9. It is to be noted that relay M is not energized while words are being spelled letter by letter by the action of steps 1 to 4, of DS of Fig. 6, but relay M is energized from conductor C-W-5-9 from Fig. 5, as follows: Battery BA-9 of Fig. 5, front contact of armature 6 of relay OR, battery BA-11, front contact of armature 2 of relay XG, during the operation of Detail 79, same battery and front contact of armature XA of relay OP during the operation of Detail 80, and from a circuit of Fig. 6 originating at battery BA-a, and front contact of armature 2 of relay D, as explained in Detail 72.

*Power Bus. Detail 67*

Current to energize brush 102 of SC of Fig. 7 comes over conductor C-5-7 (see Detail 60). A branch circuit attached to this conductor at joint J, on Fig. 5, runs through conductor C-1, back contact of armature 4 of relay EP, bus CB, back contact of armature 2 of relay XE, back contact of armature 5 of relay H, and conductor C-PR-5-9, of Figs. 5 and 9, to power bus #2 of Fig. 9.

Bus #2 of Fig. 9 furnishes current for certain circuits of the selector relays, and is deprived of current momentarily at the end of a printing cycle of operation, so as to return all B relays of Fig. 9 then held up by stick circuits, to their normal position.

*Limit circuit, printing display. Detail 68*

The circuits of Fig. 9 required to operate the relays of Fig. 8 that are used in printing the sample message of Fig. 1E, that is now stored on the locked brush switches of section A of SC of Fig. 7, will now be traced.

It is assumed that code number 8–7, for "operating printing display" has been dialed, and relays P and OP of Fig. 5 are in their operating position as described in Details 61 and 63, respectively. Current has been sent over conductor C-P-5-9 from armature 1 of relay OP of Fig. 5 to print bus #4 of Fig. 9. During the process of storing the sample message on SC, the locked start brush switch 71-S-A, (see Detail 42), has been intermittently moved until it now rests against its segment 72-S-A, in row 1-A of SC of Fig. 7. When code number 8–7 is dialed, current will flow from locked start brush switch 71-S-A, segment 72-S-A, through conductor C-7-9-A of Fig. 7, and winding of start relay STA of Fig. 9, to ground.

Current also flows through end segment 72-E, (which is now in contact with end brush switch 71-E-A of Fig. 7), through conductor C-E-7-9-A, to end relay EA of Fig. 9. Start relay STA, and end relay EA, of Fig. 9 hold their armatures against their front contacts during the entire operation of a printing display cycle. As the rotor of SC of Fig. 7 is now stationary, only armature number 2 of relay STA of Fig. 9, which is connected to print bus #4 receives current.

During the printing display, bus #4 of Fig. 9 is the only bus of this group receiving current, and from the conductor connected to the front contact of armature 2 of relay STA, current now flows through back contact of armature 6 of relay B-1, to relay RA, to ground. For the sake of clearness, only some of the conductors of Fig. 9 are numbered, but the circuits may easily be traced between all points mentioned.

*Impulse circuit. Detail 69*

When steps 4, 5 and 6 of DS of Fig. 6 arrive under the brush contacts B-C p, attached to conductor C-20, current is sent from this segment to the adjacent relay A, through an obvious circuit. This forms an A&B relay combination, and its function is to send an impulse over conductor C-B-6-9, the moment DS is moving from step 6 to step 7. From conductor C-B-6-9, on Fig. 9, this temporary impulse energizes impulse bus #3, and its only available path from this bus is through front contact of armature 1 of relay STA, (which is now being held up), back contact of armature 2 of relay EB, front contact of armature 3 of relay EA, (also now being held up), to the end print bus #7, and through conductor C-1 of cable CA-B-5-9, of Figs. 9 and 5, to the end print relay EP, of Fig. 5 (see Detail 75 for circuits and functions of relay EP).

*Stepping relays of Fig. 9. Detail 70*

In order to show the operation of the stepping relays, marked A and B, of the group of section selectors of Fig. 9, a sample message containing two four-letter words, (Good Cars) will be used. These stepping relays are used only during the operation of the printing display. In the present description, the dimmer and the standard time circuits previously mentioned, will be disregarded.

Let it be assumed that the four letters of the word Good occupies the four rows of the rotor of section B, and the letters of the word Cars occupy the four rows of section A on the storage controller SC of Fig. 7. Start relay STB of Fig. 9 has been energized to start the printing of the two word message. Current for this relay comes from the start segment of section B of SC, (not shown), over conductor C-7-9-B (shown only on Fig. 9).

The circuit for printing displays, as explained under Details 58 and 63 now applies until the point is reached where the word Good has been completely printed, and DS of Fig. 6 is moving from step 6 to its normal position at step 7. As DS makes this movement, the insulated portion of its segment moves under brush contact B-C p, allowing the adjacent A&B relay, to which it is connected, to function. This sends an impulse through conductor C-B-6-9 to impulse bus #3 of Fig. 9. It is to be noted that end relay EA of Fig. 9 is the only end relay now energized.

Current from impulse bus #3 runs through armature 1 of relay STB, back contact of armature 2 of relay EC, back contact of armature 3 of relay EB, armature 5 and back contact of armature 3 of relay B2, winding of relay A2 and B2, to ground. These two, and similar two relays, constitute a pair, and are introduced in the circuit for the purpose of stepping or relaying the next impulse on to the next succeeding pair of stepping relays, or to the end print relay EP of Fig. 5.

Stepping relays marked A of each pair, are slow to release. Relays A-2 and B-2 are now in series, and both pick up their armatures at the same time. Relay B-2 remains held up by a stick circuit through its armature 1, by current furnished from power bus #2, but relay A-2 drops its armatures when the impulse stops. The dropping of the armature of relay A-2 is also subject to its slow to release feature.

All B relays of each pair are equipped with an armature having a make before break contact. The normal, or back contact of armature 3 and 5, completes a series circuit for said impulse through each A and B relay of the respective pair in use. The make, or front contact of armature 5 and 4, now made by the operation of the B relay, connects the stepping circuit for the next impulse to armature 1 of the A relay. After the slow to release feature of the A relay allows its armature 1 to drop, the circuit is now aligned so that the next impulse will pass through its back armature contact to the next set of stepping relays, or to the end relay, depending upon the number of words in the printing display, as will now be traced. It is to be noted that nothing has been done so far to interfere with the operation of DS of Fig. 6, and it commences to make one more revolution in the same intermittent manner, thus printing the word Cars.

After this word has been printed, the next impulse of the A&B relay of Fig. 6, coming over conductor C-B-6-9, now runs through impulse bus #3, front contact of armature 1 of relay STB of Fig. 9, back contact of armature 2 of relay EC, back contact of armature 3 of relay EB, armature 5 of relay B-2. (Contact of armature 3 is now open, and contact of armature 4 is resting against armature 5.) The circuit now continues over closed contact of armature 4, back contact of armature 1 of relay A-2, back contact of armature 2 of relay E-B, to armature 3 of end relay EA. As this relay is now held energized, the impulse now runs through the front contact of its armature 3, to end print bus #1, and conductor C-1 of cable CA-B-5-9.

Reference is made to Detail 75 for the circuit after it reaches the end print relay EP of Fig. 5. It is sufficient to state here, that if there were a greater number of words in the display, the printing operation would start from the segments of the first stored section of SC of Fig. 7, and the impulse received at the end of each revolution of DS of Fig. 6 would operate a pair of stepping relays, A and B of Fig. 9, successively until it finally reached armature 3 of end relay EA, in the manner just described.

Relay R, printing display. Detail 71

To show the control of the multi-armature relays of Fig. 8, by action of the R relays of Fig. 9, it is assumed that the printing display will show the sample message A, blank space, V, 8, now occupying section A of SC of Fig. 7. Start relay STA, and end relay EA of Fig. 9 are now held energized, and a circuit from print bus #4 of Fig. 9, front contact of armature 2 of start relay STA, and back contact of armature 6 of relay B-1, energizes relay RA. This front contact of armature 3 of relay RA, now carries current from power bus #2, to section control relay MRA, and the front contact of its armatures completes the circuit from DS buses to row selecting relays 1-A, 2-A, 3-A, and 4-A, of Fig. 8, so that when DS of Fig. 6 is in operation, the stored characters of section A of SC of Fig. 7, are transferred to the control relays of the monogram panels of Fig. 10.

Armatures 1 and 2 of all R relays of Fig. 9 only operate during a running display, therefore they will be disregarded during this description. In the printing display, R relays and MR relays of Fig. 9 bearing the same appended letter always operate together. For action of R relays and MR relays during a running display, see Details 92 and 93.

To demonstrate the control of succeeding MR relays of Fig. 9, when more than one section of SC of Fig. 7 is to be transferred to the display device as a printing display, let it be assumed that the message "Good Cars" occupies section B and A of SC respectively. Relay RB of Fig. 9 would operate relay MRB to energize all row selecting relays controlling all rows of segments of section B of Fig. 7, to print the word Good on the monogram panels. It will then be necessary to energize all row selecting relays, controlling segments of section A of SC in order to connect these segments with the control relays of Fig. 10, in order to print the word Cars. The stepping circuit just mentioned accomplishes this as follows:

When stepping relay B-2 of Fig. 9 operated, as explained in Detail 70, its armature 6 opened the energizing circuit for relay RB, thus releasing relay MRB. At the same time relay RA becomes energized from power bus #2, front contact of armature 2 of now energized stepping relay B-2, back contact of armature 1 of relay E-B, back contact of armature 7 of relay B-1, to relay RA and ground. Thus, every time a stepping relay circuit is used, one R relay becomes de-energized, and the R relay controlling the next section of SC of Fig. 7 to be printed, becomes energized. When the impulse of Detail 69 finally reaches armature 3 of energized end relay EA of Fig. 9, the action of the end print relay EP of Fig. 5, (see Detail 75), cuts current off of the power bus #2, thus restoring any energized B relays, and in turn, any R relays of Fig. 9, to their normal position.

As the dimmer circuit operates during a printing display to bring a printed word up to full brilliance and then to cause it to fade away, its circuits in connection with the operation of the drum selector DS, will now be traced.

The dimmer. Detail 72

On any size drum selector DS, and according to the description of the full printing display, the dimmer DM would operate automatically when a step similar to step 5 of DS of Fig. 6 is reached, causing the lamps of the display device to be gradually lit by the left movement of the wiper arm W of DM, by the elimination of resistance R. On the back or right movement of W, the resistance is again introduced into the circuit, gradually dimming the lamps until they are extinguished.

Commercial current for the lamps of the monogram panels originates at A. C. of Fig. 10, and the series tap runs through cable CA-6-10-AC, to DM of Fig. 6, through its wiper arm W, and resistance R, before returning through the cable to Fig. 10. When DM of Fig. 6 is idle, a closed shunt switch formed by armature 1 of relay DA, shunts out the resistance, but when the circuit is being set up for the operation of DM, relay DA attracts its armatures and opens this shunt switch, thus leaving all of the resistance in the circuit. The ohmic resistance, or impedance (if alternating current is used), is designed great enough to keep any of the lamps of the monogram panels from lighting until the wiper arm W commences to move to the left.

Insulated bumper arm CA, of DM, rests against wiper arm W and switch armatures W-1 and W-2, and forces contact a of this switch open when wiper W is in its normal position (as shown). As soon as W moves to the left, switch arm W-1 and W-2 are influenced by spring S, and their contacts are closed. An auxiliary circuit from battery BA-14, and contacts a, of switch W-1, auxiliary winding of relay DA to ground, holds relay DA energized during the entire reciprocating movement of the dimmer wiper arm W.

The dimmer clutch 64A of Fig. 6 is explained in Detail 30. It is intended that this clutch will make four revolutions while cam C is making only one. This gives the necessary time element to the dimmer, as it is designed to take four times as long to bring a character or word up to full brilliance and back to darkness, as it does to flash it on the monogram panels. The four to one (or any other ratio), is governed by gearing 65-B and 65-C, and the design of clutch 64A guarantees that the dimmer apparatus will come to rest in the position as shown in Fig. 6.

As cam C starts to turn clockwise, armatures of switch C, riding this cam (Fig. 6), now close their contacts, and an auxiliary circuit for dimmer clutch relay DB is formed from battery BA-13, cam switch armatures 3 and 4, auxiliary winding of relay DB to ground. This circuit is broken as soon as cam C completes its revolution.

According to this specification, the dimmer is caused to operate at step 5 of DS of Fig. 6. As DS moves from step 4 to step 5, the small conducting segment ss, inserted in the insulated portion on the first half of step 5 of DS, passes under the brush contact B-C a, and current from battery BA-10 will energize relay D (shown directly under DS). This relay is held up by a stick circuit originating at battery BA-14 (lower right of Fig. 6), back contact b of extension of armature W-2, of the switch controlled by wiper arm W of DM, armature W-2, conductor C-R, stick winding of relay D to ground through the front contact of its armature 1. From attached battery BA-a, armature 3 of relay D now sends current through its front contact, through joint J, conductor C-5-6-12, to operate the dimmer control relays DB and DA.

Armature 2 of relay D now energizes relay M of Fig. 9, which causes all row selecting relays of Fig. 8 to connect the segments of the section to be dimmed, to the display device (see Detail 66).

As soon as cam C turns far enough to close points of its cam switch C, a circuit from battery BA-13 flows through its armature 1 and 2, through conductor C-20, now closed contact c, switch armature W-2, and conductor C-R, to maintain the stick circuit of relay D until the dimmer completes its function.

It will be noted that this cam switch of cam C, as well as make, c, before break, b, contacts of switch armature W-2, both control this stick circuit. They are so timed that the cam switch C will open before this stick circuit is again closed by armature W-1 reaching contact b, at the end of a dimmer operation. This momentary opening of the stick circuit releases relay D, thus assuring one complete revolution of the dimmer apparatus.

Current through conductor C-20, also reaches the A&B relay adjacent to DS of Fig. 6, and the opening of switch C, of cam C (when the dimmer has about finished its operation), would normally cause this A&B relay to function, but the dimmer operation has taken place at step 5 of DS while a contacting portion of its segment is under brush switch p, therefore a branch circuit to relay A from brush contact B-C p, attached to conductor C-20 of DS, holds relay energized, and the impulse will not be effective until step 7 of DS is reached.

Relay DB releases at the end of a dimmer operation, due to the opening of its stick circuit at points 3 and 4 of cam switch C, of cam C of Fig. 6.

At this stage in the dimmer operation, armature 1 of switch A of DB of Fig. 6, now trips the dimmer clutch 61A, and also, through closing of its points at its armatures 1 and 2, restores current to relay 68M, through conductor C-D-2, which allows DS to move to step 6. All characters of one section of SC of Fig. 7 are now printed in full on the monogram panels of Fig. 10. As step 7 of DS of Fig. 6 is reached, the A&B relay functions. This is caused by brush contact B-C p of DS, running on to the insulated portion of step 7, thus depriving relay A of current, and the resulting impulse is sent over conductor C-B-6-9, to impulse bus #3 of Fig. 9.

Relay H. Detail 73

If the printing of all sections of SC of Fig. 7 has been completed, the impulse will reach Fig. 5, over conductor C-1 of cable CA-B-5-9, and will then run through back contact of armature 2 of relay XC, conductor C-10, back contact of armature 4, of relay ER, conductor C-H, through winding of relay H, to a ground, causing relay H to operate. Relay H controls the standard time circuit, and as this feature now enters the cycle of operation according to this circuit of the complete printing display, its action will be explained. (If "Standard Time" is eliminated, the end impulse just mentioned, will run directly to end print relay EP of Fig. 5, over jumper XJ, as described in Detail 75.) Upon operation of relay H of Fig. 5, a stick circuit is formed from battery BA-12, front contact of its armature 1 and stick winding, conductor C-H-S, back contact of armature 5 of relay EP, back contact of armature 2 of relay N, to ground. Armature 3 of relay H, breaks the circuit of relay OP, restoring it to normal. Armature 5 cuts off current to conductor C-PR-5-9, and armature 4 operates standard time circuits.

Standard time. Detail 74

It is to be noted that DM of Fig. 6 is put in use in flashing standard time on the monogram panels. As the ratio of revolutions of the main shaft 65-A, and cam C of DM, is four to one, the use of the dimmer mechanism in displaying time, will not only add a spectacular effect, but will cause the time display to be sustained four times as long as the display of ordinary characters.

From battery BA-13, front contact of armature 4 of relay H of Fig. 5, current is now sent through conductor C-T-5-6, to relay T (lower right of Fig. 6). This circuit is grounded at back contact of armature 3 of relay DA. The top armature 2 of relay T, opens the circuit to relay DA, and its top armature 1 sends current from battery BA-12, to relay A of Fig. 12, over conductor C-T-6-12.

The front contact of armatures 8, 7, 6, 5, 4, and 3, of relay A of Fig. 12, will send current from battery BA-3, conductors of cables CA-12-8-1 to 4, to form the word Time on four monogram panels of the display device. The code according to method A of Detail 7, is as follows; T-3; I-32; M-52, and E-2. Therefore armature 8 of relay A of Fig. 12 will connect conductor 3 of cable CA-12-8-1, to coil number 3 of the character forming relay of monogram panel M-1 of Fig. 10, causing the letter T to be displayed on this first monogram panel. The conductors of the rest of the armatures of relay A, will be connected to their character forming relays of their respective monogram panels in the same manner, and according to the code of method A. If the number of panels is small, the word Time and the actual time will be displayed in the middle of the monogrammic field.

Current from battery BA-3 of Fig. 12 now flows through front contact of armature 2 of relay A, conductor C-6-12-A, to operate relay DB of Fig. 6. Armature 1 of relay A of Fig. 12 operates its B relay of the A&B relay combination. Its purpose is to send the delayed impulse to operate relay TR as soon as relay A is released. (One A&B relay circuit has been explained under Detail 10.) Relay A of Fig. 12 is released as soon as the dimmer arm W of Fig. 6 moves to the left a space sufficient to allow armature W-1 to energize relay DA through its auxiliary winding.

Armature 3 of relay DA now opens the grounded circuit of relay T of Fig. 6, and when relay T releases its armatures, relay A of Fig. 12 is released, and relay TR is caused to operate by the impulse sent out from the A&B relay circuit just mentioned. Thus the flashing of the word Time, on the monogram panels takes place during the first quarter turn of cam C of Fig. 6, and the actual standard time is flashed during the last three quarter movement of cam C. The operation of multi-armature relay TR of Fig. 12 causes standard time to be produced on the monogram panels of Fig. 10, as follows:

Fig. 12 shows a time clock. As there are many reliable clocks now on the market displaying time in various locations by remote control from a master clock which intermittently sends out impulses each minute, only the circuits peculiar to the incorporation of automatic time will pertain to this invention. The hours and minutes of a twelve hour period of the clock of Fig. 12 are assigned their respective code designations according to method A, for illustrative purposes.

It is to be assumed that the minute hand jumps one minute each minute, and the hour hand jumps one hour each hour.

The minute hand of the clock of Fig. 12 consists of a hub H, with six insulated spokes or arms, M-H-1 to M-H-6, spaced ten minutes apart. Dash lines on the multiple hands represent insulated portions, and the ends of each arm, shown in solid lines, consist of conducting material, and are connected to battery BA-1, through terminals (not shown). They energize any code contacts mounted on arcuated strips M-1 to M-6, upon which they rest for the space of one minute.

The contacts of M are spaced one minute apart in the first ten minute space, and represent the code of method A for the figures 0-1-2-3-4-5-6-7-8- and 9. They will be decoded by character forming relays under monogram panel M-4 of Fig. 10.

The hour hand HH of Fig. 12 consists of a conducting arm also connected to battery BA-1, and between hours of 10 and 12, HH will energize arcuated coded strips 2' and 3'. HH will also energize coded contacts of radially mounted strips HC, which run to monogram panel M-2, of Fig. 10. The conductors in cables CA-12-8-1 to 4 of Fig. 12, are multipled to the conductors in the cables CA-8-10-1 to 4 of Fig. 8 respectively, which control the character forming relays of the monogram panels M-1 to M-4 of Fig. 10. Therefore, when standard time is desired, multi-armature relay TR of Fig. 12 is energized by a circuit previously explained in this Detail. All of its contacts close and reproduce the coded instructions of all energized contacts of the clock, on the display device. If there are enough panels, provision will be made to flash the words Standard Time, in the place of Time, previously to the flashing of the actual time. It is to be noted that the hour hand remains in place until an entire hour has passed, and then it moves to the next hour.

All contact segments M-H-1 to M-H-6, of the multiple minute hand, in turn, energize coded minute contacts on arcuated strips M-1 to M-6, but only the hour hand HH energizes the coded hour contacts of HC of the clock of Fig. 12. The coded instructions of HC are flashed on the second panel M-2, of Fig. 10. The arcuated strips A-1, A-2, A-3, A-4, A-5, A-6, also transmit coded instructions, but are energized only by the extended contact arm M-H-1, of the multiple minute hand. These strips, unless the same code continues, are broken every ten minutes, and represent the code to be transmitted to M-3, of Fig. 10. Monogram panel M-1 displays the figure 1 if time is flashed during the hours of ten, eleven, and twelve. Arcuated contact strips 2' and 3', of Fig. 12, represent the code of 1, and are energized by hour hand HH only during these hours.

The time as shown by the schematic clock of Fig. 12 is exactly 11–00, and the four monogram panels allotted to produce standard time, will be energized as follows: Battery BA-1 of Fig. 12, hour hand HH, arcuated code contact strip 2' and 3', through armatures 24' and 23', of multi-contact relay TR, through cable CA-12-8-1, to coils 2 and 3 of the character forming relay of monogram panel M-1 of Fig. 10. Thus 1 is displayed on the first panel. Hour hand HH also energizes code contacts HC-2 and 3, which are connected to armatures 21' and 20' controlling contacts 2 and 3 of cable CA-12-8-2, which run to coil 2 and 3 of the control relays of M-2 of Fig. 10. Thus 1 is displayeed on the second monogram panel. Zero is produced on M-3 of Fig. 10 by a circuit from battery BA-1 of Fig. 12, minute hand extension arm M-H-1, arcuated contact strip A-5, (5 represents zero by the code), through armature 12' of relay TR, and cable CA-12-8-3, to coil 5 of CFR of M-3 of Fig. 10. The same extension M-H-1, of the minute hand, also energizes code contact M-5, which produces zero on M-4 of Fig. 10, through armature 5' of relay TR, and cable CA-12-8-4. In the manner just described, 11–00 is the time flashed on four monogram panels of the display device.

Provision is made to light a "hyphen" between monogram panels M-2 and M-3 of Fig. 10, during the display of standard time. The hyphen is controlled by current from battery BA-2 of Fig. 12, armature 10' of relay TR, and conductor 07, running through cable CA-12-8-3. The hyphen circuit is explained in Detail 97.

If the time circuit is energized while the minute hand is moving the space of one minute, the only change in this illustration would be the de-energization of code contact M-5, by the movement of M-H-1, and the energization of code contacts M-2 and M-3, thus changing zero to one on the fourth monogram panel. The time now displayed would be 11–01.

It will be noted that the arcuated strip A-5 is continuously energized until the arm M-H-1 jumps from 9 to 10 minuates after any hour. When M-H-1 reaches this point, arcuated strips A-2 and A-3 are energized, thus producing the figure one on the third panel of Fig. 10. This contact is held until twenty minutes after any hour, when strips A-1, A-3, and A-4 are energized, thus producing the figure 2 on the third panel. When arm M-H-1 of Fig. 12 is jumping from 9 to 10 minutes past any hour, arm M-H-6 is jumping from 59 minutes past the hour to zero, which again energizes contact M-5. This is followed at ten minute intervals by arms M-H-5, M-H-4, M-H-3, M-H-2, etc., of the multiple minute hand. Dash lines D are used schematically to preserve the continuity of the contact strips A-1, A-2, etc.

From battery BA-2 of Fig. 12, armature 3' of relay TR operates relay DB of Fig. 6 through a joint connection to conductor C-8-12-A of Fig. 12. From battery BA-2, front contact of armature 2' of relay TR, current is sent through conductor C-6-12, to the direct step relay DSR, (center of Fig. 6). This relay now holds its armature 1 against its front contact, so that when the dimmer completes its operation of flashing the standard time on the monogram panels, and operates the A&B relay circuit of Fig. 6, the resulting impulse will be sent over conductors C-B-6-9, front contact of armature 1 of relay DSR, conductor C-S-5-6, of Figs. 6 and 5, upper contact of armature U-1 of relay ER of Fig. 5, to end print relay EP and ground. The action of relay EP completes the cycle of operation as will now be explained.

Relay EP. Detail 75

Upon momentary operation of relay EP of Fig. 5, its armature 1, operates the color change circuit as explained under Detail 57. Its armature 2 opens the stick circuit of relays P and RU of Fig. 5, as explained in Detail 62. Its armature 3 closes a branch circuit to relay OR. Its armature 4 cuts current off of bus CB of Fig. 5, and power bus #2 of Fig. 9, and its armature 5 opens the stick circuit of relay H, causing it to drop its armatures to their normal position. Relay EP drops its armatures as soon as the impulse is over, subject to its slow to release feature, and the entire system will again commence to function according to the instructions set up by the transmitting apparatus of Fig. 1. It is to be noted that there are several circuits of the printing display explained under the following Details, and the end print relay, EP, will set up its proper circuits at the end of the modified circuits.

Modified circuit A. Detail 76

In this modified circuit of the printing display, the drum selector DS, and the dimmer DM of Fig. 6, functions the same as in Details 64 and 72. Printing of the word Time and the flashing of standard time are eliminated from this circuit. Relay D of Fig. 6 operates the dimmer when DDS reaches step 5 in the same manner as described in Detail 72. All of the characters are flashed on the monogram panels at step 6 of DS, and an impulse is sent out from the A&B relay as DS reaches step 7.

According to this modified circuit, when all sections of SC of Fig. 7 have been displayed, the impulse as described in Detail 69 will reach armature 2 of relay XC of Fig. 5 over conductor C-1 of cable CA-B-5-9, and run through its back contact, conductor C-10, jumper XJ, relay EP and ground. As relay XC is not used in this circuit, its armature 2 will remain on its back contact.

The action of the end print relay EP is the same as just described under Detail 75, with the exception that current is cut off of relay OP by the momentary opening of upper armature XU of relay EP. Jumper XJA is removed from conductor C-5, if the apparatus is wired for the operation of this modified circuit. As current to energize relay EP is only an impulse, this relay would restore armature XU, and relay OP would again pick up, and start the printing cycle over again, subject to instructions set up by the dial of Fig. 1.

Modified circuit B. Detail 77

In this modified circuit of the printing display, DS of Fig. 6 is used to flash the words on the monograms letter by letter, at steps 1, 2, 3, and 4.

When step 5 of DS is reached, the monogram panels are blank, then at step 6 of DS of Fig. 6, the entire message as set up on one entire section of SC of Fig. 7 is flashed on the monogram panels. The dimmer and standard time are eliminated from this modified circuit.

Relay D of Fig. 6, and all circuits of Fig. 12, do not operate under this specification. The action of DS is the same as described in Detail 64, until step 5 is reached. Step 6 will flash all characters of a section, and DS will come to rest in its normal position at step 7. Further movements of DS will be governed by relays of Fig. 9. The operation of the end print relay of this modified circuit is the same as explained under Detail 75.

Modified circuit C. Detail 78

In this modified circuit of the printing display, it is possible to spell out a trade name, letter by letter, by the operation of DS of Fig. 6. The trade name is then brought back by the use of the dimmer, followed by the flashing of standard time at the completion of each revolution of DS.

Relay D of Fig. 6, and its connections to brush contact BC a, is eliminated from this circuit, and the dimming of the words, followed by flashing of standard time, is accomplished as follows: As DS of Fig. 5 moves, and brush contact BC a passes the half segment inserted in the insulated portion of the segment at step 5, current from battery BA-10, reaches this brush contact. It then runs through conductor X-C-5-6, to momentarily energize relay XC of Fig. 5, which is used in this modified circuit. This relay will now remain energized by a stick circuit originating at bus CB and CB' of Fig. 5, armature 1 of relay XC, and its stick winding to ground.

The front contact of armature 2 of relay XC now connects relay XE of Fig. 5 with conductor C-1 of cable CA-B-5-9 of Figs. 5 and 9. As step 7 of DS of Fig. 6 is reached, its adjacent A&B relay functions, and an impulse is sent over conductor C-B-6-9, to impulse bus #3 of Fig. 9, through end print bus #7, and back through conductor C-1 of cable CA-B-5-9, upper contact of armature 2 of relay XC of Fig. 5, to relay XE, causing this relay to operate.

X relays. Detail 79

Armature 2 of relay XE of Fig. 5 opens the circuit from bus CB to bus CB'. This cuts off current to the stick circuit of relay XC, and also momentarily opens the circuit to power bus #2, of Fig. 9. Relay XC now drops its armatures to their normal position. The slow to release feature of relay XC, prevents it from dropping its armatures until the impulse has ceased. Current from battery BA-10, and front contact of armature 1 of relay XE of Fig. 5, now flows through relay XG, to ground. A stick circuit for relay XG is formed from bus CB, front contact of its armature 1, stick winding, back contact of armature 2 of relay H, to ground. Armature 2 of relay XG, energized relay M of Fig. 9, from battery BA-11, through conductor C-M-5-9 (see Detail 66). Armature 3 of relay XG breaks the circuit to relay 66M of Fig. 6, thereby causing DS to remain on step 7, its normal position.

The front contact of armature 3 of relay XG energizes relays DA and DB of Fig. 6, over conductor C-5-6-12, causing the dimmer DM of Fig. 6 to operate as explained in Detail 72. The impulse coming at the completion of the revolution of cam C of the dimmer, now comes over conductor C-I, of cable CA-B-5-9, lower contact of armature 2 of relay XC of Fig. 5. It is to be noted that relay XC is not now energized, and the current coming over its armature 2 now leaves its back contact, conductor C-10, back contact of armature 4 of relay ER, of Fig. 5, (jumper XJ is not used in this detail), conductor C-H, through winding of relay H, to ground. This causes relay H to operate and produce standard time on the monogram panels, as explained in Detail 74. The operation of relay H restores relays XG and OP to their normal position. As this completes the cycle of operation, further displays will be governed by the instructions set up by the dial of Fig. 1.

Modified circuit D. Detail 80

That my complete system of electric display is adaptable to further simplification, will be evidenced by the following, in which a modified circuit of the printing display is outlined, whereby the drum selector DS, and dimmer DM of Fig. 6, and the automatic time apparatus of Fig. 12, are all eliminated. The printing display according to this Detail, will print on the monogram panels, a succession of words only, and without spelling each word. The running display feature is not disturbed in this circuit, and its use with either of the modified circuits is optional.

Relays P and OP of Fig. 5 are energized, and the extra armature XA of relay OP, (used only in this modified circuit), now holds relay M of Fig. 9, energized over conductor C-M-5-9, as explained in Detail 72. Relays XC, XE, XG, and H, of Fig. 5. The A&B relay, relay D, the drum selector DS, and the dimmer mechanism of Fig. 6, and all apparatus of Fig. 12, are eliminated from this modified circuit. The printing of characters of the various sections of SC of Fig. 7, is accomplished and timed by the movement of cam D, which is integral with cam B, of Fig. 6.

During the last quarter of each revolution of cam D of Fig. 6, current from battery X-BA is sent through cam switch armature XI, and conductor X-C. This conductor joins conductor C-B-6-9 on Fig. 6, leading to the impulse bus #3 of Fig. 9. This impulse eventually operates the stepping relays or the end relay of Fig. 9, as explained in Detail 69.

Let it be assumed that the sample message Good Cars is set up on two sections of SC of Fig. 7, and it is to be flashed on the monogram panels of Fig. 10, word by word indefinitely. As soon as the word Good is printed, switch point X, at cam D of Fig. 6 closes and causes an impulse to be sent to the stepping relays of Fig. 9, as explained in Detail 70. When the last word Cars of this sample message has been printed on the monogram panels, the next impulse sent out from cam D of Fig. 6, through switch point X, runs to the impulse bus #3 of Fig. 9, end print bus #7, back through conductor C-I of cable CA-B-5-9, back contact of armature 2 of relay XC of Fig. 5, through jumper XJ, and direct to the end print relay EP, which now operates in the same manner as described in Detail 75.

Modified circuit E. Detail 81

If it is desired to incorporate standard time in modified circuit D, jumper X-H of Fig. 5 is attached to lower contact of armature 2 of relay XC, and conductor C-10 is disconnected therefrom. When the final impulse comes over conductor C-I of cable CA-B-5-9, it will now flow through back contact of armature 2 of relay XC, jumper X-H, conductor C-H, to relay H and ground. This results in the flashing of the word Time, followed by the flashing of standard time on the monogram panels as explained under Detail 74. The action of end print relay EP will again cause the message to be repeated.

Circuit breakers. Detail 82

In order to prevent excess arcing of the contacts of the character forming and panel color relays of Fig. 10, provision is made to make and break the current at circuit breakers as follows; A lighting current relay having heavy duty contacts is furnished each monogram panel for this purpose. These circuit breaking relays are designated "LC" relays. Their operation is so timed that commercial current, probably A. C. is connected, by the operation of their armatures to the illuminable devices of the panels, after the character forming relays of the panels have their armatures aligned for display of the proper characters. A. C. is also cut off before the character forming relays release their armatures. This is accomplished by the timing of switch points I, 2, and 3, of switch A. of cam A, which is fixedly secured to the main shaft 65 of Fig. 6.

Refer now to Fig. 10, wherein LC relays I to 4 are each connected to a local battery BA at one terminal, and have the other terminal commonly connected to conductor C-R-6-10, which is connected to armature I and selectively grounded by armature 2 of switch A of cam A of Fig. 6. Details 28 and 29, explain how one revolution of the main shaft 65 of Fig. 6 is utilized to produce a one step movement of its selectively controlled apparatus. Cam A, being fixedly secured to shaft 65 therefore causes its switch armature 2 to contact armature 3 during the fourth and first quarter turn, and contact armature I during the second and third quarter turn. The ratchet arms 68A and 69A. of disc 66 of shaft 65 of Fig. 6, are so designed as to complete their selective movements and circuits during the first quarter turn of shaft 65.

By the time cam A of Fig. 6 has moved one quarter turn, the character forming relays at the monogram panels of Fig. 10 have their circuits aligned, and armature 2 of cam A of Fig. 6 is now released, and grounds armature I and its connected conductor C-R-6-10, thus causing LC relays of Fig. 10 to close their heavy duty contacts and send A. C. to lamps previously selected by said character forming relays. The LC relays of Fig. 10 are left energized until cam A of Fig. 6 reaches its last quarter turn, when armatures 2 and I again separate and remove ground from conductor C-R-6-10. Previous to this cam operation, the character forming relays of Fig. 10 have opened their contacts.

In running displays, where characters are intermittently and successively flashed on the panels of the monogrammic field from right to left by the operation of SC of Fig. 7, switch A of cam A of Fig. 6 causes the LC relays of Fig. 10 to operate in the manner just described.

Circuit breakers for dimmer. Detail 83

As explained in Detail 72, it requires four revolutions of the main shaft 65 of Fig. 6 to make one revolution of dimmer cam C to which wiper arm W, of DM is connected. It is necessary during the entire reciprocating movement of W, to maintain the contacts of relays LC-I to 4 of Fig. 10. This is accomplished by armature 2 of relay DA of Fig. 6, which, when energized furnishes an auxiliary ground for conductor C-R-6-10.

Circuit breakers for DS. Detail 84

During one phase of the operation of the printing display, DS of Fig. 6 spells the message letter by letter. During this period, if some provision were not made to hold the LC relays of Fig. 10 energized, each letter would not retain its current. This is overcome by the stick, or auxiliary winding of LC relays LC-I to 4 of Fig. 10, as follows: When DS of Fig. 6 moves from step 7 to step 1, current from battery BA-10, the brush contact B-C b, conductor C-1, cable CA-6-10, reaches Fig. 10 (shown at lower left corner). Thence through conductor C-I, stick or auxiliary winding of relay LC-1, to its armature 1. As soon as this relay responds to the operation of cam A of Fig. 6, this stick circuit is completed through its armature 1, conductor CG", to ground at armature 1 of relay CG, at lower right of Fig. 10. Relay CG is only energized during spelling operations of DS of Fig. 6, by the engaging of brush contact B-C s, connected to conductor C-6-10, of Figs. 6 and 10.

As herein illustrated, this segment extends from step 1 to step 4 of DS of Fig. 6. This constitutes the spelling portion of a drum selector designed for a four monogrammic panel display apparatus. As DS moves to step 2, and relay LC-2 of Fig. 10 is energized by the revolution of cam A of Fig. 6, a circuit over conductor C-2 of cable CA-6-10, to armature 1 of relay LC-2 of Fig. 10, completes the stick circuit of this relay, causing it to be held energized in like manner. In turn, relays LC-3 and LC-4 of Fig. 10 will operate and each relay will remain energized until its stick circuit is broken by the movement of DS of Fig. 6 from step 4 to step 5. This will cause the circuit of conductor C-6-10 to open, and release relay CG of Fig. 10.

Running display. Detail 85

During the operation of a running display, the drum selector of Fig. 6, (DS), is inoperative, and remains in its normal position, but the rotor of SC of Fig. 7 is caused to revolve intermittently in the direction of arrow A, shown on Fig. 7. This same movement was imparted to the rotor of SC, while the characters were being transmitted to its storage relays, as explained in Detail 34.

The segments in each row of each section of SC are a part of the stator, and are permanently wired to respective character forming, color, and hyphen relays of the panels of Fig. 10, through the selecting mechanism explained in Detail 65. The segments of the first row of each section, I-A, I-B, I-C, I-D, etc., are selectively multipled to the first monogram panel M-1, of Fig. 10. Segments of the second row of SC, 2-A, 2-B, 2-C, etc., are selectively multipled to the second monogrammic panel, M-2.

It is apparent that if the locked brush switches of the rotor, upon which the message is stored, are caused to pass in contact with segments of successive rows of the stator of SC, the effect on the monogram panels, would be a running or travelling display, wherein the characters move through the display field from right to left.

As an illustration, let it be assumed that the sample message set up on section A of SC of Fig. 7, is to be run through the monogram panels. As the rotor of SC starts its intermittent movement, the locked brush switches, now in row I-A, of its section A, pass in contact with segments of row 4-B, in section B of SC of Fig. 7, next in contact with segments of row 3-B, then in contact with segments in row 2-B, and then segments of row I-B (only a portion of the rows of section B of SC are shown on Fig. 7). As all rows of the stator, bearing the number 4, are selectively multipled to monogram panel number M-4 of Fig. 10, the first letter or character of the message, (in this case the letter A), enters the display field at monogram panel M-4. At each step movement of the rotor of SC of Fig. 7, this character A moves to monogram panel M-3, then to M-2, and then to M-1, of Fig. 10, followed in like manner by characters stored on locked brush switches of the rotor, marked 2A, 3A, and 4A, of section A. If the monogram panels are in vertical alignment, the travelling, or running message will preferably start at the bottom, and move toward the top of the display field.

It is apparent, that if the rotor of SC were allowed to stop when the characters stored on rows of brush switches of the rotor, were in contact with segments of the stator of section B, the message would still be on the display field. It is therefore necessary to continue the operation of the rotor of SC, until the message passes entirely through all of the monogram panels, and brings the locked brush switches of the rotor to rest in contact with segments of section C of the stator of SC of Fig. 7.

Reserved section of SC. Detail 86

If a running display is contemplated, and all sections of SC are occupied with the message, the movement of the rotor, as required in a running display, could not function properly. At least one section of the stator, directly ahead of the sections whose segments are in contact with the locked brush switches upon which the message is stored, must be reserved. When the locked brush switches of the rotor, containing the message, pass in wiping contact with the segments of this extra or reserved section of the stator, the selector relays of Fig. 9, cause these segments to be automatically connected to the character forming and color relays of the monogram panels of Fig. 10. The action of relays of Fig. 9 is more fully described under Detail 92.

It is to be noted that start segments under start relay ST, of SC of Fig. 7, are only inserted in the insulated strip 73 of the stator, in the first row of each section, and that end segments, under end storage relay E, are inserted only in the insulated strip of the stator in the last row of each section. As these segments control the start and end relays of Fig. 9, it is to be noted that in a running display, although the movement of the rotor of SC will cause a different set of these start and end relays to become energized, the limits of the display are always confined between the first start brush switch, and the last end brush switch, regardless of their new location around the circumference of the stator, or regardless of how many intermediate sections of SC are occupied with the characters of the message.

Relay 97. Detail 87

Upon dialing 9-7, relays 9 and 7' of the distributor of Fig. 3, will line up their armatures, so that when the impulse comes over conductor C-2-3-4, (see Detail 17), it will flow through front contact of armature 1 of relay 9, back contact of armature 13 of relay 8', front contact of armature 13 of relay 7', through conductor C-97, cable CA-2-5, to conductor C-97, and relay 97, (top of Fig. 5), to ground. The armatures of this relay lock up under latch L2, and remain on front contact until released by this latch, actuated by relay 90, as explained in Detail 45. When the time clock cuts "on," current flows from battery BA-1, through operating contact of OTC, front contact of armature 2 of relay 97, through relay RU, to ground. Relay RU has a slow to pick up feature, so that if relays P and RU of Fig. 5 are energized at the same time, relay P, controlling the printing display will operate first.

Relay RU. Detail 88

It is assumed in the present description, that only the running display is to be operated. Relay P of Fig. 5 will remain in its normal position, but armatures of relay 97 will be locked up, and relay RU will be energized. The back contacts of armature 2, 2a and 3, of relay RU, have broken connections to conductors C-ER-5-6, C-5-6-A', and C-ER'5-6 respectively, thereby disconnecting the erase circuit (see Detail 41).

From battery BA-2, back contact of armature 2 of relay P, front contact of armature 3 of relay RU, current is now sent through conductor C-6, to relay OR and ground, at back contact of armature 3 of relay ER. From battery BA-5, current is sent through front contact of armature 4, of relay RU, to energize conductors C-5-7, (see Detail 60). Armature 1 of relay RU controls its stick circuit as traced in Detail 62.

Relay OR. Detail 89

Relay OR is the "operate run" relay controlling the running display. Front contact of its armature 1 carries a stick circuit from battery BA-8, through its stick winding, and joins a common ground running to back contact of armature 3 of relay ER. The circuit running to "operate print" relay OP is broken at back contact of armature 2 of relay OR. A circuit from battery BA-9 of Fig. 5, front contact of armature 4 of relay OR, front contact of armature 7 of relay RU, conductor C-AD-5-6, energizes advance relay AD, of Fig. 6 (see Detail 33).

Armature 5, of relay OR, energizes stick bus #1 of Fig. 9, over conductor C-SC-5-9, (see Detail 93). Armature 6 energizes relay M of Fig. 9, over conductor C-M-5-9. Armature 7 energizes the motor relay 6 of Fig. 6, over conductor C-5-6-6, and the back contact of 7 opens the circuit to clutch relay 68M.

Relay ER. Detail 90

At the completion of the running display operation, current finally reaches end run bus #6 of Fig. 9, and runs through conductor C-2' of cable CA-B-5-9 of Figs. 9 and 5, to the end run relay ER of Fig. 5, and ground. This relay, in operating closes a stick circuit through front contact of its armature 1, back contact of armature 3 of relay N, to ground at front contact of armature 6 of relay H. As this relay is not in use in this Detail, it will be disregarded for the present. Its operation is explained under Detail 73.

Armature 2 of relay ER changes the color circuit as explained under Detail 57. Its armature 3 breaks the stick circuit of operate run relay OR, allowing this relay to drop its armatures and releasing circuits described in Detail 89. It is to be noted that dropping of armature 5 of relay OR releases the stick circuit of bus #1 of Fig. 9, thus releasing any R relay that was held up by this stick circuit (see Detail 93).

Relay L. Detail 91

Relay L, at upper right of Fig. 5, is used in running displays only. Its function is to energize run bus #5 of Fig. 9, and de-energize this bus as soon as the rotor of SC of Fig. 7 starts to move in its operation of producing running displays. It will be noted in Detail 68, that the start and end brush switches, that control the limits of the message set up on the rotor of SC, constantly energize their respective relays on Fig. 9 during the operation of the printing display. As these brush switches are part of the rotor, they move during the operation of the running display, therefore it is only necessary to energize run bus #5 of Fig. 9 temperarily, so that when the now moving start brush switch reaches the next segment, no current flows.

It is necessary in a running display, to deprive all intermediate start segments of current so as to allow the complete message to proceed through the advance or extra section of the stator of SC. Relay L of Fig. 5 accomplishes this as follows: Current from battery BA-9 of Fig. 5, front contact of armature 3 of operate run relay OR, front contact of armature 6 of relay RU, (now held up), back contact of armature 1 of relay L. (The ground circuit of relay L, over conductor C-GR-5-6 is open, therefore this relay has not yet operated.) The circuit continues from back contact of armature 1, conductor C-L-5-9, to run bus #5 of Fig. 9. It is to be noted that print bus #4 of Fig. 9 is not in use during the operation of the running display.

As soon as the main shaft 65 of Fig. 6 approaches the last quarter turn of its first revolution, its cam D (intergral with cam B), causes its switch armatures 1 and 2 to close, thus completing a ground for relay L of Fig. 5, from joint connection at base of its armature 1. The circuit to this point is now energized as just traced and continues through winding of relay L and conductor C-GR-5-6, of Figs. 5 and 6. As soon as cam D completes the circuit to ground, relay L of Fig. 5 picks up its armature 1 and it now remains up by a stick circuit running through front contact of its armature 1, stick winding of relay L, to local ground. Back contact of its armature 1 has opened, therefore current over conductor C-L-5-9, to run bus #5 of Fig. 9 is now cut off. In the manner just described, the run bus #5 of Fig. 9 is momentarily energized, and then held de-energized until the start of another cycle of operation of the running display. The control of the circuits of SC will now be explained.

Selector circuits. Detail 92

During the operation of a running display, current from armature 6 of relay OR has now energized relay M of Fig. 9, over conductor C-M-5-9 of Figs. 5 and 9. This relay energizes all multi-armature relays of Fig. 8 connecting the segments of SC of Fig. 7, to the control relays at the monogram panels.

Its function during the running display is to connect the segments of the advance or extra section to the display apparatus. Advance relay AD, of Fig. 6 is also in operation from armature 4 of relay OR of Fig. 5 as explained in Detail 33, and it is assumed that the rotor of SC is being moved step by step, as described in Detail 34.

Current through armature 5 of relay OR, and conductor C-SC-5-9, energizes stick bus #1 of Fig. 9. Until relay OR is released, any R relay of Fig. 9 will be held in operation by this stick circuit, through its armature 1, stick winding and ground. As pointed out in Detail 86, an extra or reserved section of SC, ahead of sections of the rotor occupied by the message, must be provided for running displays, therefore, the R relay controlling this advance section must be held energized.

All relays of Fig. 8 and Fig. 9, with the exception of the R relays of Fig. 9, are designated by the same appended letter as the sections of SC of Fig. 7 that they control. Relays and circuits of Figs. 8 and 9 are symmetrical and are built around the periphery of SC. All buses of Fig. 9, and the connecting circuits of Figs. 8 and 9, will represent a complete circle. If the sample message of Fig. 1 is to be run through the monogrammic field, the locked brush switches of section A of SC of Fig. 7 will now pass segments of section B of SC. After this message has passed entirely through section B, it comes to rest on section C of SC (not shown). Stick bus #1, and power bus #2, are the only buses of Fig. 9 that are now in use. When run bus #5 is temporarily energized by the circuit of Detail 91, front contact of armature 3 of start relay STA of Fig. 9, sends this temporary circuit from run bus #5, to relay RB and ground. This relay is held up by the stick circuit of Detail 93. Current from power bus #2 now flows through front contact of armature 3 of relay RB of Fig. 9. As all DS buses of Fig. 9 are now energized by relay M, the row selecting relays B-1 to B-4 of Fig. 8 close their multi-armature contacts (only B-4 is shown on Fig. 8).

Armature 3 of relay RB energizes section control relay MRB, thus connecting the relays of Fig. 8 with the DS buses of Fig. 9. The relays of Fig. 8 that are now energized connect segments of section B of SC to the character forming relays of the monogram panels. As the locked brush switches of the rotor of section A of SC of Fig. 7 pass the segments of the stator of section B of SC, the stored characters of section A will be produced on the monogram panels as a running display, and come to rest on section C of SC.

Current from stick bus #1 of Fig. 9, through armature 2 of relay RB, will energize armature 4 of end relay EC. In the movement of the rotor, when the end locked brush switch reaches the end segment in row 4B of section B of SC, it will cause end relay EB to operate. This will have no effect, as there is no current in any of its armatures. However, when all of the rows of brush switches containing the message have moved in wiping contact with all of the rows of segments of section B, end relay EC of Fig. 9 will lift its armatures.

It is assumed that the sample message of section A of SC of Fig. 7, has passed through section B and come to rest on section C, and that the end brush switch has contacted the end segment in the last row of section C of the stator. This causes end relay EC of Fig. 9 to operate. Current is already in its armature 4 as just mentioned, and will now flow through its front contact to end run bus #6, through conductor C-2' of cable CA-5-9, to the proper end run circuits of Fig. 5 (see Detail 90). If the dialed instructions call for the running display to be repeated, relay ER of Fig. 5 will be only momentarily energized, as explained in Detail 93. The stick circuit will be released, and relay RB of Fig. 9, and relay MRB, and row selecting relay B-1 to B-4 become deenergized. Relay OR will again become energized, and SC will cause the running display to be repeated.

The locked brush switches containing the message are now resting against segments of section C of SC. The start brush switch in row 1 of section C now energizes start relay STC of Fig. 9 (not shown). When the circuit of Detail 91 again temporarily energizes run bus #5, current will flow through front contact of armature 3 of relay STC, to energize the R relay controlling the next extra or blank section (in this case, relay RD, for section D, not shown). Current has been restored to stick bus #1, and relay RD is held up by this stick circuit, through its armature 1. Its armature 3 now operates relay MRD, which connects the rows of segments of section D, through relays of Fig. 8, to the panels of Fig. 10. Armature 2 of relay RD, now sends current from the stick bus to armature 4 of end relay EE, (not shown), and the circuit now runs to end run relay of Fig. 5, causing this relay to operate.

It has just been shown how, in a running display, the start relay of Fig. 9, not only energizes the R relay controlling the extra or blank section of SC of Fig. 7 directly ahead of those opposite sections of the rotor occupied with coded characters of the message, but it also sets up the circuit for stopping the display, after it has passed through this section, and come to rest on the section ahead of this extra section. It is to be remembered that the new extra section automatically becomes the one ahead of the section occupied with the message, when a running display is to be used.

As a further demonstration of the flexibility of the control apparatus of my improved electric display system, and to further show operations of the section selectors of Fig. 9, the names of the forty eight States will be used.

Let it be assumed that these State names are stored on locked brush switches of sections number 1 to 48 of a controller such as SC of Fig. 7, but containing 50 sections. Section A represents number 1 and section Z represents number 50. The message would occupy 48 sections of brush switches, therefore section number 49 would be the first blank section of segments of the stator of SC that the entire rotor would pass that carry the message.

The locked start brush switch explained in Detail 42, has moved during the storing process, and is now resting against its start segment in the first row of section 48. The locked end brush switch was set after the storing process was completed, as explained in Details 37 and 38, and is now resting in contact with its end segment in the last row of section number 1, represented as section A of SC of Fig. 7.

Operate running display code number 9-7 is now dialed and current is sent to all locked brush switches of SC of Fig. 7, as explained in Detail 60, thence through the start segment to energize the start relay on Fig. 9, representing section number 48 of SC, (not shown). This start relay energizes an R relay of Fig. 9 that controls the first section in advance of those opposite the message (section number 49, not shown).

As the locked brush switches of each of the forty-eight sections of the rotor of SC on which the message is stored, pass successively in wiping contact with the segments of this extra or reserved section 49, the names of the forty-eight States will appear on the monogram panels as a running display, and will cross the monogrammic field from right to left.

In order to have the message run entirely through the display field, the rotor of SC must not be stopped until the end brush switch in the last occupied section of the rotor passes through section 49 and makes contact with its end segment in the last row of section 50. This would leave the occupied sections of the rotor opposite sections of the stator number 50 and number 1 to 47. The start brush switch has now moved almost completely around the periphery of SC, and contacts its start segment in the first row of section 47. If the running display is to be repeated, current would again be sent through the start segment of this section, to its respective start relay of Fig. 9, and the R relay controlling the first extra or blank section ahead, (number 48), would cause segments of this section to be connected to the character forming relays of the monogram panels of Fig. 10.

As the sections of the rotor, occupied with the names of the forty-eight States pass segments of this section number 48, these State names will again appear to run across the display field. When the locked end brush switch makes contact with the end segment in the last row of section 49, the locked brush switches of the rotor occupied with the message, would now come to rest on sections 49 and 50, and 1 to 46 of the stator. Section number 47 would be the next section to have its segments connected to the relays of the display device through relays of Figs. 8 and 9. When the message passes entirely through and pass the segments in wiping contact, it would come to rest on sections numbered 48 to 50, and 1 to 45, thus leaving section number 46 as the next blank or extra section to be used in further running the display of the forty-eight State names.

No matter how many sections of SC are occupied with a message, or how many sections are left blank, or how they come to rest around the periphery of SC after the running display has been completed, the first section of the stator ahead of the occupied sections of the rotor will automatically be connected to the character forming relays of the monogram panels of Fig. 10. Sections of SC are further described in Details 22 to 24.

*Stick circuits of Fig. 9. Detail 93*

For continuous operation of the running display, let it be assumed that the operate run relay OR, and its control relay RU, are the only relays energized in the control circuits of Fig. 5. The R relay of Fig. 9, controlling the first advance section of the stator of SC of Fig. 7, is the only one held up by the stick circuit coming over stick bus #1 of Fig. 9.

Each time the message passes entirely through the display field, and the locked end brush switch of SC of Fig. 7, makes contact with its segment, current from stick bus #1, of Fig. 9, flows through front contact of armature 2 of the R relay, and causes end run relay ER of Fig. 5 to operate. Relay ER will not be held up by its stick circuit, because this circuit is open at armature 6 of relay H of Fig. 5. The operation of the stick circuit of relay ER is explained in Detail 94. The circuit for operate run relay OR is now opened at armature 3 of relay ER, causing relay OR to drop its armatures. The stick circuit to stick bus #1 of Fig. 9, originating at armature 5 of relay OR of Fig. 5, will momentarily open. This causes the stick bus to become deenergized, which causes any R relay of Fig. 9 to also become de-energized. This in turn, cuts current off of end run bus #6 of Fig. 9, and end run relay ER of Fig. 5 is de-energized, allowing relay OR to again send current to stick bus #1, of Fig. 9, and through circuits governed by its armatures for the operation of another running display.

By referring to Detail 91, it will be seen that current is again temporarily sent to run bus #5 of Fig. 9, through the operation of the L relay of Fig. 5. Thus the start brush switch and segment of SC of Fig. 7, energizes the proper start relay ST, of Fig. 9, and the characters again proceed through the display panels of Fig. 10. The system is so designed, that the action of the relays will not cause SC of Fig. 7 to halt the intermittent movement of the rotor, if the running display is to be repeated. In the above Detail, the repeating of the running display is contemplated, therefore this description is deemed sufficient.

*Modified time circuit. Detail 94*

As it may be desirable to display standard time at intervals when the apparatus is to be used only as a running display, the following circuit is traced as a modification. At the completion of a running display, end run relay ER of Fig. 5, in operating, closes a stick circuit from battery BA-6, front contact of its armature 1, stick winding of relay ER, back contact of armature 3 of relay N, to ground at front contact of armature 6 of relay H of Fig. 5. As soon as this relay is energized, current from battery BA-3, back contact of armature 4 of relay P of Fig. 5, (not now operating), conductor C-7, back contact of armature 1 of relay N, front contact of armature 5 of relay ER, conductor C-H, winding of relay H, to ground, now energizes relay H. This relay operates in time to complete the stick circuit through its armature 6, for relay ER, as just traced.

The slow to release feature of relay ER furnishes the necessary time element for this operation. Relay ER will now remain energized until this stick circuit is interrupted. Its armature 3 opens the circuit of the operate run relay OR, causing that relay to drop its armatures and stop the movement of the rotor of SC of Fig. 7. Armature 4 of relay ER of Fig. 5 opens a branch circuit to relay H, and armature 5 of relay ER operates relay H, as just traced.

Relay H in operating, causes the word Time, followed by standard time, to be flashed on the monogram panels of Fig. 10 in the same manner as described in Detail 74, with the following exceptions. The impulse sent out by the A&B relay of Fig. 6, at the end of the movement of cam C of the dimmer, now comes through front contact of armature 1 of relay DSR.

By using the dimmer in the production of standard time, a more spectacular effect is now had, and as it takes four times as long to flash standard time than to flash any other character, the time gradually appears and gradually dis-appears. Relay DSR is located on the center of Fig. 6, and the resulting impulse at the end of the time operation comes from the A&B relay of Fig. 6, front contact of armature 1 of relay DSR, conductor C-S-5-6 of Figs. 6 and 5, lower contact of upper armature U-1 of relay ER of Fig. 5, through relay N, to ground. Relay N, in operating, releases the following circuit.

Armature 1 of relay N, opens the main circuit of relay H of Fig. 5, its armature 2 opens the stick circuit of relay H, and also opens the stick circuit of relays P, and RU of Fig. 5, as explained in Detail 62. Its armature 3, opens the stick circuit of relay ER.

Alternate display. Detail 95

If both numbers 8-7 and 9-7, of the code chart of Detail 7, are transmitted by the dial of Fig. 1, SC of Fig. 7 will produce the message on the monogram panels of Fig. 10, first as a printing display, and then as a running display, and continue to alternate the nature of the display until some other coded instructions are received. The change over circuit is as follows.

Let it be assumed that both relays 87 and 97 of Fig. 5 are energized in response to the dialing of their code numbers, and that the time clock OTC of Fig. 5, is "off." When OTC cuts "on," current will flow from battery BA-1, through the front contacts of the armature of time clock OTC, armature 2 front contact, of relay 87, to relay P, and ground.

Current from battery BA-1 will also flow through front contact of armature 2 of relay 97, through relay RU of Fig. 5, to ground. On account of the slow to pick up feature of relay RU, relay P, controlling the printing display is given the preference, and will pick up its armatures first. Relays P, and RU are held up by a stick circuit, as described in Detail 62.

The circuit to operate print relay OP of Fig. 5 is described in Detail 63. Current to operate run relay OR of Fig. 5 coming from battery BA-2, back contact of armature 2 of relay P, front contact of armature 3 of relay RU, and conductor C-6, is now cut off because the back contact of armature 2 of relay P is open. Therefore, during the operation of the printing display, relay OR remains in its normal position.

If standard time is to be displayed in this alternate printing and running display circuit, it now operates according to Details 73 and 74. At the completion of the display of standard time, end print relay EP, of Fig. 5 operates according to the circuits of Detail 75.

The stick circuit of relays P and RU, of Fig. 5, over conductor C-2, is broken at armature 2 of relay EP, but neither of these relays release, unless relay 90 of Fig. 5 has been operated. This action is explained in Detail 62. As the running display is to follow, relay RU of Fig. 5 is still energized, and the front contact of armature 3 of relay EP, now completes a circuit to operate run relay OR, as follows: Battery BA-5, front contact of armature 5 of relay RU of Fig. 5, conductor C-3, front contact of armature 3 of relay EP, winding of relay OR, to ground at back contact of armature 3 of relay ER. Relay OR now causes a running display to be produced on the monogram panels, as described in Detail 85.

At the end of the running cycle of operation, end run relay ER, of Detail 90, is caused to operate. It is assumed that the running display ran through the monogram panels only one time. It is assumed that relays P and RU of Fig. 5 will remain energized. Relay OP will now operate the printing display, followed by flashing of standard time, then again followed by the running display. These displays continue to alternate until either one or both relays P and/or RU of Fig. 5, are released.

Hyphen circuit. Detail 96

Refer now to Fig. 11, on which is diagrammatically shown three display panels M-1, M-2, and M-3, with their hyphen lamps. These lamps will at certain times, be illuminated all across the display field, and at other times only the hyphen lamps between monogram panels will be in use. The common connection for all lamps in this figure is shown solid to distinguish it from the circles representing lamps.

Whenever cam A of Fig. 6 causes the LC relays of Fig. 10 or Fig. 11, to become energized, as explained in Details 82 to 84, current is sent from battery BA-1, armature 1, of relay LC-1 of Fig. 11, armature in row A of the character forming relays C-F-1, to relay H-1. If the monogram panel M-1 is to remain blank, none of the relays of C-F-1 will operate, consequently this circuit will reach relay H-1 and ground. The H relays of Fig. 11 are hyphen control relays that selectively control hyphen relays between and across monogram panels. Relay 07 is the hyphen relay controlling the hyphen between monogram panels. Relay H-1, in operating, will send current from A. C. through front contact of its armature 1, to the common contact of the hyphen lamps of M-1, of Fig. 11.

For the sake of clearness, armatures number 1 of LC relays of Fig. 11, are not shown on Fig. 10, and the hyphen relay 07 and circuits are only diagrammatically illustrated.

A. C. from front contact of armature 2 of relay H-1 will send current to the common contact of hyphen lamps between monogram panels M-1 and M-2. The same circuit applies to armatures of relays H-2 and H-3, with the exception that armature 2 of these relays light the hyphen lamps ahead of their respective monogram panels, and their armature 3 cause the hyphen lamps following the monogram panels to become illuminated. The branch circuit of A. C. running through cable CA-6-10, runs through the dimmer, as explained in Detail 72.

It will be noted that whenever cam A of Fig. 6 energizes the LC relays of Fig. 11, the row of hyphen lamps entirely across the display field will be lighted unless one or more of the character forming relays of that particular row are energized. For instance, if monogram panels M-1 and M-3 are to display a character, and M-2 is to be left blank, some of the armatures in row A of C-F-1 and C-F-3 will be attracted, thus breaking the circuit to relays H-1 and H-3. Relay H-2 however, has not had its circuit broken from battery BA-2, and in operating, armature 1 of relay H-2 lights the hyphen lamps of M-2. Armature 2 lights the hyphen lamps between M-1 and M-2, and armature 3 of relay H-2 lights the hyphen lamps between M-2 and M-3. Relays H-1 to H-3 of Fig. 11 automatically control the hyphen circuit when monogram panels are to be left blank. Detail 7 shows that 07 is the hyphen code number and storage relay 87 of SC of Fig. 7 controls the hyphen display on the monogram panels of the display.

Hyphen relay. Detail 97

In explaining the hyphen, the monogram panels of Fig. 11 are to be used as a printing display, and a hyphen is to appear between panels M-1 and M-2. Relay 07, in the same row containing relays of C-F-2 will become energized, subject to relays Fig. 8, as explained in Detail 65. Current from A. C. will flow through front contact of armature 1 of relay 07, to light the hyphen lamps between M-1 and M-2. Armature 2, of relay 07, breaks the circuit to relay H-2, therefore whenever a hyphen relay 07 is energized by its segment of SC of Fig. 7, it in turn controls the local hyphen circuit by confining the hyphen to the space between monogram panels. This circuit is illustrated on Fig. 10, where relay 07, of C-F-4 is energized, thus connecting one side of A. C. to the hyphen lamps between M-3 and M-4.

*Lamp return circuits. Detail 98*

Reference is now had to Fig. 10, wherein the third monogram panel M-3, displays the letter V, in green. It is assumed that locked brush switch 71, in row 3A, under storage relay G of SC of Fig. 7, sends current through multi-armatures of Fig. 8, to relay G-3 of monogram panel M-3 of Fig. 10, causing it to move to its energized position, as shown.

Coils 6 and 5, of C-F-3 of Fig. 10, are also energized from SC of Fig. 7, to print the letter V on M-3. The circuit on Fig. 10, for the letter V, in green, is as folows: From A. C. front contact of armature 2 of now energized relay LC-3, through selective armatures of relays of C-F-3, (5 and 6, for the letter V), common conductor C-C, to lamps forming the letter V on the monogram panel M-3, of Fig. 10. This letter is set up on SC of Fig. 7 to be printed in green.

The circuit now leaves the lamps of monogram panel M-3, through return conductor C-G, front or operating contact of armature 2 of green panel color relay G-3, through resting, or back contact of armature 1 of red panel color relay R-3, to front contact of armature 3 of relay LC-3, to the other side of A. C.

When no panel color relays of the display device are energized, all white lamps will be displayed. As the yellow lamps of the monogram panels are lighted by a somewhat different circuit, special attention is called to panel color relays G-4 and R-4 controlling the color of monogram panel M-4 of Fig. 10. The figure 8 is to be displayed hereon, in yellow. As previously mentioned, when this color is desired, both panel color relays G and R will be energized. A. C. now comes from front contact of armature 2 of relay LC-4, selective armatures of C-F-4 (4-2-1, or 1-2-4, for the figure 8), common contact C-C, yellow lamps of M-4, return conductor C-Y, lower, or operating contact of armature 1 of panel color relay G-4, and lower contact of armature 1 of panel color relay R-4, back to A. C. through front contact of armature 3 of relay LC-4.

The four color relay groups are illustrated in the wiring diagram of Fig. 10 to light red, white, green, and yellow lamps on the respective monogram panels. In actual practice, where various colors are desired, each display element of a monogram panel will be comprised of a cluster of lamps, preferably red, R-green, G-white, W- and yellow, Y. as illustrated more fully on Fig. 11. A schematic wiring diagram of panel color relays, with their circuits lined up for white lamps, is also shown at the top of Fig. 11.

*Test circuit. Detail 99*

When it is desired to check the display apparatus from the office end, without making an actual observation of the monogram panels, the operator dials number 9-8. This is shown as test on the code chart of Detail 7, and the result is that the yellow lamp Y, of Fig. 1, is caused to flash in synchronism with the revolutions of the main shaft 65, of Fig. 6. The relays and circuits of the test feature, may be eliminated from the system if not desired and its use is optional.

Upon dialing 9-8 at Fig. 1, relays 8 and 8' of the distributor of Fig. 3 operate and line up a circuit so that when the impulse comes over C-2-3-4, it runs through front contact of armature 1 of relay 8, front contact of armature 14, of relay 8', over conductor C-2-3, through winding of relay T of Fig. 2, to ground.

The operator now moves switch CS of Fig. 1, to point CS-C, which results in lighting lamp Y, by a circuit that originates at battery BA-1 of Fig. 2, auxiliary winding of relay T of Fig. 2, front contact and armature 1 of relay T, conductor C-1-2, dial switch springs DS, of Fig. 1, switch CS, switch point CS-C, and yellow lamp Y, to ground. It is to be noted that contacts of points CS-C, and CS-B of switch CS of Fig. 1 overlap. This prevents the opening of a circuit which would create a false impulse on the transmitting circuit as explained under Detail 11. The resistance R, at lamp Y of Fig. 1, compensates for the loss of relays A and P, of the original dial circuit. The extra or auxiliary winding of relay T of Fig. 1 is also utilized as a stick circuit for this relay. A branch circuit connects at its front contact of armature 1, front contact and armature 2, conductor C-T, cable CA-2-6, to switch of cam B of Fig. 6.

The test circuit coming through cable CA-2-6 to Fig. 6, continues over conductor C-T, to switch point 4 of cam switch of cam B, which is splined to main shaft 65 of Fig. 6. As this cam revolves, a ground is connected between its switch points 4, and its armature 3, and this circuit is broken each time this came completes its revolution.

The opening of this circuit however, does not release relay T of Fig. 2 as there is a shunt ground through lamp Y of Fig. 1. The desired signal, by flashing lamp Y, is obtained because the ground at cam B of Fig. 6 naturally would shunt out this lamp circuit. Thus, every time cam B of Fig. 6 reaches its normal position in its revolution, and opens its point 4 and armature 3 of its cam switch, lamp Y of Fig. 1 will light, and whenever cam B closes points of its switch, lamp Y of Fig. 1 will be shunted out.

A circuit runs from battery BA-2 of Fig. 2, front contact and armature 3 of relay T, conductor C-2-5 of Fig. 2, to conductor C-2-5 (upper left of Fig. 5), through relay 98 to the ground. If the operating time clock OTC of Fig. 5 should be off when the test is desired, this shunt circuit for the time clock switch, formed by the closing of armature 1 of relay 98 of Fig. 5, would turn the display "on," until the test was completed.

This test circuit answers two purposes, first it provides a check for observation in the office, and second, if it is desired to continue the operation of the display apparatus beyond the time limit set up on the operating time clock, dialing of code number 9-8 in the office will accomplish this purpose, without adjusting the time clock at the remote display apparatus.

When it is desired to end the "test," switch CS of Fig. 1 is moved to point CS-A. This opens the grounded circuit of Fig. 1, and as soon as cam B of Fig. 6 reaches normal, the shunt ground is broken there, thus opening the stick circuit of relay T of Fig. 2 allowing it to restore its armatures to normal. An important feature of the test circuit, is that the single line wire C-1-2, connecting the office of the first station with the display apparatus of the second station is utilized for this purpose. The circuit running from the dial to relay A of Fig. 2 is automatically cut off by armature 1 of relay T, thus opening the circuit of conductor C-1-2, and C-2. This circuit is restored again as soon as relay T is de-energized.

*Auxiliary apparatus. Detail 100*

Whenever the dial apparatus at the first station of this display system is to be used to transmit messages to more than one second station, switch EX of Fig. 1 is moved to a contact X-1, X-2, etc., dependent upon the number of auxiliary second stations in the system. A single line wire, such as C-1-2, will connect each switch contact with its respective second station. Thus, one dial transmitter at one first station (Fig. 1), may control an unlimited number of second station displays, placed at various locations with only one line wire connecting the first station with each second station. The test circuit of Detail 99 may be used for each auxiliary apparatus. This would require a relay T on each Fig. 2, but only one yellow pilot lamp would be required on Fig. 1 for any number of auxiliary circuits. It is to be noted that the so called first station comprises the apparatus of Fig. 1, 1A, 1B, 1C, 1D, and 1E. The second station includes all figures from Fig. 2 to Fig. 15 inclusive.

Having thus described an electric display system, it is desired to be understood that this form of the present invention has been selected to facilitate in the disclosure rather than to limit the number of forms which the invention may assume, and while there has been illustrated and described a preferred embodiment of the invention, no limitation is necessarily made to the precise structural details, as other possible applications will be evident to those skilled in the art, and it is to be understood that variations and modifications which properly fall within the scope of the appended claims are contemplated, and may be resorted to when found expedient.

What I claim is:

1. In a display device, a sign having a series of separate illuminable units capable of forming the various letters and numbers by energization of certain portions of the unit, switches for controlling the energization of the desired portions of the units, a rotary step-by-step storage controller for mounting said switches, locking means for maintaining the desired switches in energizing position, remote control means operating by a series of coded impulses for actuating the desired locking means, a rotatable drum contact controller connectable to the different locking switches on the storage controller and to the illuminable units whereby the indicia set up on the locking switches of the storage controller may be serially successively controlled by the rotation of the drum controller to form a printing sign.

2. In a display device, a sign having a series of separate illuminable units capable of forming the various letters and numbers by energization of certain portions of the unit, switches for controlling the energization of the desired portions of the units, a rotary step-by-step storage controller for mounting said switches, locking means for maintaining the desired switches in energizing position, remote control means operating by a series of coded impulses for actuating the desired locking means, an independently rotatable drum contact controller inserted between the locked switches of the storage controller and the switches controlling the illuminable units to sequentially connect the groups of the former with groups of the latter to actuate the same and energize the units to form a sign.

3. In display apparatus, a plurality of illuminable panels, each including a number of energizable sources of light capable of forming desired characters, a plurality of switches for controlling the energization of the sources, a rotatable storage controller having a number of series of presettable means to control the switches, means to rotate the storage controller sequentially, an independently rotatable drum controller connectable to the storage controller and to the first named switches to superimpose its control on the switches and means to disconnect the drum controller whereby it may be utilized with said storage controller or may be inactive.

4. In display apparatus, a plurality of illuminable panels, each including a number of energizable sources of light capable of forming desired characters, a rotatable storage controller having presettable switches thereon to control which sources of light will be energized, a rotary drum controller conductively connectable to groups of presettable switches on the storage controller and to the light sources, means for driving the drum controller and the storage controller whereby the rotation of the storage controller alone will provide a running sign and the drum a printing sign.

5. In an electrical display system, a visible illuminable sign composed of a group of units, each unit being capable of forming a letter or number, a series of spaced light sources in each unit so placed that the energization of different groups thereof will conform to the shape of a letter or number, each of said light sources including a plurality of lamps of different colors, only one of which is to be illuminated at any one time, a plurality of switching means controlling the different color groups, and remote control code means to operate the various switching means to change from one color to another in the character set up.

6. In an electrical display system, a visible illuminable sign composed of a group of units, each unit being capable of forming a letter or number, a series of spaced light sources in each unit so placed that the energization of different groups thereof will conform to the shape of a letter or number, each of said light sources including a plurality of lamps of different colors, only one of which is to be illuminated at any one time, a plurality of switching means controlling the different color groups, a rotatable storage locking switching controller having a plurality of switches connectable in sequence to the first named switching means and remote control code means for actuating said storage switching means to predetermine the color of the character to be formed at any one station.

7. In display apparatus, a plurality of illuminable panels each including a number of energizable sources of light capable of forming desired characters, a plurality of independently rotatable switching drums connected in series between a source and the energizable panels, one drum having a plurality of groups of presettable switches to determine the configuration of the character to be formed in a panel, said plurality thus spelling out a given word or phrase, and the second drum being a commutator drum to connect the group switches to different panels whereby when one drum rotates, the control switches will be sequentially controlling the panels to provide a running sign, and when the other drum is rotated the characters are impressed on definite panels to provide a printing sign.

8. In a display apparatus, a plurality of illuminable panels each including a number of energizable sources of light capable of forming desired characters, a plurality of independently rotatable switching drums connected in series between a source and the energizable panels, one drum having a plurality of groups of presettable switches to determine the configuration of the character to be formed in a panel, said plurality thus spelling out a given word or phrase, and the second drum being a commutator drum to connect the group switches to different panels whereby when one drum rotates, the control switches will be sequentially controlling the panels to provide a running sign, and when the other drum is rotated the characters are impressed on definite panels to provide a printing sign, and remote control means for selecting the group switches.

9. In display apparatus, a plurality of illuminable panels each including a number of energizable sources of light capable of forming different desired characters, group switching means for each panel, each switch controlling a plurality of light sources to form a part of a character, a movable storage controller having a sequence of series of control switches, each capable of actuating said first named switching means, locking means to maintain the control switches in a predetermined position, and a third set of independently movable switches interconnecting the first two sets to connect different control switch groups to different character switching groups in sequence.

10. In display apparatus, a plurality of illuminable panels each including a number of energizable sources of light capable of forming different desired characters, group switching means for each panel, each switch controlling a plurality of light sources to form a part of a character, relay means to actuate the switches, a rotatable storage controller, a plurality of circumferentially spaced rows of lockable switches on said controller, remote control means to individually set up a combination of switches in a row at a time, and movable commutator means connected between the locked switches and the relays to transfer the predetermined circuits to the relays for proper character formation.

11. In display apparatus, a plurality of illuminable panels each including a number of energizable sources of light capable of forming different desired characters, group switching means for each panel, each switch controlling a plurality of light sources to form a part of a character, relay means to actuate the switches, a rotatable storage controller, a plurality of circumferentially spaced rows of lockable switches on said controller, remote control means to individually set up a combination of switches in a row at a time, a second independently rotatable commutator drum connected between the lockable switches and relays to selectively sequentially connect the switches with the relays for different effects, whereby if one drum is rotated a running sign will be provided and if the other drum is rotated a printing sign will be provided.

CHARLES W. WARD.